United States Patent [19]
Gulliford et al.

[11] Patent Number: 5,241,537
[45] Date of Patent: Aug. 31, 1993

[54] CONVENTIONAL BASE STATION INTERFACE ARCHITECTURE FOR RF TRUNKING MULTISITE SWITCH

[75] Inventors: Philip C. Gulliford; Charles P. Brame; Wim A. Imron, all of Forest, Va.

[73] Assignee: Ericsson GE Mobile Communications Inc., Lynchburg, Va.

[21] Appl. No.: 709,987

[22] Filed: Jun. 4, 1991

[51] Int. Cl.⁵ .......................... H04Q 7/02; H04Q 7/04; H04B 7/26
[52] U.S. Cl. .................................... 370/67; 370/110.2
[58] Field of Search ................. 370/67, 68.1, 79, 84, 370/85.1, 110.1, 110.2; 455/56.1

[56] References Cited

U.S. PATENT DOCUMENTS

| | | |
|---|---|---|
| 4,012,597 | 3/1977 | Lynk, Jr. et al. . |
| 4,188,582 | 2/1980 | Cannalte et al. .................. 325/58 |
| 4,268,722 | 5/1981 | Little et al. . |
| 4,451,827 | 5/1984 | Kahn et al. .................. 340/825.52 |
| 4,550,402 | 10/1985 | Gable et al. .................. 370/85.1 |
| 4,578,815 | 3/1986 | Persinotti .................. 455/15 |
| 4,590,467 | 5/1986 | Lare .................. 340/825.5 |
| 4,630,263 | 12/1986 | Townsend et al. .................. 370/85.8 |
| 4,635,253 | 1/1987 | Urui et al. .................. 370/67 |
| 4,787,081 | 11/1988 | Waters et al. .................. 370/84 |
| 4,792,948 | 12/1988 | Hangen et al. .................. 370/66 |
| 4,926,495 | 5/1990 | Comroe et al. .................. 370/85.1 |

FOREIGN PATENT DOCUMENTS

| | | |
|---|---|---|
| 0473355 | 8/1991 | European Pat. Off. . |
| 2075799A | 11/1981 | United Kingdom . |
| WO90/15488 | 12/1990 | World Int. Prop. O. . |
| WO91/16797 | 10/1991 | World Int. Prop. O. . |

OTHER PUBLICATIONS

Motorola CENTRACOM Series II Control Center Systems, Field Maintenance Manual, Jun. 5, 1985.

Primary Examiner—Douglas W. Olms
Assistant Examiner—Melvin Marcelo
Attorney, Agent, or Firm—Nixon & Vanderhye

[57] ABSTRACT

An interface for a conventional base station into a digitally trunked network of RF communications systems acts a pseudo-down link from a multisite switch to a trunked site controller. The interface monitors the conventional channels from the base station and sends a channel assignment message to the multisite switch when it detects a voice signal. The channel assignment message notifies the trunked RF systems that a new call is active so that each system can assign a trunked working channel to the conventional call. Similarly, the multisite switch sends a channel request when a trunked call is to be broadcast over a conventional channel. The interface keys the channel and couples the channel to the trunked call.

8 Claims, 45 Drawing Sheets

MULTI-SITE ARCHITECTURE

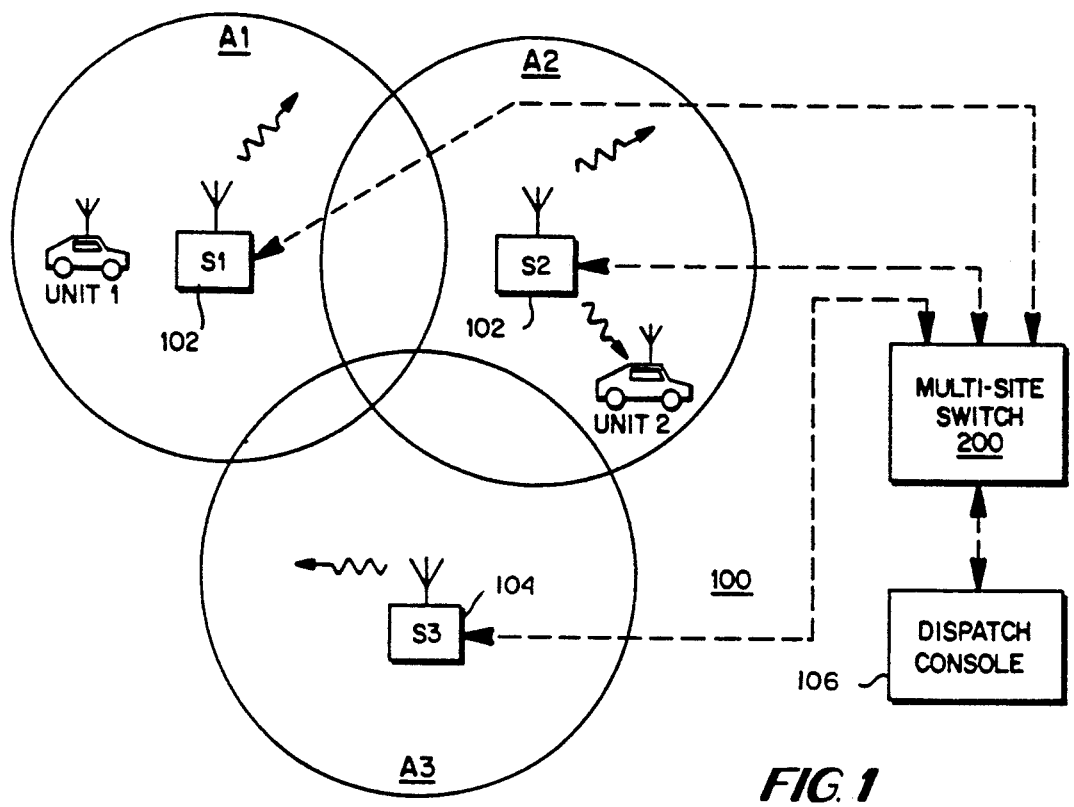
FIG. 1
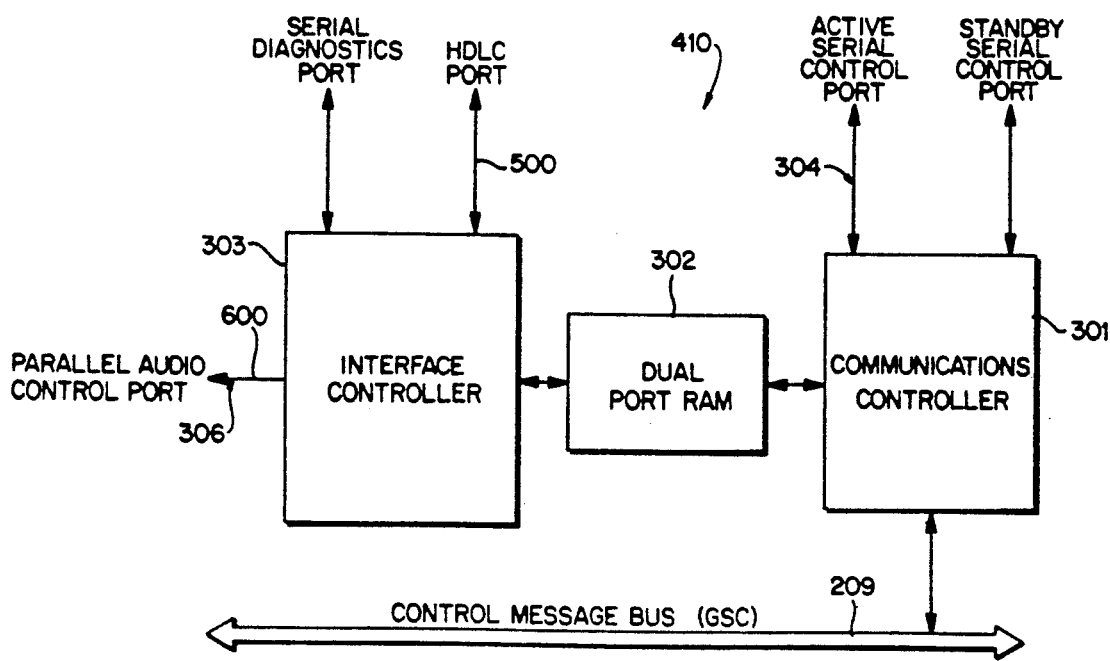
FIG. 4  SWITCH CONTROLLER CARD ARCHITECTURE

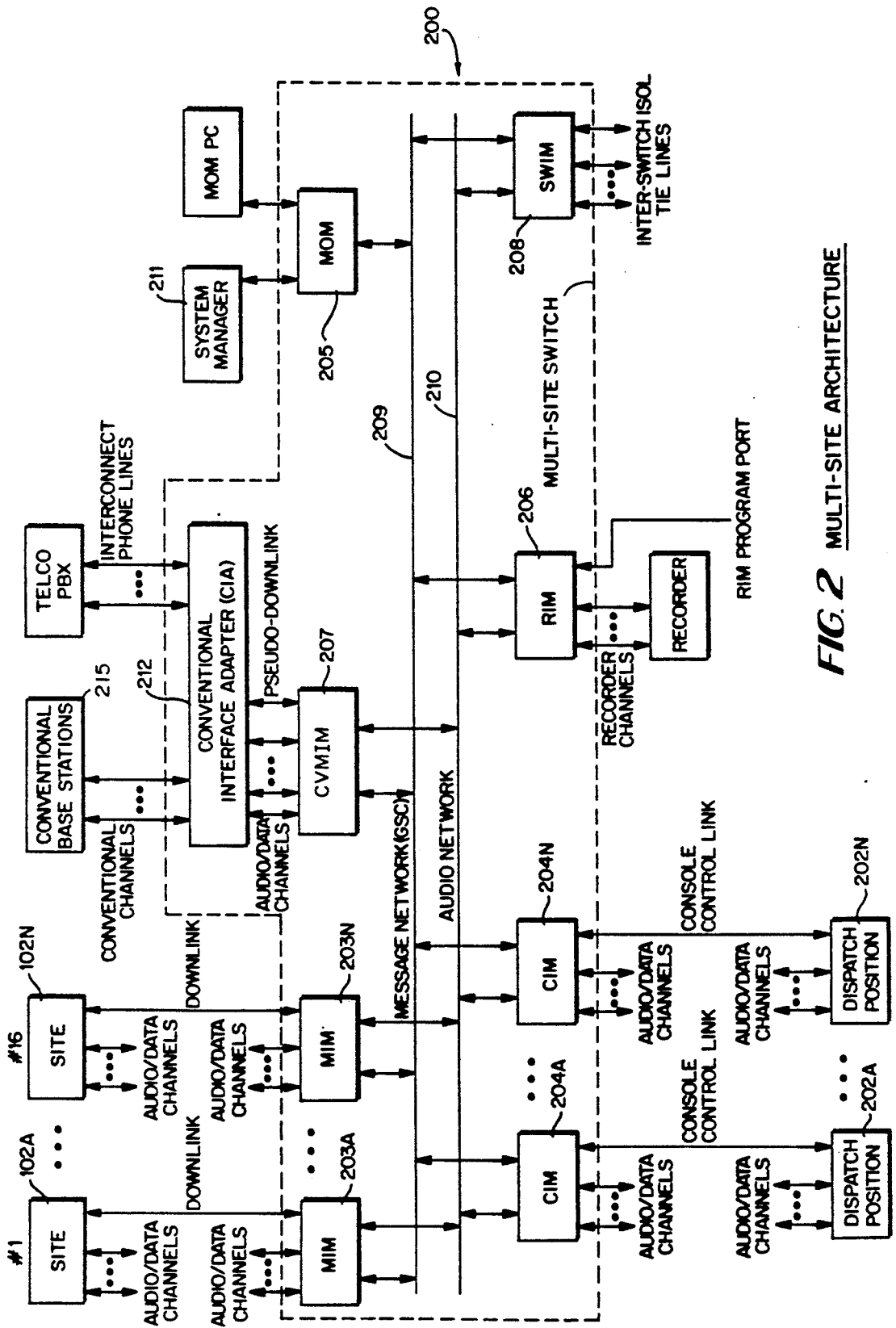
FIG. 2 MULTI-SITE ARCHITECTURE

CI BOARD CONTROL ARCHITECTURE

CCI MAIN LOOP PROCESSING

CCI MAIN LOOP PROCESSING
(CONTINUED)

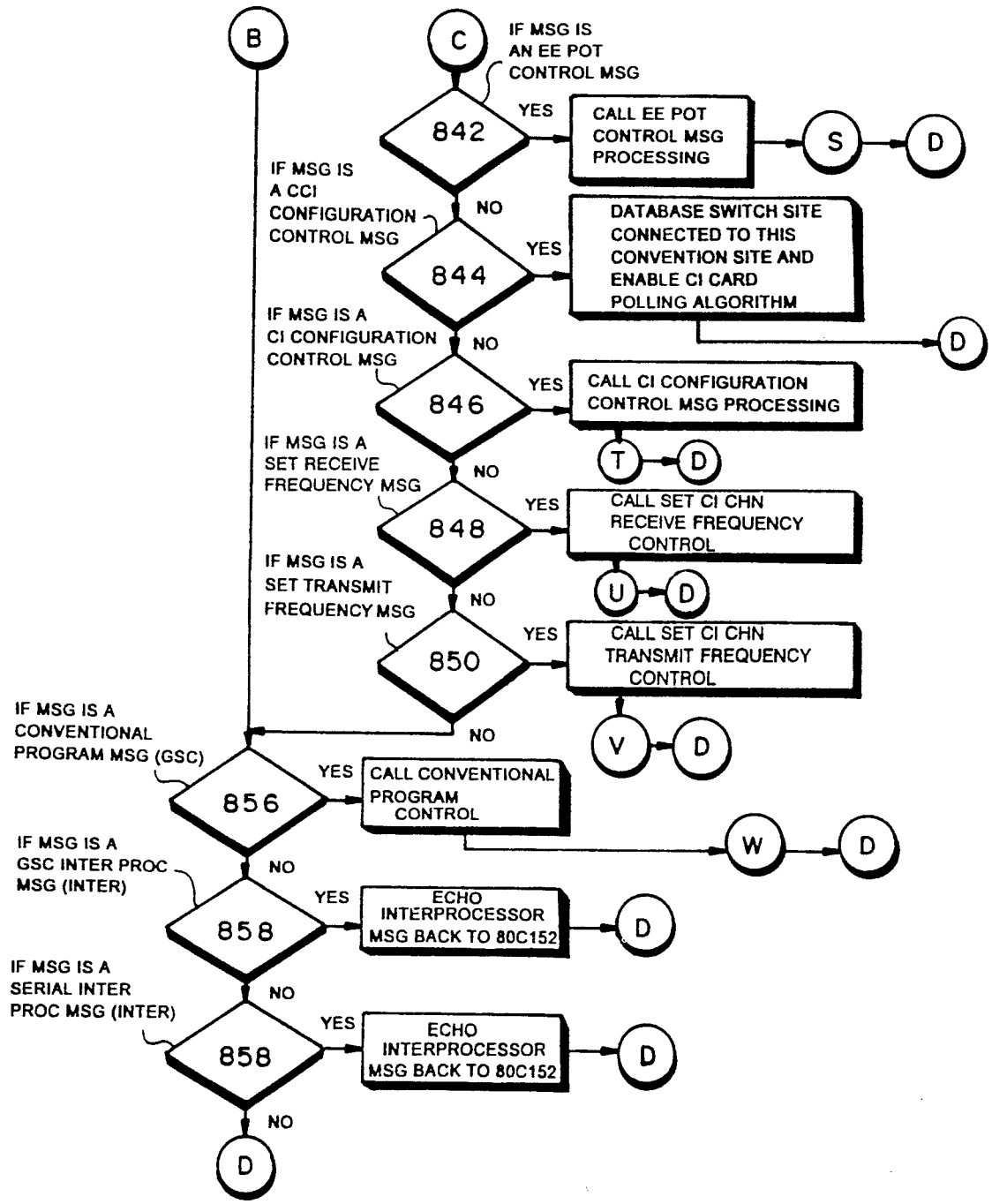

CCI MAIN LOOP PROCESSING

CHANNEL REQUEST PROCESSING

CI CARD POLLING ALGORITHM

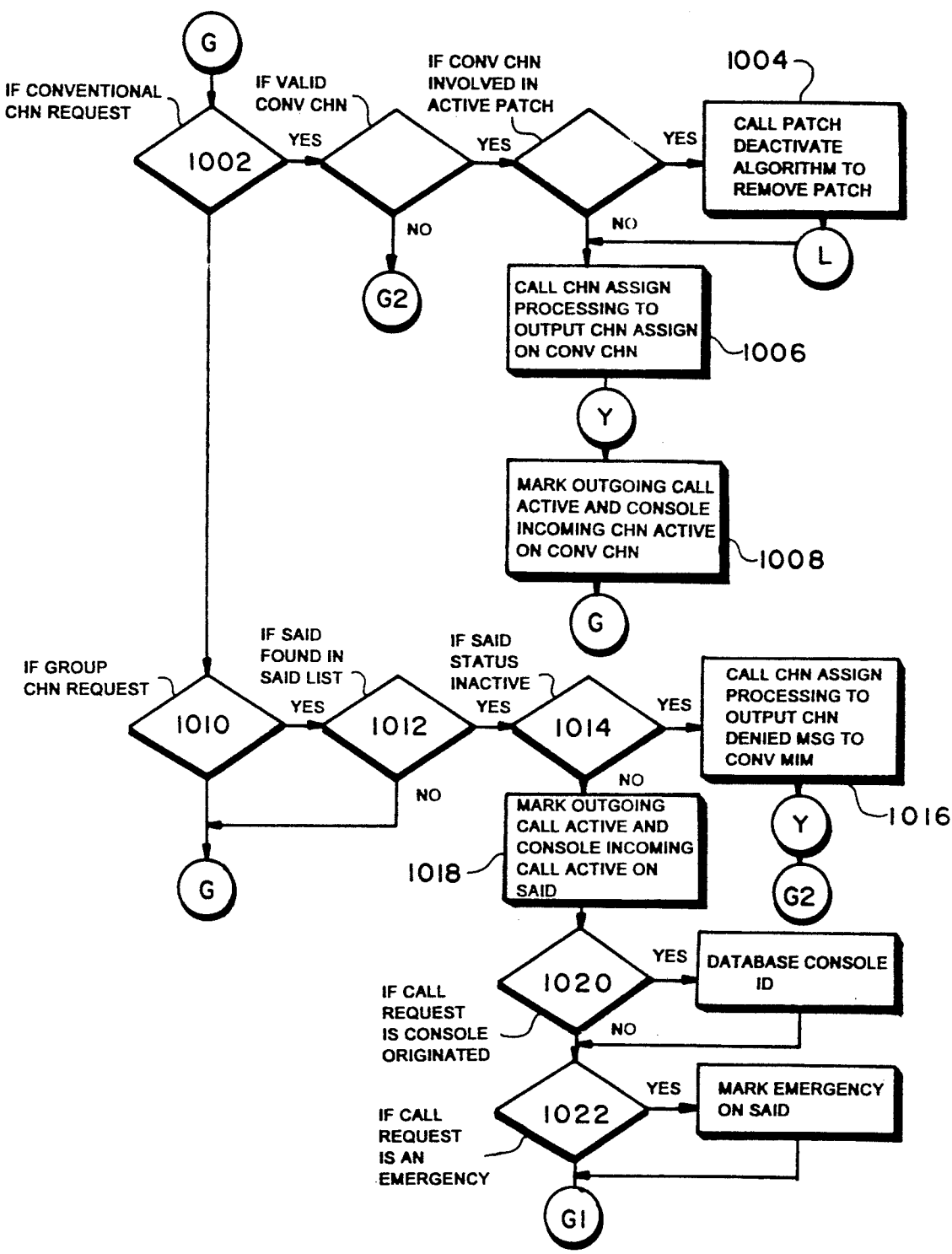

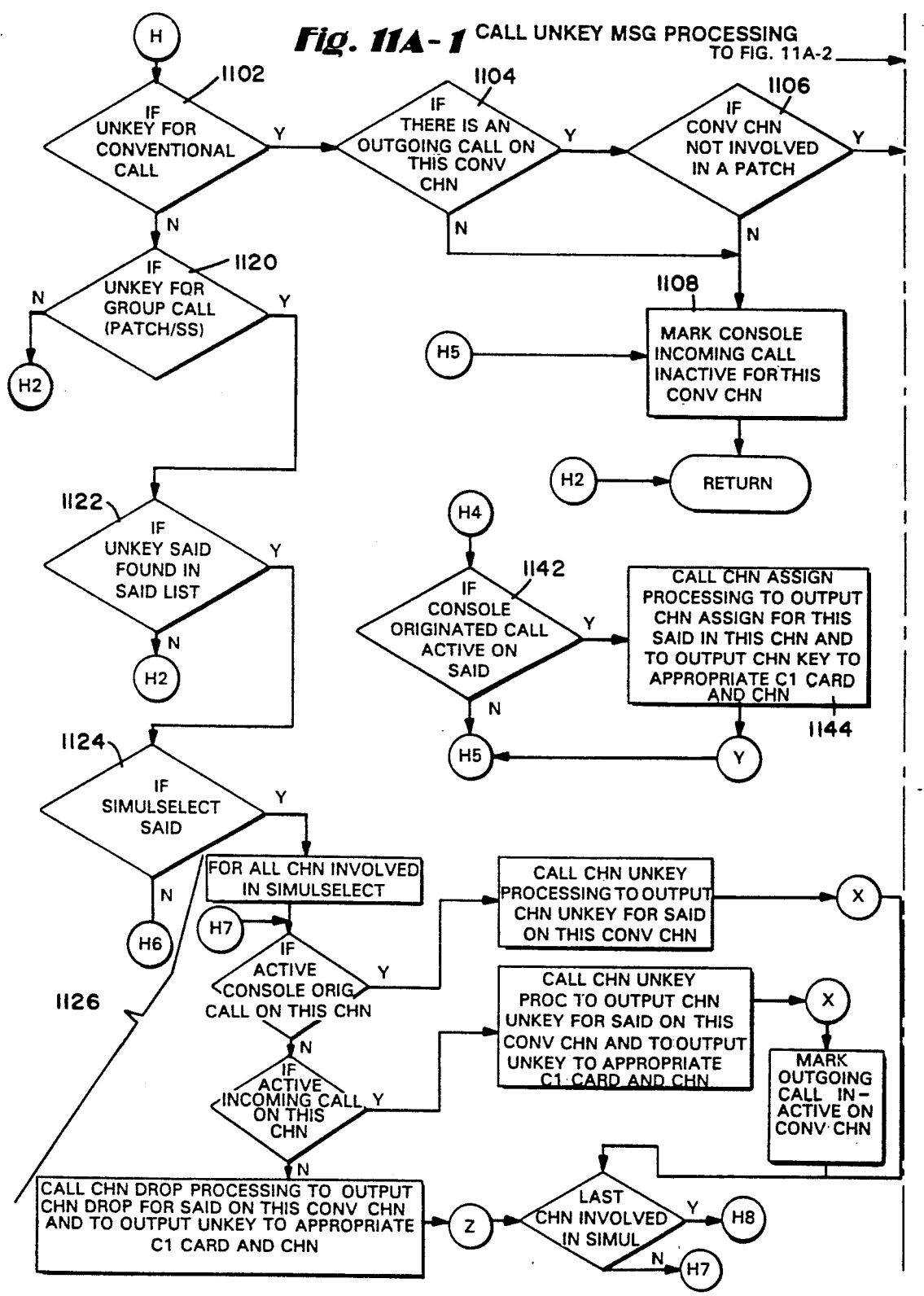

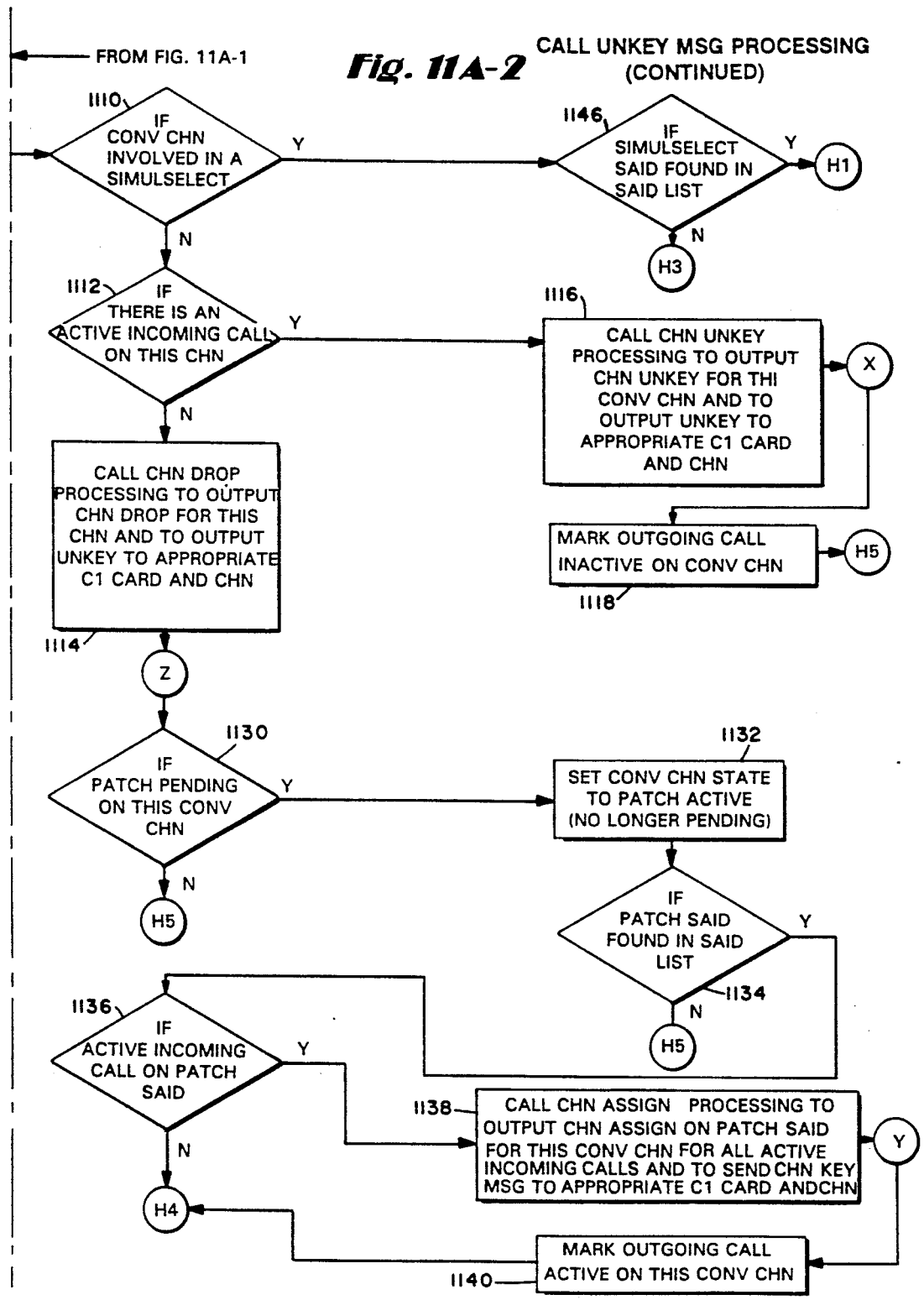

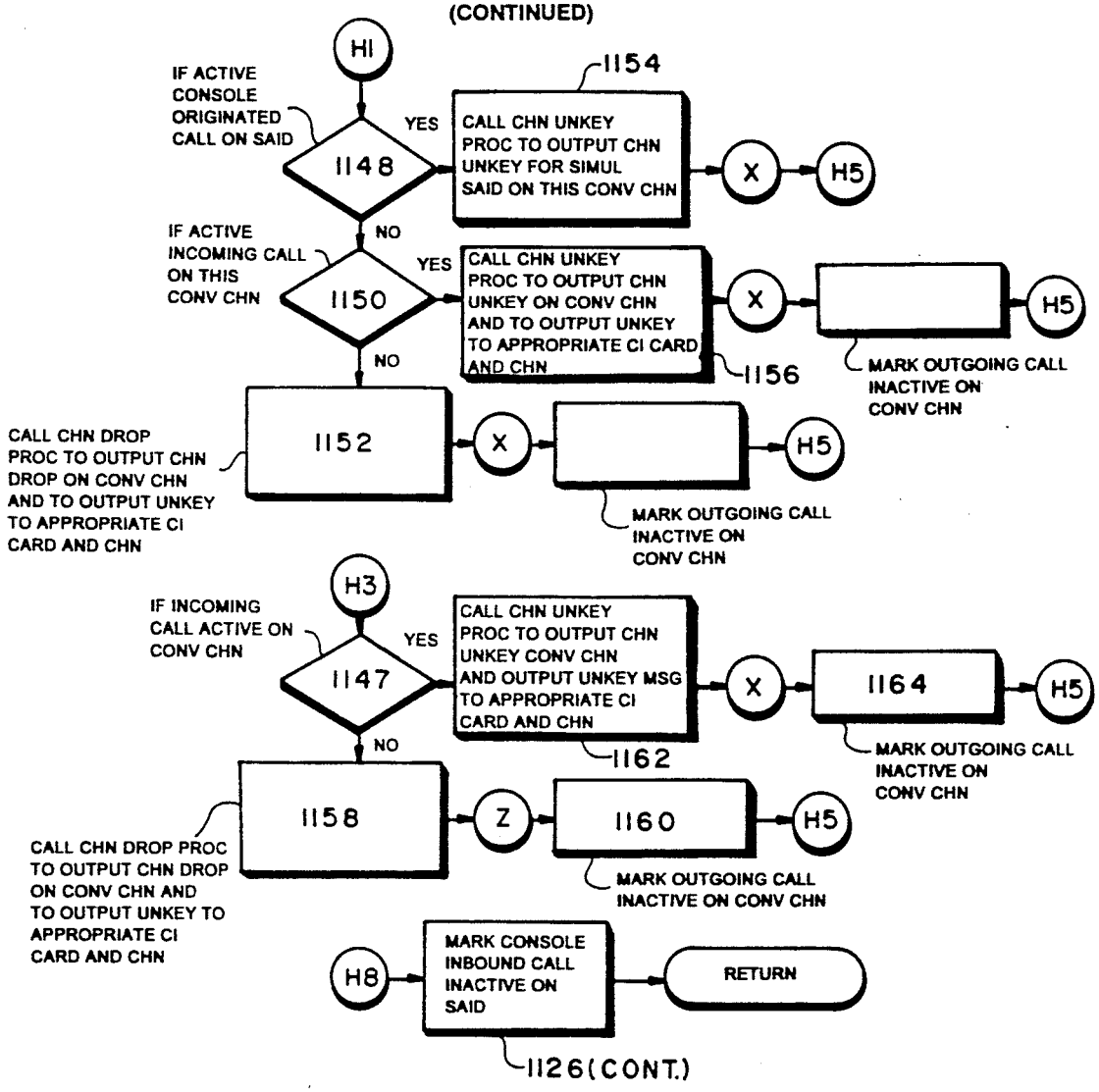

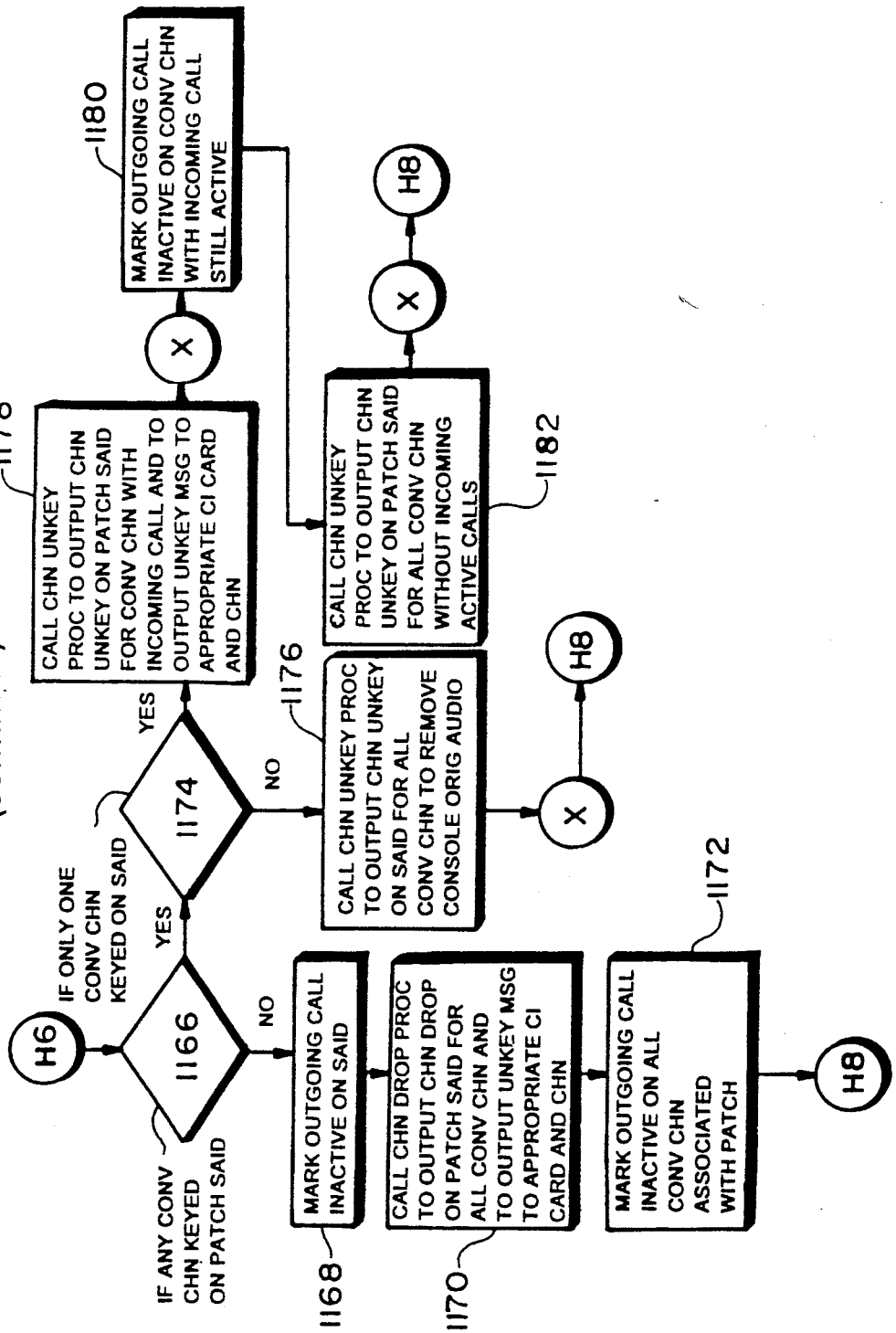

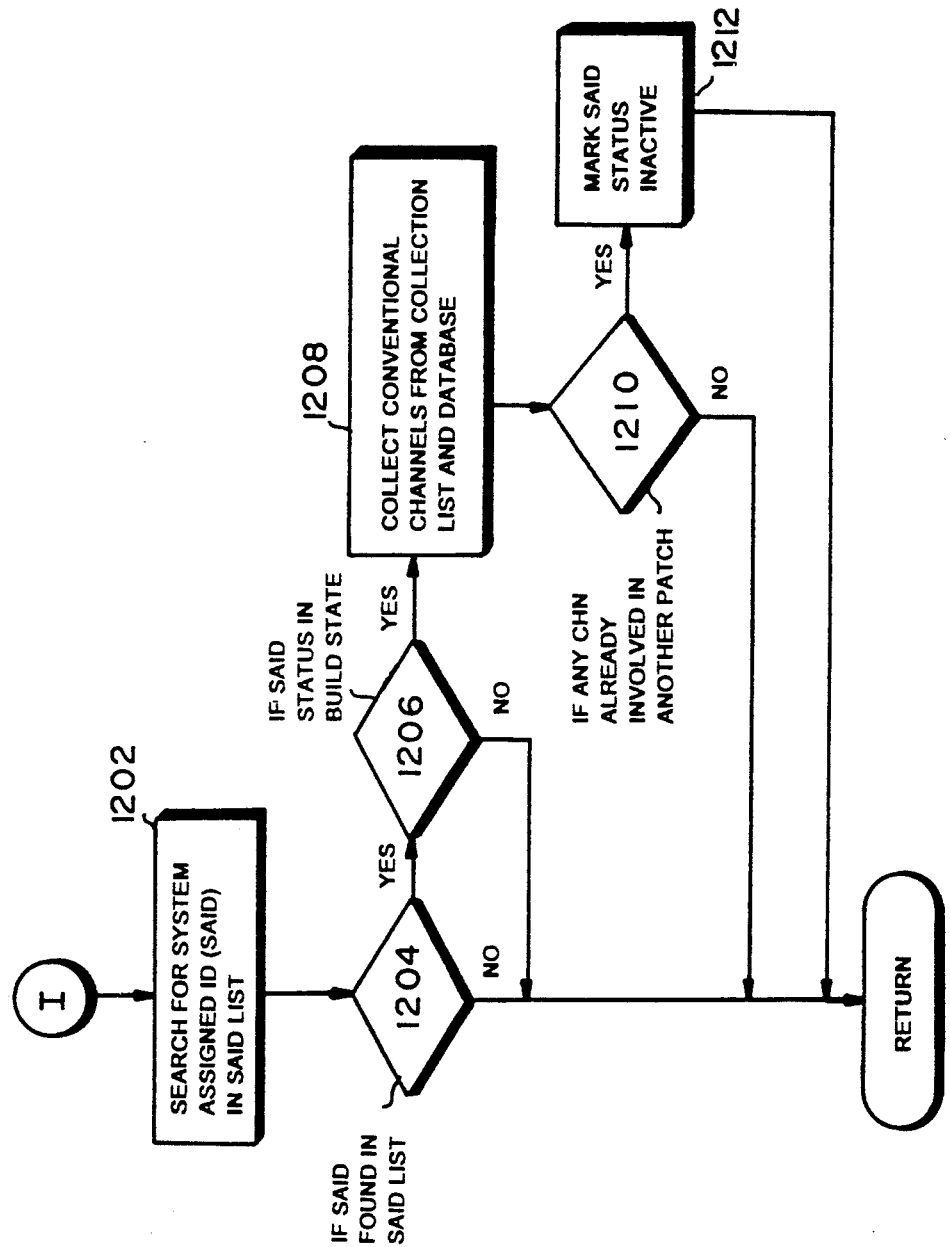

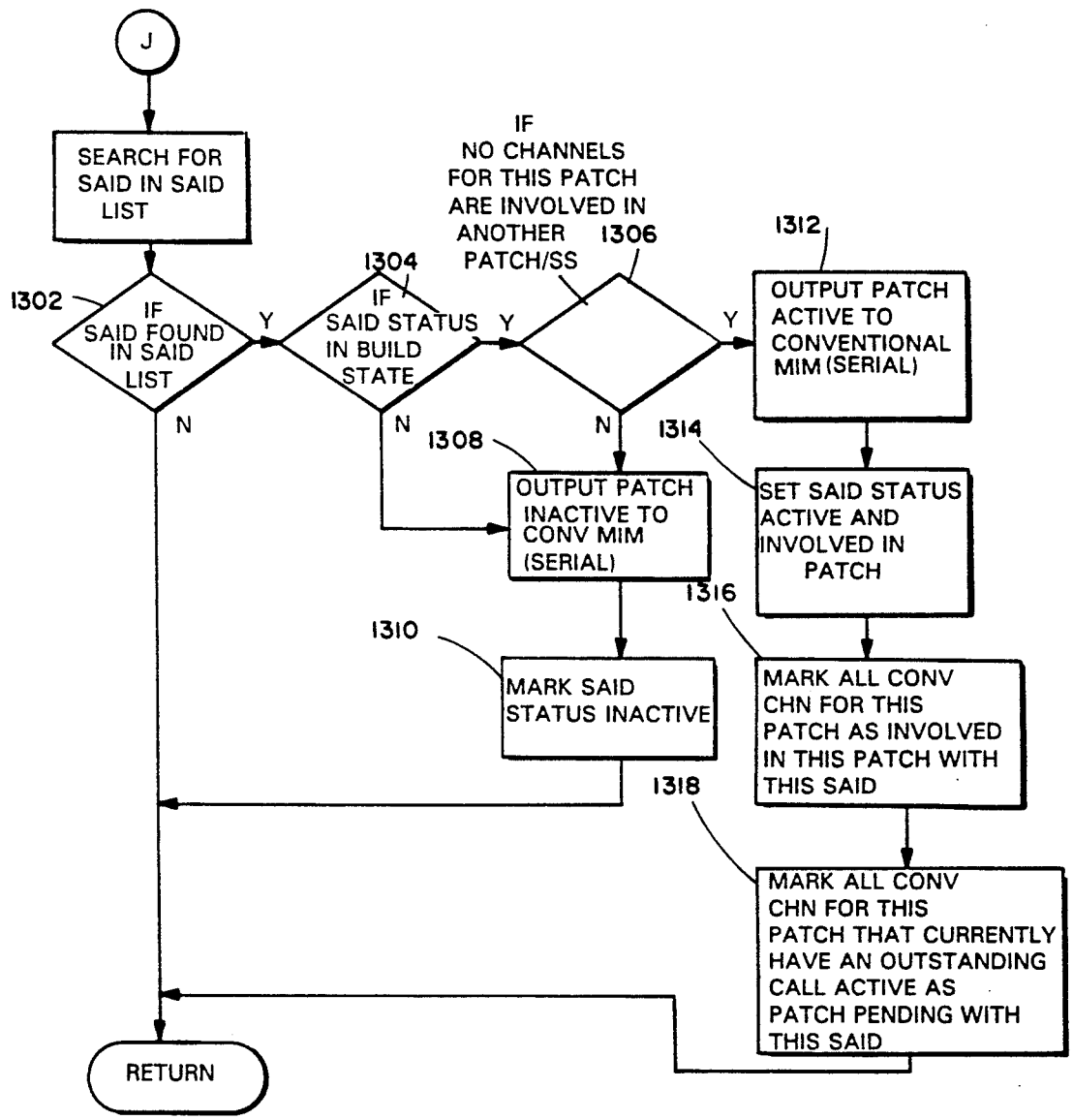

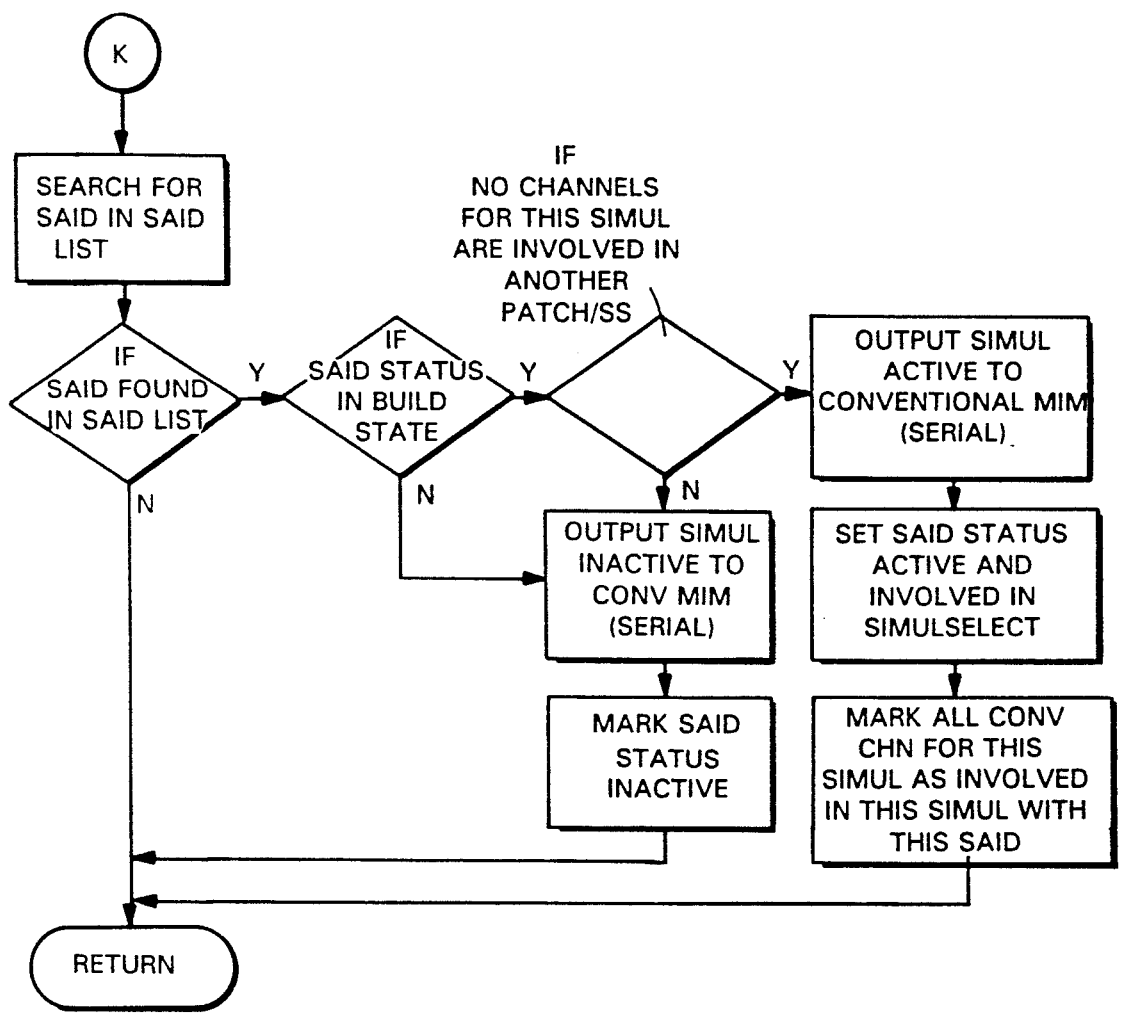

PATCH DEACTIVATE ALGORITHM (CONTINUED)

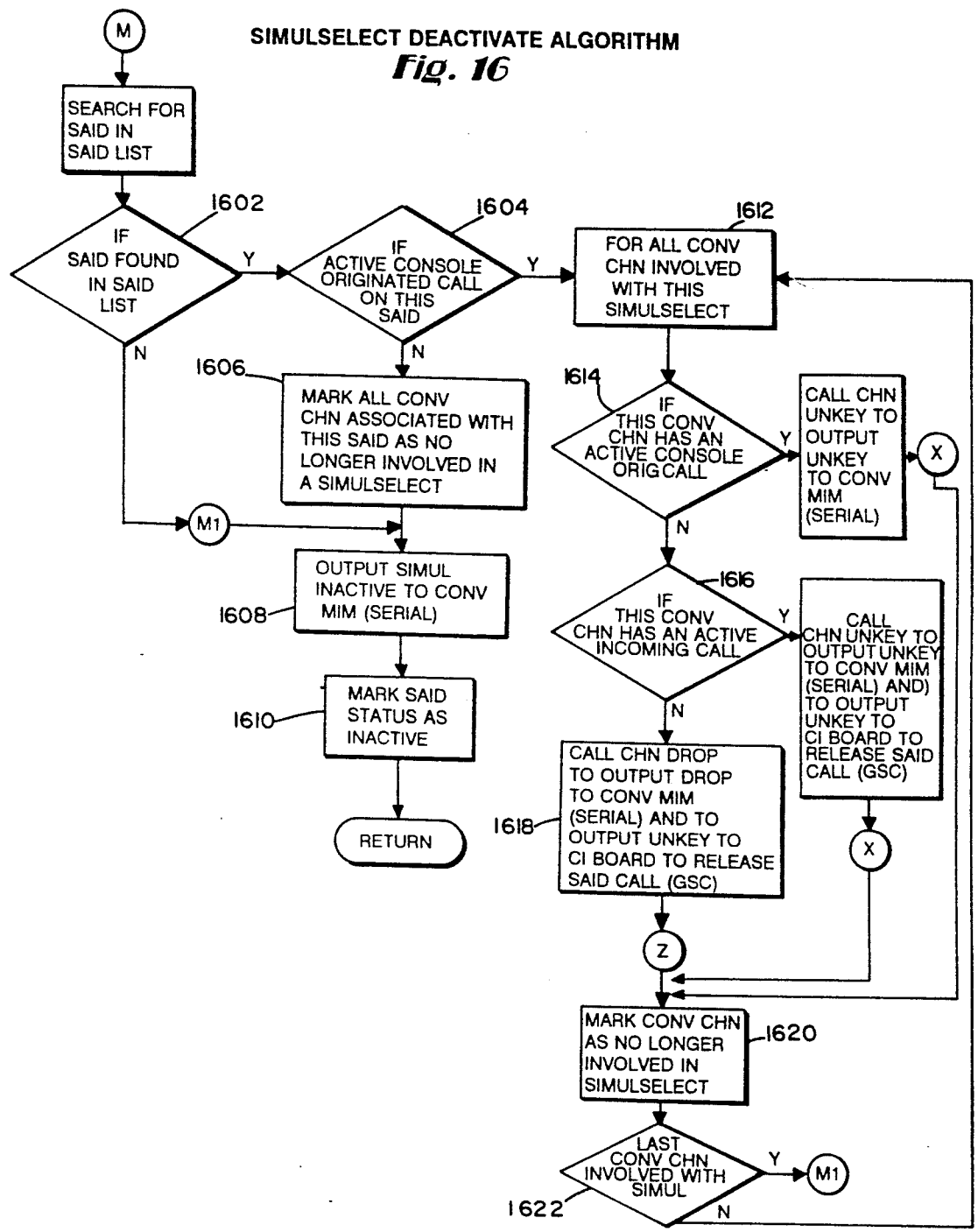

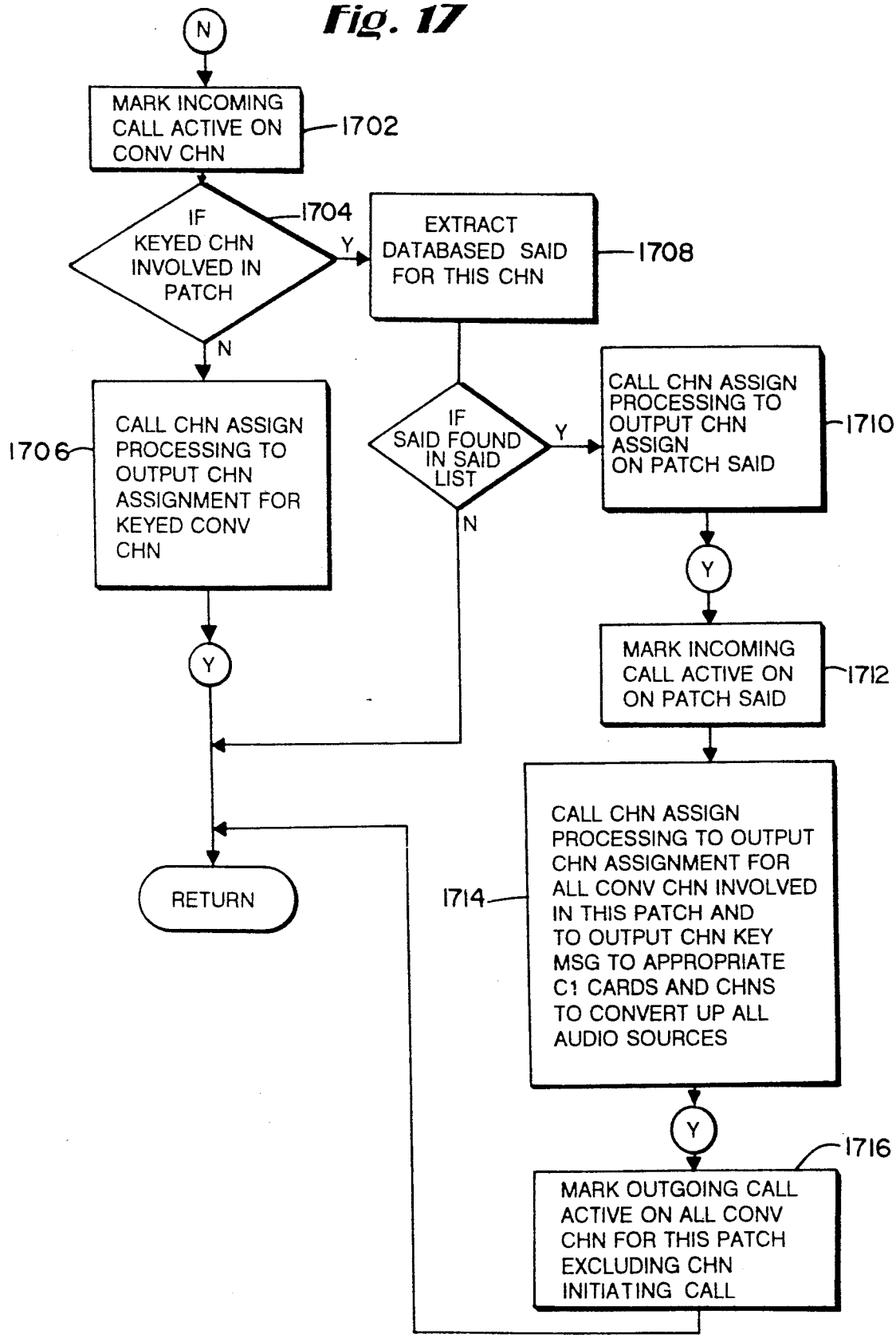

CONVENTIONAL CHANNEL UNKEY PROCESSING

CONVENTIONAL CHANNEL UNKEY PROCESSING (CONTINUED)

CONVENTIONAL CHN UNKEY PROCESSING
(CONTINUED)

EE POT RESPONSE MESSAGE PROCESSING

BASE STATION CONTROL MESSAGE PROCESSING

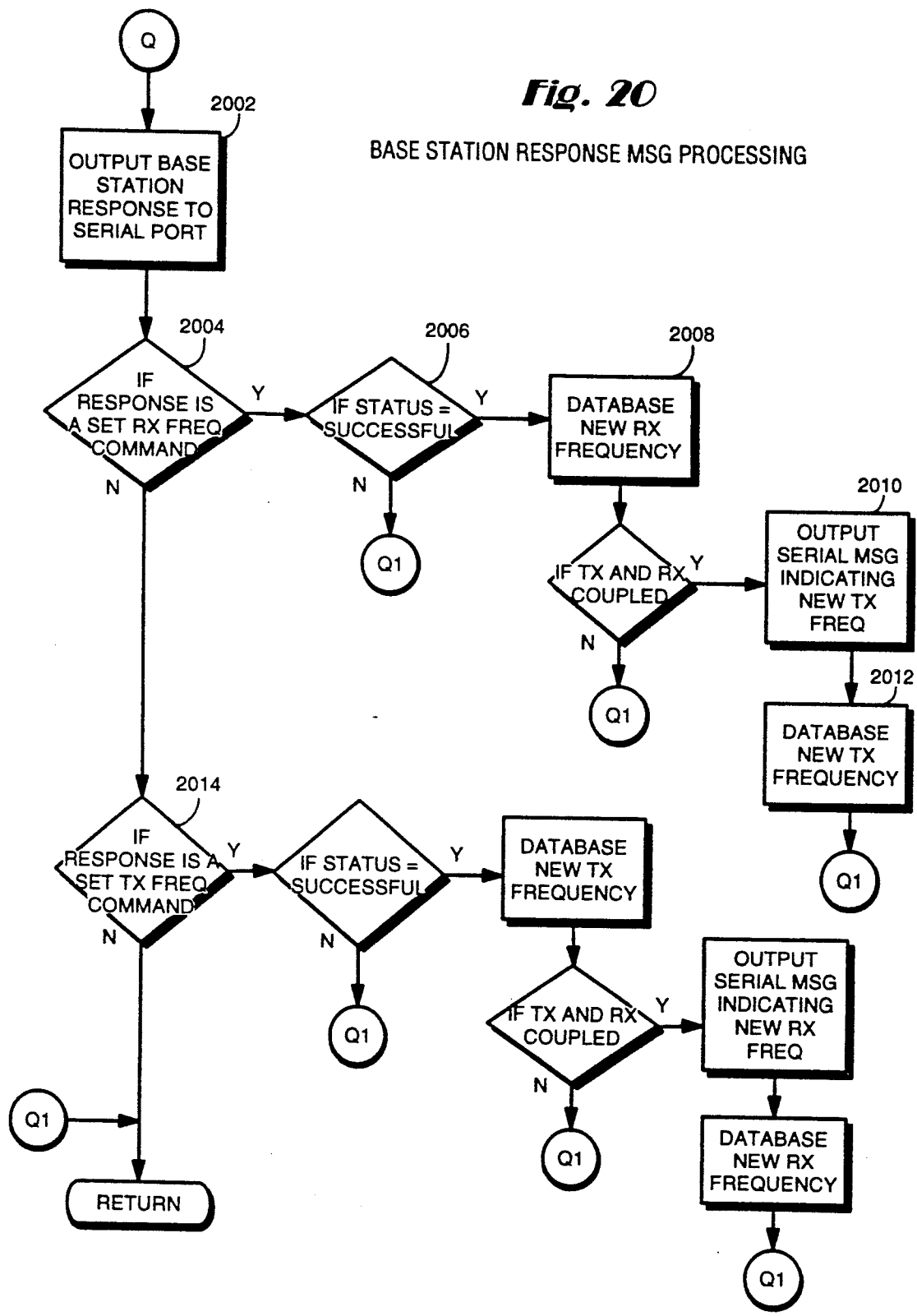

EE POT CONTROL MESSAGE PROCESSING

CI CONFIGURATION CONTROL MESSAGE PROCESSING

SET CI CHN RECEIVE (RX) FREQUENCY

SET CI CHN TRANSMIT (TX) FREQUENCY

CONVENTIONAL PROGRAM CONTROL

CHANNEL UNKEY MSG PROCESSING

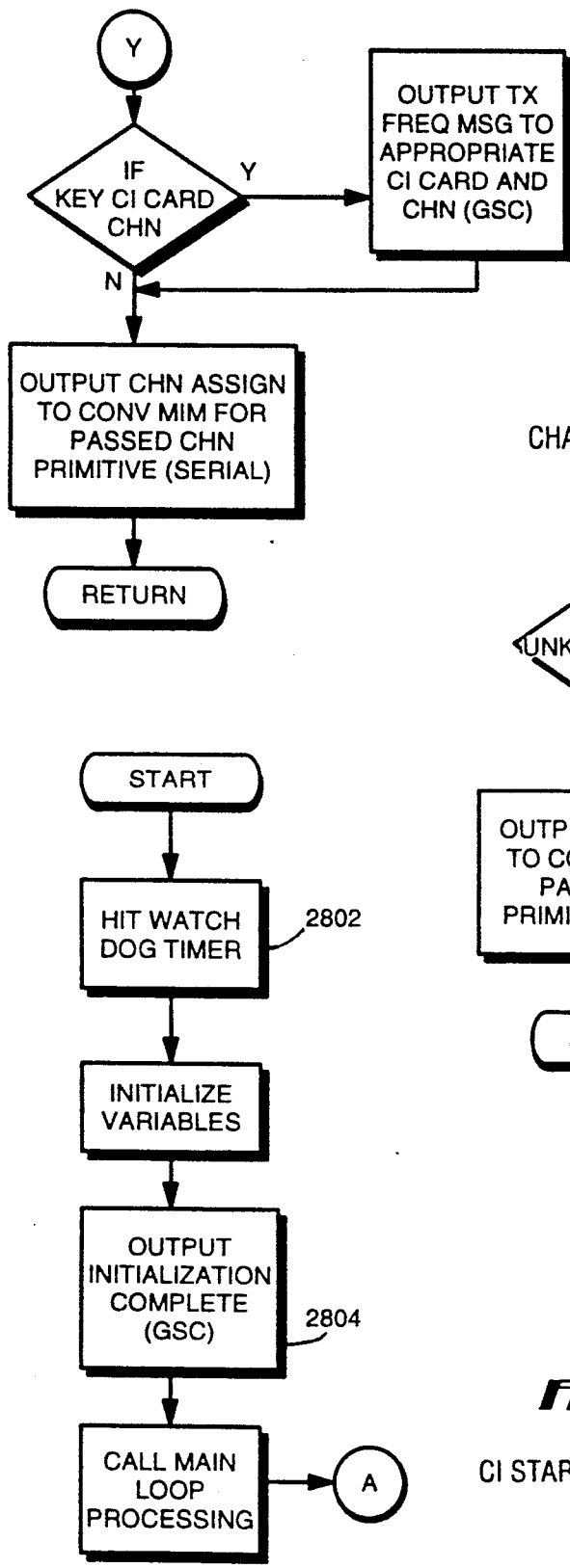
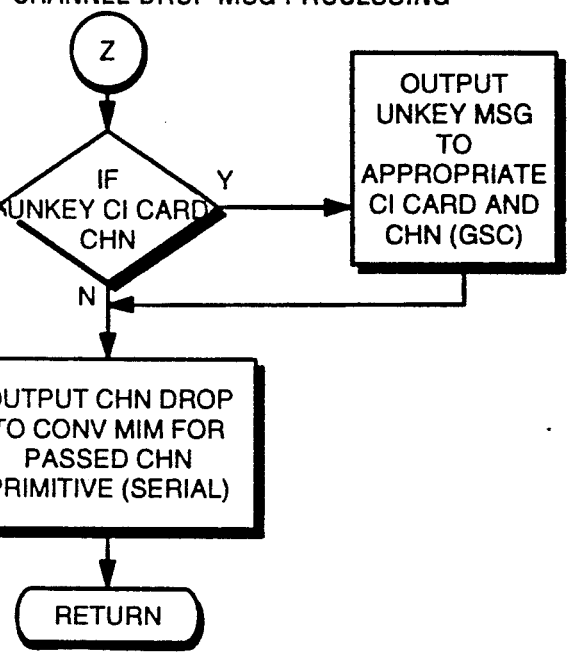
Fig. 28 CHANNEL ASSIGNMENT MSG PROCESSING
Fig. 29 CHANNEL DROP MSG PROCESSING
Fig. 30 CI STARTUP ALGORITHM

CI MAIN LOOP PROCESSING

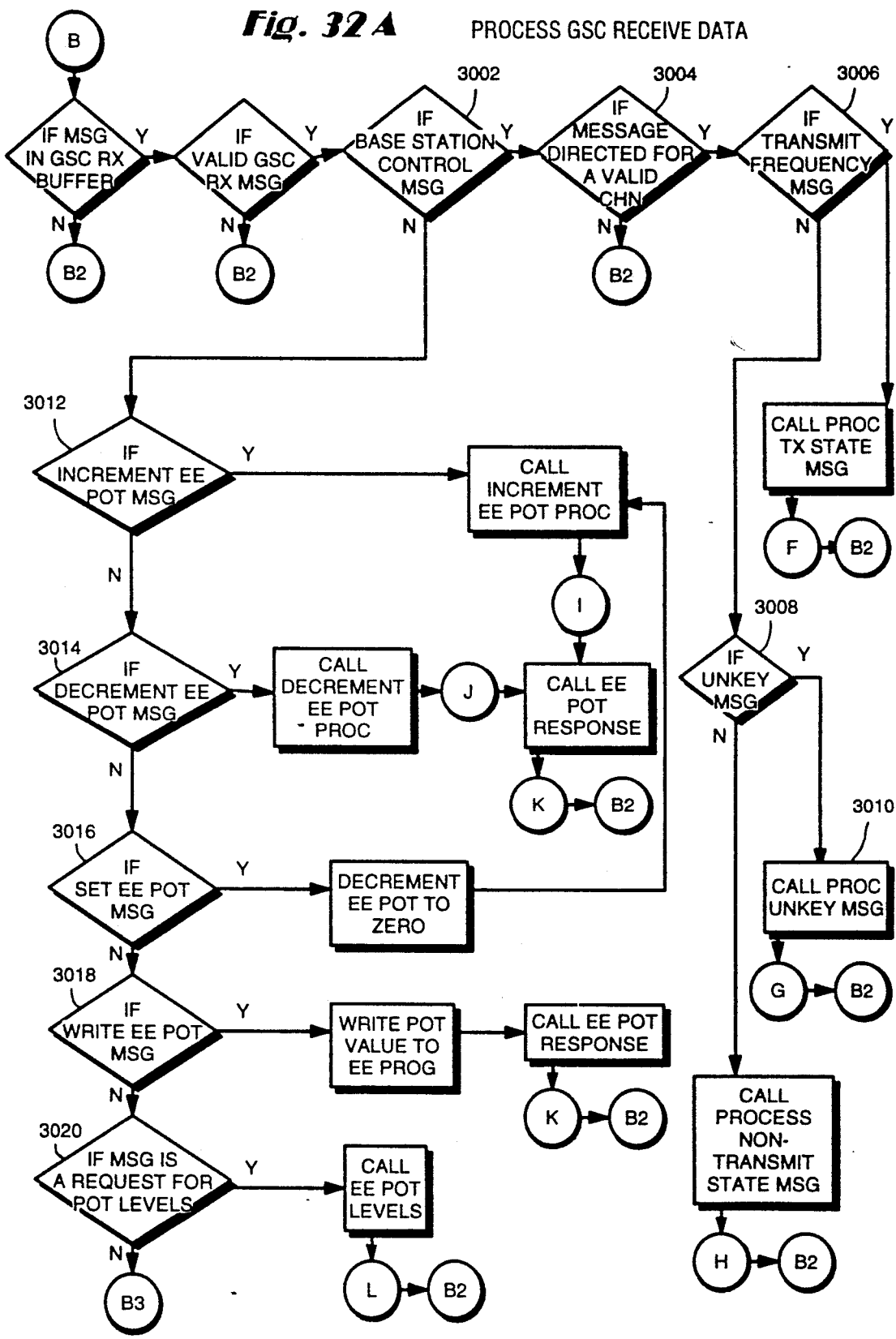
Fig. 32A   PROCESS GSC RECEIVE DATA

PROCESS GSC RECEIVE DATA (CONTINUED)

PROCESS UNKEY MESSAGE

INCREMENT EE POT

CCI MAIN LOOP PROCESSING (CONTINUED)
DECREMENT EE POT

REPORT EE POT LEVELS

EE POT RESPONSE CONTROL

PROGRAM STATE TABLE

DC CONTROL

CONVENTIONAL BASE STATION INTERFACE ARCHITECTURE FOR RF TRUNKING MULTISITE SWITCH

CROSS-REFERENCES TO RELATED APPLICATIONS

This application is related to the following copending commonly assigned U.S. patent applications:

Application Ser. No. 07/658,799 filed Feb. 22, 1991, which is a continuation-in-part application to Ser. No. 07/573,977, now abandoned, entitled "Distributed Multisite Coordination System" filed on 28 Aug. 1990 in the name of James L. Teel, Jr.

Application Ser. No. 07/658,843, filed Feb. 22, 1991, entitled "Dynamic Address Allocation Within RF Trunking Multisite Switch."

Application Ser. No. 07/658,640, filed Feb. 22, 1991, entitled "Message Bus Slot Update/Idle Control In RF Trunking Multisite Switch."

Application Ser. No. 07/658,637, filed Feb. 22, 1991, entitled "Protocol Between Console And RF Trunking System."

Application Ser. No. 07/658,641, filed Feb. 22, 1991, entitled "Data Protocol And Monitoring System For RF Trunking Multisite Switch Global Serial Channel."

Application Ser. No. 07/658,798, filed Feb. 22, 1991, entitled "Controller Architecture For RF Trunking Distributed Multisite Switch."

Application Ser. No. 07/658,844, filed Feb. 22, 1991, entitled "Distributed Multisite Switch Architecture."

Application Ser. No. 07/658,636, filed Feb. 22, 1991, entitled "Audio Routing With A Trunked Radio Frequency Multisite Switch."

The disclosure of each of these related copending applications is incorporated by reference.

FIELD OF THE INVENTION

The present invention relates to radio frequency (RF) communications systems. More particularly, the present invention relates to an interface that allows conventional non-trunked radio sites to communicate with a digitally trunked switching network for multiple site ("multisite") RF communication systems.

BACKGROUND AND SUMMARY OF THE INVENTION

Trunked RF repeater systems have become a mainstay of modern RF communications systems used, for example, by public service organizations (e.g., governmental agencies such as counties, fire departments, police departments, etc.). RF trunked repeater systems permit a relatively limited number of RF communications channels to be shared by a large number of users while providing relative privacy to any particular RF communication (conversation) As is well known, typical state-of-the-art RF repeater systems are "digitally trunked." These systems use digital signals conveyed over the RF channels (in conjunction with digital control elements connected in the system) to accomplish "trunking" (time-sharing) of the limited number of RF channels among a large number of users.

Frequently, it is desirable for these state of the art trunked systems to communicate with conventional non-trunked radio systems. Not all radio systems are trunked. Non-trunked conventional base stations, for example, are still widely used. Even when a municipality puts a trunked digital radio system in place, it may retain some conventional base stations to reduce the cost of implementing the new system. These conventional base stations must be able to communicate with the users of the digitally trunked system to participate in the trunked system. The present invention provides an interface that allows conventional radio base stations to communicate with a multisite switch in a digitally trunked system.

With a conventional (non-trunked) base station, the caller manually selects the channel he wants to use to make a call. The caller depresses the push-to-talk (PTT) button on his radio to broadcast the call through the radio system. The PTT button merely keys the microphone to the selected channel. The callees must be listening to the selected channel to hear the call. It is well-known for conventional radios to scan the available channels and lock-on to active channels. Many conventional radio systems have channels dedicated to a particular group or function. For example, a police radio may have assigned channels for specific groups of mobile units, e.g., a particular precinct, and an assigned channel for emergency calls. In a conventional system, if a particular channel is busy, a caller must wait for that channel to become free before he places a call.

In contrast to conventional base stations, digitally trunked RF communications systems include a "control" RF channel and several (possibly many) "working" RF channels. The working channels are used to carry actual communications traffic (e.g., analog FM, digitized voice, digital data, etc.). The RF control channel is used to carry digital control signals between the repeater sites and user RF transceivers in the field. When a user's transceiver is not actively engaged in a conversation, it monitors the control channel for "outbound" digital control messages directed to it. This is in contrast to scanning all or some available channels as is done in a conventional radio system. User depression of the radio's push-to-talk (PTT) switch results in a digital channel request message requesting a working channel (and specifying one or a group of callees) to be transmitted "inbound" over the RF control channel to the repeater site. The trunked repeater site (and associated trunking system) receives and processes the channel request message.

Assuming a working channel is available for use by the requesting caller, the repeater site generates and transmits a responsive "outbound" channel assignment digital message over the RF control channel (this message has the effect of temporarily assigning the available working channel for use by the requesting caller's transceiver and other callee transceivers specified by the channel request message). The channel assignment message automatically directs the requesting caller's transceiver (and callee user transceivers) to the available RF working channel for a communications exchange.

In a trunked call, when the communications exchange terminates, the caller's and callee's transceivers "release" the temporarily assigned working channel and return to monitoring the RF control channel. The released working channel is available for reassignment to the same or different transceivers via further messages conveyed over the RF control channel.

To begin an audio transmission, the trunked system merely requires the caller to wait for the next available working channel. Since there generally are a relatively large number of working channels, there is usually an available working channel and, if not, the wait for an available channel is not long. The advantage of trunking is that all working channels are available to all callers. In a conventional radio system the caller waits until the channel that he has selected is free. The channel becomes free only after the prior user releases the channel. Even if all of the other channels are free, the caller on a conventional radio must wait until his channel is free.

In contrast to the digital command messages that control the channels and audio communications in a trunked system, a conventional base station conveys control signals via tones or DC currents applied to the audio signal or DC currents place on the land lines carrying audio signals to and from the base stations. A tone controlled base station uses a standard set of tones modulated onto the carrier frequency. Similarly, a DC current controlled base station applies a small DC current to the line carrying the audio to the base station. These tones or DC current control such base station functions as:

enable/disable repeating functions of the base station;
enable/disable the RF transmitter at the base station;
enable/disable channel guard encode/decode/monitor;
set remote, local and or/external push-to-talk, and
request Morse code identification.

Any trunked radio system that is to communicate with a conventional base station must handle tones and DC current commands, and handle non-trunked conventional channels. The present invention is an interface capable of acting as a gateway between a conventional base station and a multiple site trunked radio network.

FIG. 1 is a schematic diagram of a simplified exemplary network of multiple-site radio repeater system having three radio repeater (transmitting/receiving) sites S1, S2, and S3 providing communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. For purposes of this illustration, two of the sites (S1 and S2) are trunked repeater sites that include a set of repeating transceivers operating on a control channel and plural RF working channels. The third site S3 is a conventional base station with several non-trunked channels. All three sites are connected to a central multisite switch that routes audio and data communications between each of the sites.

Each of the two trunked sites may typically have a central site controller (e.g., a digital computer) that acts as a central point for communications in the site, and is capable of functioning relatively autonomously if all participants of a call are located within its associated coverage area. The operation of the trunked sites is very similar and compatible and, thus, can be relatively easily linked together via a multisite switch. It is not so easy to link a conventional base station to a digitally trunked multisite switch. The conventional base station is dissimilar to the trunked sites in that it does not have a control channel or equally accessible working channels. In addition, the conventional base station is tone or DC current controlled, does not trunk calls, and does not use digital signaling as do the trunked sites. Accordingly, the conventional base station is not compatible with the trunked digital sites. Nevertheless, the multisite switch of the present invention is capable of establishing audio pathways between the conventional base station and the digitally trunked radio sites.

The multisite switch is the switching network that provides control and audio signal pathways between different trunked sites and conventional base stations. Such pathways must be set up at the beginning of each call and taken down at the end of each call because of the trunked systems. The multisite switch, for example, routes calls from a first mobile radio in one site to a dispatcher console and a second mobile radio in another site. The various sites and dispatcher consoles are connected to the multisite switch. The multisite switch is the hub of a network of the connected sites and dispatcher consoles. Any radio user within this network can talk to any other user in the network.

The multisite switch is a digital device that handles trunked digital audio and command signals. Such a switch is generally incompatible with a conventional non-trunked base station. The switch is set up to handle digitally trunked audio signals and the digital commands employed by trunked RF sites. These digital commands, for example, establish calls, connect listening callees to audio pathways and disconnect calls. A conventional radio system does not employ digital signals but rather uses a limited set of sub-audible tones or DC currents to control its base station.

Unlike conventional radio systems (or a cellular radio telephone or land-based telephone environment), trunked radio system calls may be relatively short (e.g., in some cases, as short as a second or two in duration). During an emergency or other period of great activity, the system may be required to handle hundreds of such calls in a very short time period. For this to occur, it is necessary to efficiently and rapidly route audio signals between the elements (i.e., RF transmitter/receiver decks) related to any arbitrary channel of, for example, site S1 and the elements related to any arbitrary channel of site S2 (and also to the elements of any arbitrary channel of site S3) to permit user transceivers in coverage areas A1 and A2 (and A3) to communicate with one another.

The multisite switch provides distributed audio signal routing in a large radio system generally having a plurality of trunked radio sites, conventional base stations and dispatcher consoles. The multisite switch has a distributed architecture so that its logical functions are shared by various microprocessor operated nodes distributed throughout the switch. These nodes share the computational workload of the switch and most nodes are assigned to a specific conventional base station, trunked site controller, or dispatcher console. The audio routing provided by the multisite switch is performed by audio processors within each node. By distributing the audio routing to the nodes in the switch, there is no need to have a centralized audio mixing/routing matrix that has been required in prior art trunked RF switches.

In the present invention, one of the nodes in the switch is coupled to an adaptor that is specially configured to interface a conventional base station into the switch and, thus, into the trunked radio network. In the preferred embodiment, the multisite node coupled to a conventional station is denoted as the Conventional Multisite Interface Module (CVMIM). The CVMIM node is indirectly coupled through a Conventional Interface Adaptor (CIA) to several audio lines carrying non-trunked conventional channels between the base station and the multisite switch. Accordingly, the CVMIM is capable of receiving and sending conventional calls to and from the base station. The CVMIM itself is a standard node within the switch that is identical in its hardware to the Modular Interface Nodes (MIM) coupled to trunked radio sites. However, the CVMIM has some unique programming for the conventional base station.

Within the switch, the CVMIM connects to internal time division modulated (TDM) buses and control buses. These TDM slotted buses are the audio/data pathways within the switch, the TDM buses connect each of the switch nodes and establish digital audio links between the various sites and dispatcher consoles within the radio network. Within the switch, there are also control buses that carry digital control messages between nodes within the switch. These messages are used to establish, control and tear-down audio/data pathways, and to perform overhead administrative tasks within the switch. The CVMIM switch node is coupled to the TDM buses and the control buses and, thus, interacts with all of the other nodes within the switch.

The CVMIM node operates within the multisite switch in conjunction with a Conventional Interface Adaptor (CIA). The CIA is a component of the multisite switch and is directly coupled to the conventional channel lines between the base station and the CVMIM. The CIA does not directly connect to the TDM or command buses within the switch. However, the CIA has its own internal command bus and serial command link and audio lines connecting it to the CVMIM. The CIA converts the digitally trunked signals from the CVMIM to the conventional audio signals for a base station and vice-versa. Similarly, the CIA acts on or translates the digital control messages from the CVMIM into control tones or DC currents for the base station. The CIA also detects voice signals on conventional channels from the base station. The CIA makes the conventional base station appear to be a relatively standard trunked site to the CVMIM. The CIA forms a pseudo-downlink to the CVMIM.

The architecture of the CVMIM node includes a single controller module (preferably with a backup redundant controller module to ensure functionality in case of failure) supporting a plurality of audio modules. The controller modules and audio modules may take the form of printed circuit boards connected to a common backplane. The audio modules each process audio for several (e.g., four) bidirectional audio channels. Thus, one controller board supports many (e.g., sixteen) audio/data channels. The architecture of the node and its operation are specifically designed to enable a single controller board to handle a large number of audio boards and channels.

The architecture of the CIA in the present invention also includes a single controller module supported by a plurality of intelligent audio boards. The controller module is the Conventional Capabilities Interface module (CCI) and is connected via a local GSC message bus to the audio boards which are each known as a Conventional Interface (CI). The CCI is also coupled to the controller card of the CVMIM via a pseudo-downlink connection that is configured such that the CVMIM sees the CCI largely as site controller for a trunked site controller. The CCI has the same hardware as does the controller in a CVMIM. Each CI audio board in the CIA has an audio line for each channel link that connects to its sister audio board in the CVMIM. The CI audio boards convert the trunked audio signals to conventional audio signals and visa-versa.

Accordingly, it is an object of the present invention to allow a conventional base station to interface with a multisite network of digitally trunked radio system. It is a further object to provide a specialized node in a multisite switch that is capable of communicating with a conventional base station.

BRIEF DESCRIPTION OF THE DRAWINGS

These and other features and advantages of the present invention will become better and more completely understood by referring to the following detailed description of presently preferred exemplary embodiments in conjunction with the sheets of FIGURES, of which:

FIG. 4 is a block diagram of an exemplary controller for the multisite switch node shown in FIG. 3;

FIGS. 8 to 29 are detailed software flow charts showing the processing operations of the Conventional Capabilities Interface (CCI) shown in FIG. 5; and FIGS. 30 to 45 are detail software flowcharts showing the processing operations CI controller shown in FIG. 6.

DETAILED DESCRIPTION OF PRESENTLY PREFERRED EXEMPLARY EMBODIMENTS

Figures 1, 18A:
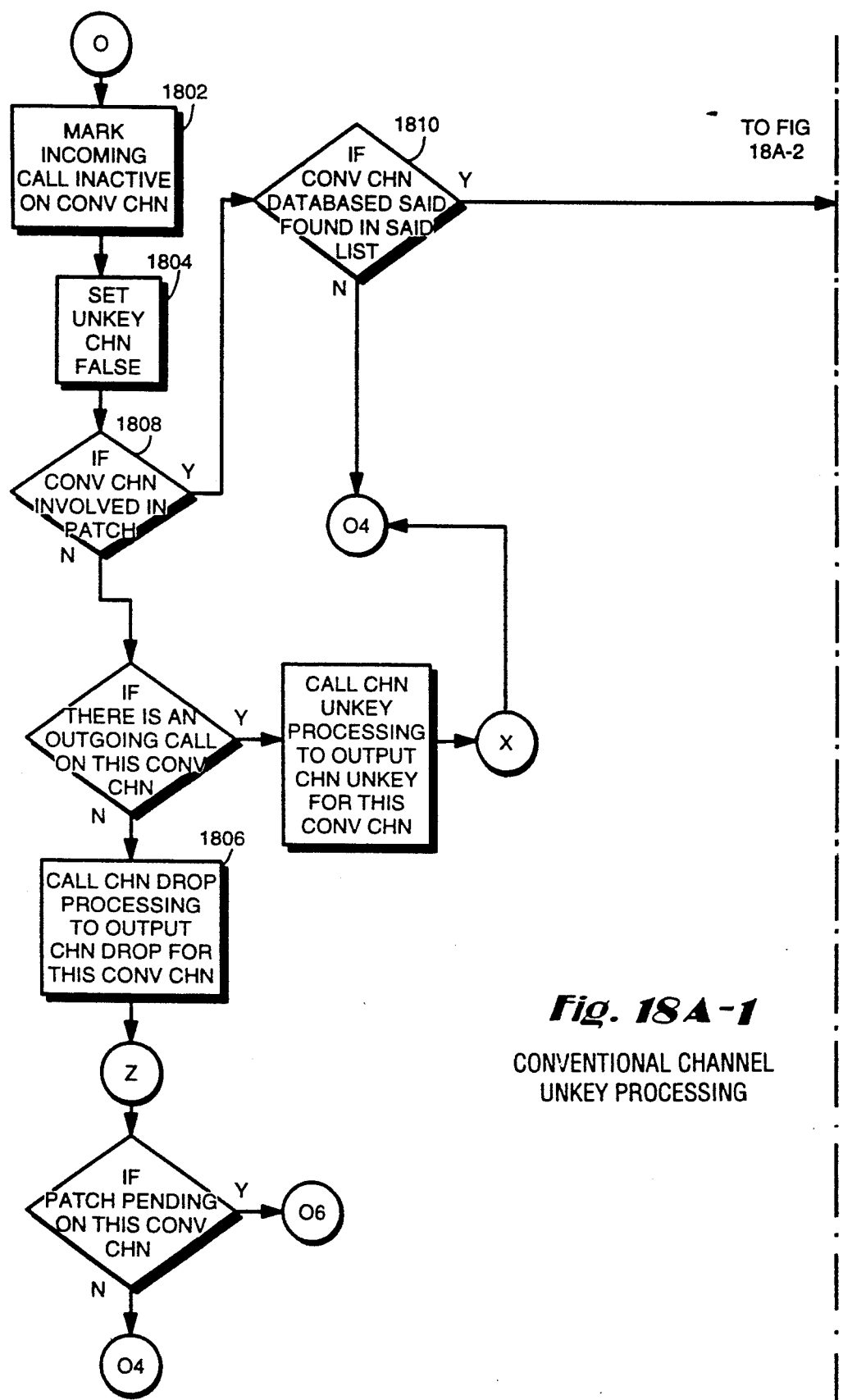
FIG. 1 is a schematic illustration of an exemplary multisite RF communications system.

An exemplary radio repeater system 100 in accordance with the invention is generally depicted in FIG. 1. Individual remote radio frequency (RF) transceiving units (e.g., mobile or portable radio transceivers) communicate with each other through shared radio repeaters that are part of the repeater system 100. The exemplary system 100 includes several trunked RF transceiver (repeater) sites 102, one or more conventional base stations 104, and one or more dispatch consoles 106. Each trunked site 102 includes plural RF transceivers (repeaters) that transmit and receive signals over a certain area via full duplex RF channels. For example, site S1 transceivers over area A1. Remote RF transceivers in the field (e.g., mobile or portable RF units) can communicate with units within their own area (and also, via multisite switch 200 and other sites 102, with units in other areas). The remote units also can communicate with the dispatcher consoles 106 and vice versa.

Each trunked site 102 is controlled by a site controller. The site controller is typically a centralized digital computer (although it may be a distributed processor)

that controls the radio frequency data and audio traffic handled by the site. Each site controller also communicates with the multisite switch 200. The multisite switch 200 routes communications between sites, conventional base stations and dispatch consoles. The switch allows a talker in one RF repeater site coverage area (e.g. A1 shown in FIG. 1) to communicate with a talker (listener) in another area (e.g. A2) and/or with a dispatcher manning dispatch console 202. In order to increase efficiency and traffic handling capabilities (channel utilization), the exemplary preferred multisite system preferably transmits signals only into those areas where the intended talkers/listeners are located. Moreover, in the exemplary multisite network environment, each trunked site independently assigns a specific channel to a call in coordination with channel assignments made by other sites. Similarly, the conventional base station operates on its set of assigned frequencies. Thus, a single call may involve repeater transceivers of several sites 102 (such repeater transceivers generally operating on different frequencies to avoid interference).

In the preferred multisite system 100, for example, the trunked site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller (e.g., via an "inbound" digital control message transmitted over the RF control channel) that a channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the channel assignment to the multisite network switch 200. The switch 200, in turn, sends a channel request to all other trunked site controllers. The switch also routes the call to the appropriate conventional channel for the call by keying the appropriate conventional channel. The multisite switch takes care of routing audio signals such that an audio signal pathway is created between the RF repeater servicing the caller and the RF repeater(s) servicing the callee(s) (additional audio signal pathways may also be provided such that one or more dispatch consoles 106 may become involved in the communication).

Upon receiving a channel request, these "secondary" trunked site controllers (they are "secondary" in the sense that they did not originate the call) may each assign an RF working channel to the call (e.g., if a callee designated by the caller's channel request message happens to be physically located within the coverage area serviced by the associated RF transceiving site). Similarly, a user on a conventional channel can talk back by broadcasting audio on his channel that is detected by the CIA which issues a trunked channel request within the switch for the conventional call. Meanwhile, the switch 200 has ensured that the caller's audio has been routed from the active RF receiver of site S1 to active transmitters of each of the other sites participating in the call.

As the call progresses (and depending upon the type of call), further RF transceiver operators involved in the call may begin and/or cease transmitting. Switch 200 responds to such additional transmissions by dynamically routing further audio pathways (and mixing audio where necessary) such that all RF transceivers involved in the call can hear the transmissions of all other RF transceivers involved in the call. Such additional audio routing and disconnection is performed in response to digital messages specifying "assign" or "unkey" conditions propagated by switch 200.

When the caller ends the call (or the call is otherwise terminated), the caller's site controller (or possibly the site controller of another site handling a user transmission that is part of the call) de-assigns the assigned channel and notifies the network switch 200 that the call is over. The network switch 200 propagates an "end of call" (e.g., "channel drop") command to all other site controllers. The end, "unkey", of a conventional call is when the CIA no longer detects a voice signal on the channel link. The "end of call" command results in release by all sites participating in the call of all working and conventional channels assigned to the call, and also in the multisite switch breaking all of the audio signal routing pathways associated with the call.

I. Multisite Switch Hardware

Figures 2, 18A:
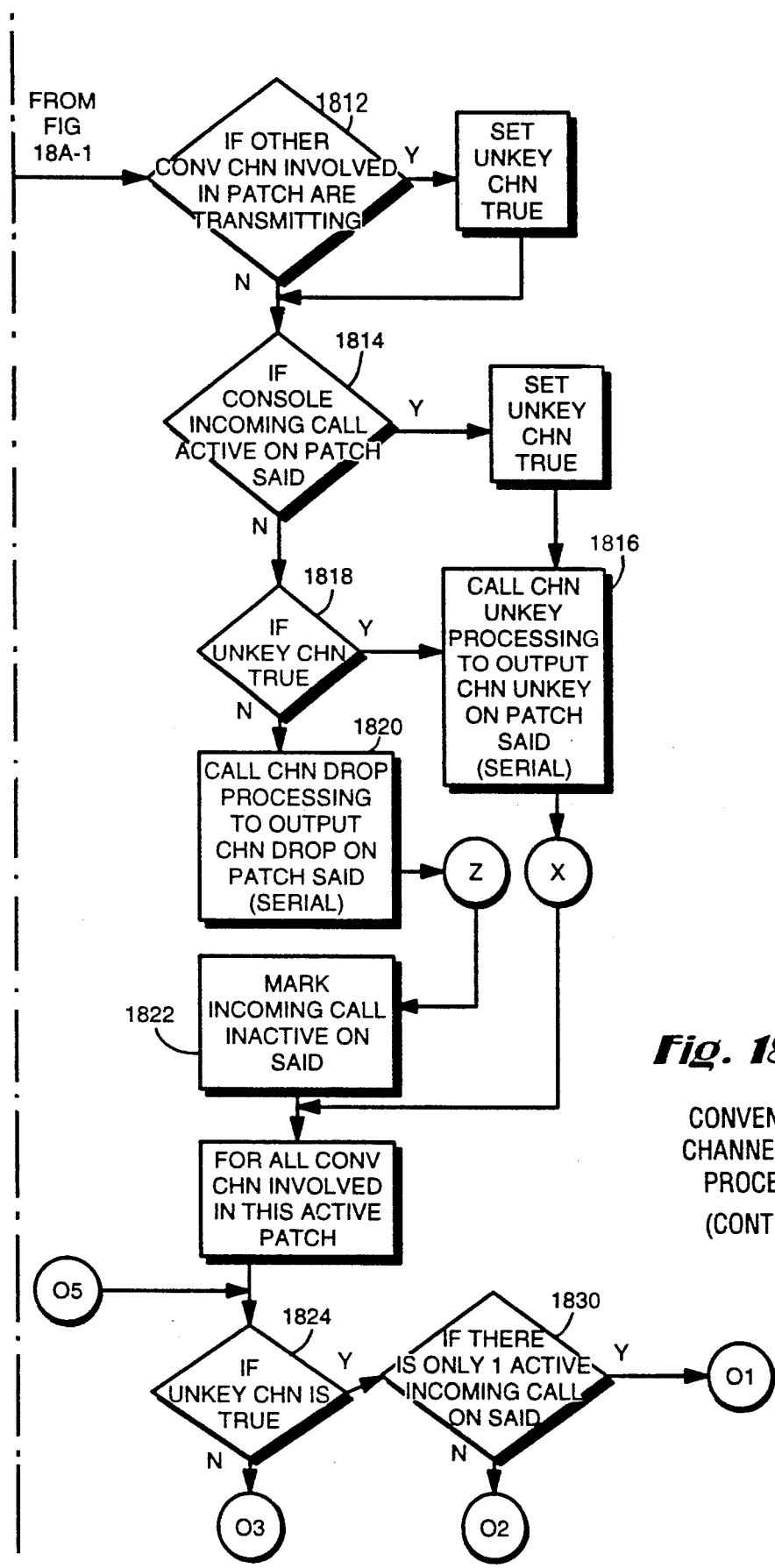
FIG. 2 is a schematic of an exemplary architecture for a distributed digitally trunked radio frequency communications system multisite switching network ("switch")
Figures 1, 18B:
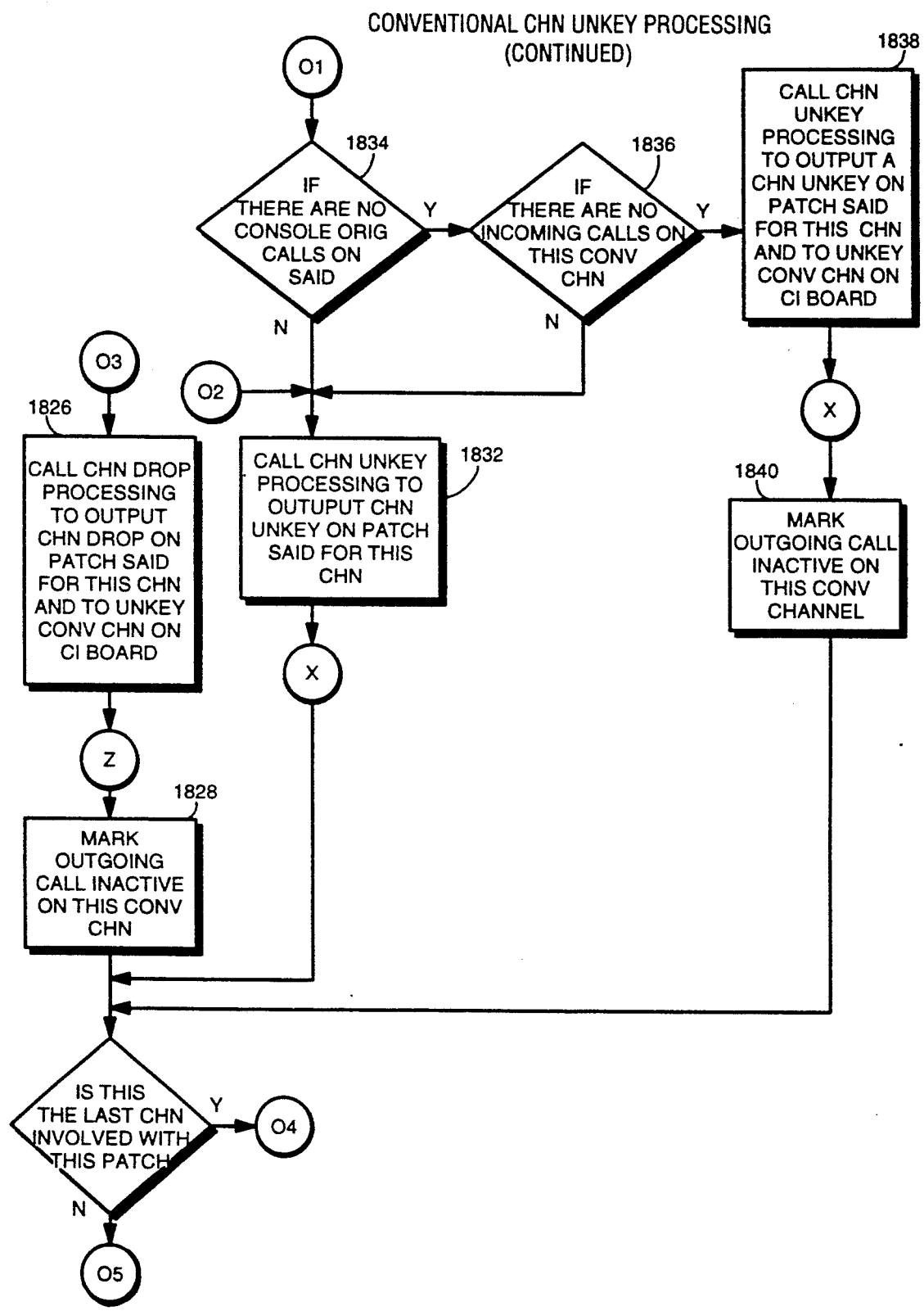
Figures 2, 18B:
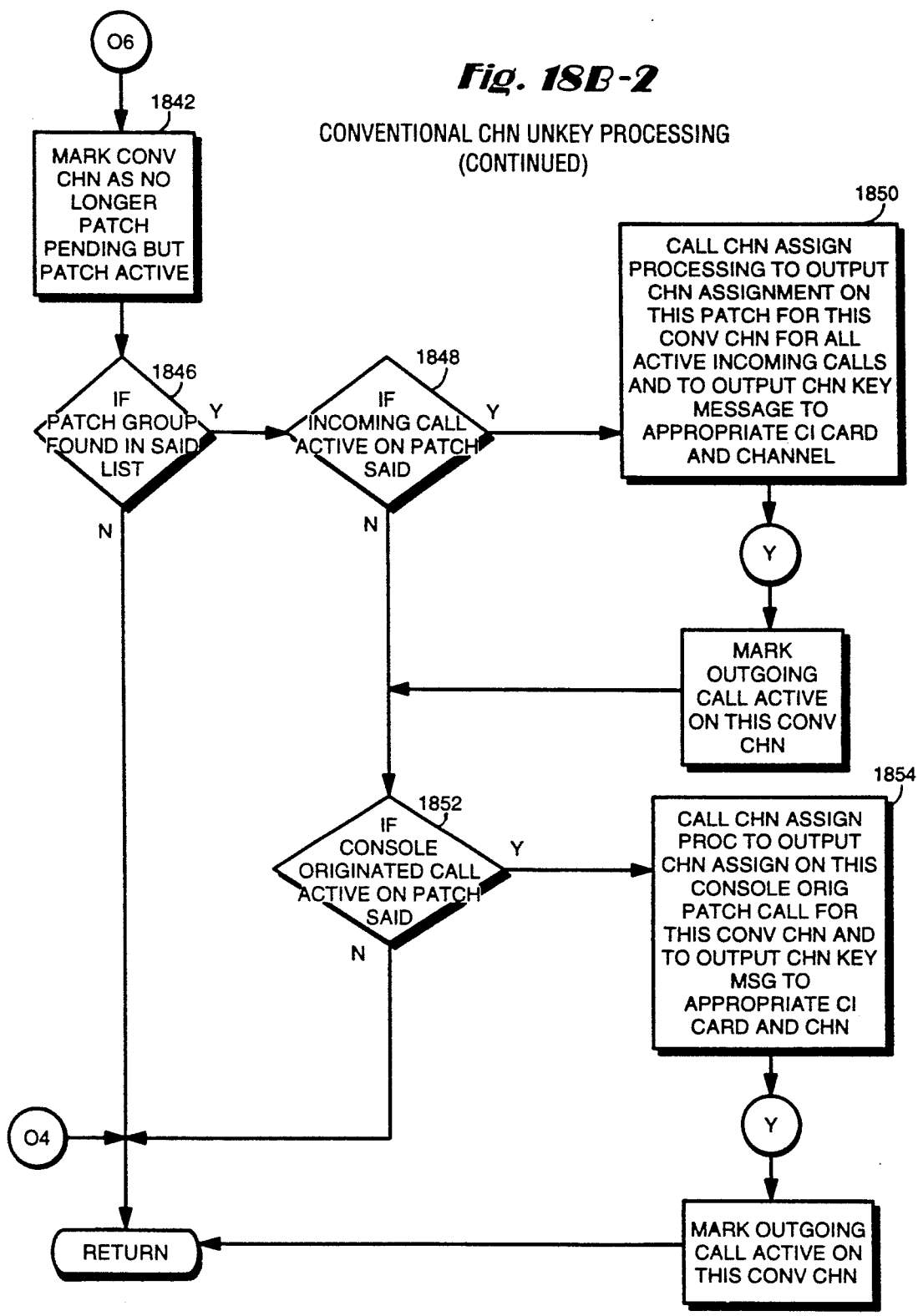

FIG. 2 is a more detailed schematic diagram of the architecture of multisite switch 200 provided by the presently preferred exemplary embodiment of this invention. The multisite switch communicates with each site controller 102 and dispatch console 202. There are data and audio communication lines between the multisite switch and each site controller and dispatcher console.

The primary responsibility of the multisite switch is to establish and remove audio connections between sites, conventional base stations and dispatch consoles. The multisite switch comprises a local area network of nodes. As shown in FIG. 2, the nodes are labelled corresponding to whether they interface with a site controller, dispatch console, conventional audio system or other system component. Of importance to this invention is the Conventional Multisite Interface Module (CVMIM) 207 which is a node that communicates with conventional base stations 215 through a Conventional Interface Adaptor (CIA) 212. The Multisite Interface Modules (MIMs) 203 are nodes in the switch that interface with site controllers and Console Interface Modules (CIMs) 204 are nodes that interface with dispatcher consoles. Other nodes in the switch include a Monitor Module (MOM) 205, Recorder Interface Module (RIM) 206, and a Switch Interconnect Module (SWIM) 208. The MOM 205 is the interface for the system manager and the MOM PC (personal computer) that have supervisory responsibility for the switch and overall radio system.

Each node in the multisite switch (and CCI) is supported by a microprocessor controlled controller module. All of the modules for the MIMs, CIMs, CVMIM, MOM, RIM and SWIM have the same hardware and are interchangeable. The modules are said to have different personalities to indicate that they are assigned to, for example, a site controller, conventional base station or a dispatch console (dispatch position). Each module can be easily configured to be a MIM, CIM, etc., by setting a few switches, and are truly interchangeable.

The nodes of the switch are each connected to a digital message bus 209 and a digital audio (TDM) network 210. The message bus 209 is shown in FIG. 2 as a message network using a conventional GSC digital messaging protocol as implemented by the Intel 80C152 Global Ser. Channel (GSC) microprocessor. Such a GSC microprocessor is used as the communications controller in the controller module in each node. The message bus 209 is a high speed data bus that interconnects the interface processors in the controller of each node.

The audio bus 210 comprises 32 time division multiplexed buses in the preferred embodiment. Each bus contains 32 slots that each carry a single audio channel. A maximum of 1024 audio slots may be routed through the switch (32 buses×32 slots), although some of the slots are used for other purposes (e.g., signalling). In the preferred embodiment, 240 channels of digitized audio are carried by audio TDM network 210 to each of the switch nodes.

The architecture and common operation of the CVMIM, MIM and CIM nodes are described in detail in Ser. No. 07/658,798 entitled "Controller Architecture for RF Trunking Distributed Multisite Switch" and Ser. No. 07/658,636, entitled "Audio Processing Architecture Within RF Trunking Distributed Multisite Switch", both of which are incorporated by reference.

Figure 3:
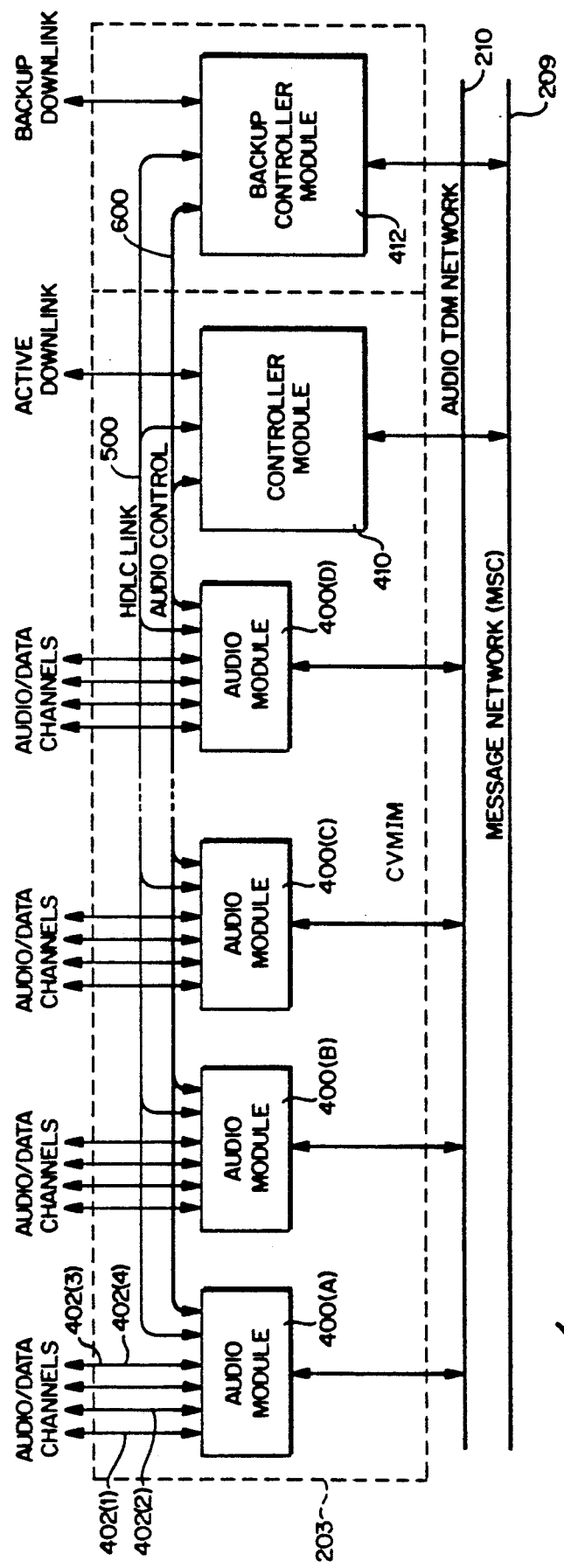
FIG. 3 is a block diagram of an exemplary architecture for a node of the multisite switch shown in FIG. 2.

As is shown in FIG. 3, the CVMIM 203 in the preferred embodiment includes a controller module 410, a backup controller module 412, and plural (preferably one to eight) audio modules 400. Each of audio modules 400 in the preferred embodiment is connected to a sister Conventional Interface (CI) audio board in the Conventional Interface Adaptor (CIA). The Conventional Interface CI audio boards of the CIA are connected via land lines (other linkage) to the channels of a conventional base station via an audio link. In the preferred embodiment, each CI board provides four distinct audio source/destination pairs. For example, in the CVMIM audio module 400(A) includes audio links 402(1)–402(4) serving associated first through fourth conventional channels via the CIA. The CVMIM audio modules 400 act as source gateways ("entrance/exit ramps") which convert audio signals incoming from the base station into digitized audio signals (PCM) and place the digitized audio signals onto the audio TDM network 210. These same audio modules 400 act as audio destinations by taking selected signals from the audio TDM network 210, converting them from digital into analog form, and providing the resulting analog signals to the CIA which, in turn, provides the signals to the appropriate conventional channel for transmission by the base station.

The CVMIM controller module 410 communicates with each of the four audio modules 400 via a common HDLC link 500 and an audio control link 600. The HDLC link 500 carries 360 K-bit serial data using HDLC protocol between the controller 410 and the audio modules 400. This HDLC link 500 is used in the preferred embodiment to, for example, carry fault indications and messages relating to RF "channel" (i.e., channel hardware) status between the audio modules 400 and the controller module 200 (additional general purpose I/0 links not shown may be provided between the RF site and the audio modules to convey digital alarm and status messages if desired). Audio control link 600 permits the controller module 200 to set low-level parameters (e.g., level adjustment, TDM slot assignment, etc.) within each audio module 400 (e.g., without having to obtain the cooperation of a processor installed on-board each of the audio modules).

FIG. 4 shows a block diagram of an exemplary architecture for controller 410 in the CVMIM. Each controller 410 includes a communications controller 301, a dual-port random-access-memory (RAM) 302 and an interface microprocessor 303. The communications controller 301 is a message router in the preferred embodiment. It routes messages between the control message bus 209 and the interface processor 303 (the dual-port RAM 302 is used to communicate between the communications controller and the interface controller 303). In the present embodiment, the communications controller 301 is an Intel 80C152 GSC microprocessor. The communications controller 301 is coupled to the GSC message bus 209. This controller 301 places messages onto the bus and receives messages from the bus. Messages received from the CIA over the serial port 304 are translated into a format usable by the multisite switch. The communications controller also translates switch messages into a format that the CIA understands.

The interface processor 303 performs substantially all logical functions for the CVMIM. In effect, the interface processor is the intelligence for the CVMIM. Interface processor 303 in this embodiment is an Intel 80C186 microprocessor. The interface microprocessor 303 assigns TDM network channels to RF transceivers by controlling the audio modules 400 in the node via the parallel audio control bus 600. The interface processor 303 for each CVMIM assigns slots for audio routing purposes, connects audio slots to the conventional channels to establish a communications link, and terminates slot assignments (note that each CVMIM is preassigned a set of TDM bus slots for outputting audio signals onto, and these slots are not assigned and de-assigned during the course of normal call routing). Since all CVMIMs, MIMs and CIMs perform these functions, they must continually inform each other and the other nodes of their slots assignments. Accordingly, the CVMIMs, MIMs and CIMs send messages regarding slot assignments, slot updates and slot idles over the message network 209 to other nodes.

The communications controller 301 for each MIM 203 initially processes all of the messages on the message network. Slot assignments are forwarded to the interface processor 303 through the dual-port RAM. Redundant slot update/slot idle messages are not forwarded to the interface processor by the communications controller. Messages regarding slot updates or idle slots are processed by the communications controller 301 by referring to a slot bit map (database) located and maintained in the dual-port RAM storage 302. By referring to the slot bit map, the communications controller 301 determines whether the slot status message conveys redundant information already known to the node, or if the slot status message conveys new information about the slot. Update messages are sent periodically by CVMIM or MIMs 203 hosting calls to confirm, to the other MIMs, CIMs and CVMIM the active status of a slot. When a host CVMIM terminates a call, it sends a slot assignment and/or idle message to the other nodes. The primary CVMIM also periodically resends idle messages until the slot is reassigned to another call. Thus, all nodes are continually informed of the status of all slots that have been assigned at least once.

Figure 5:
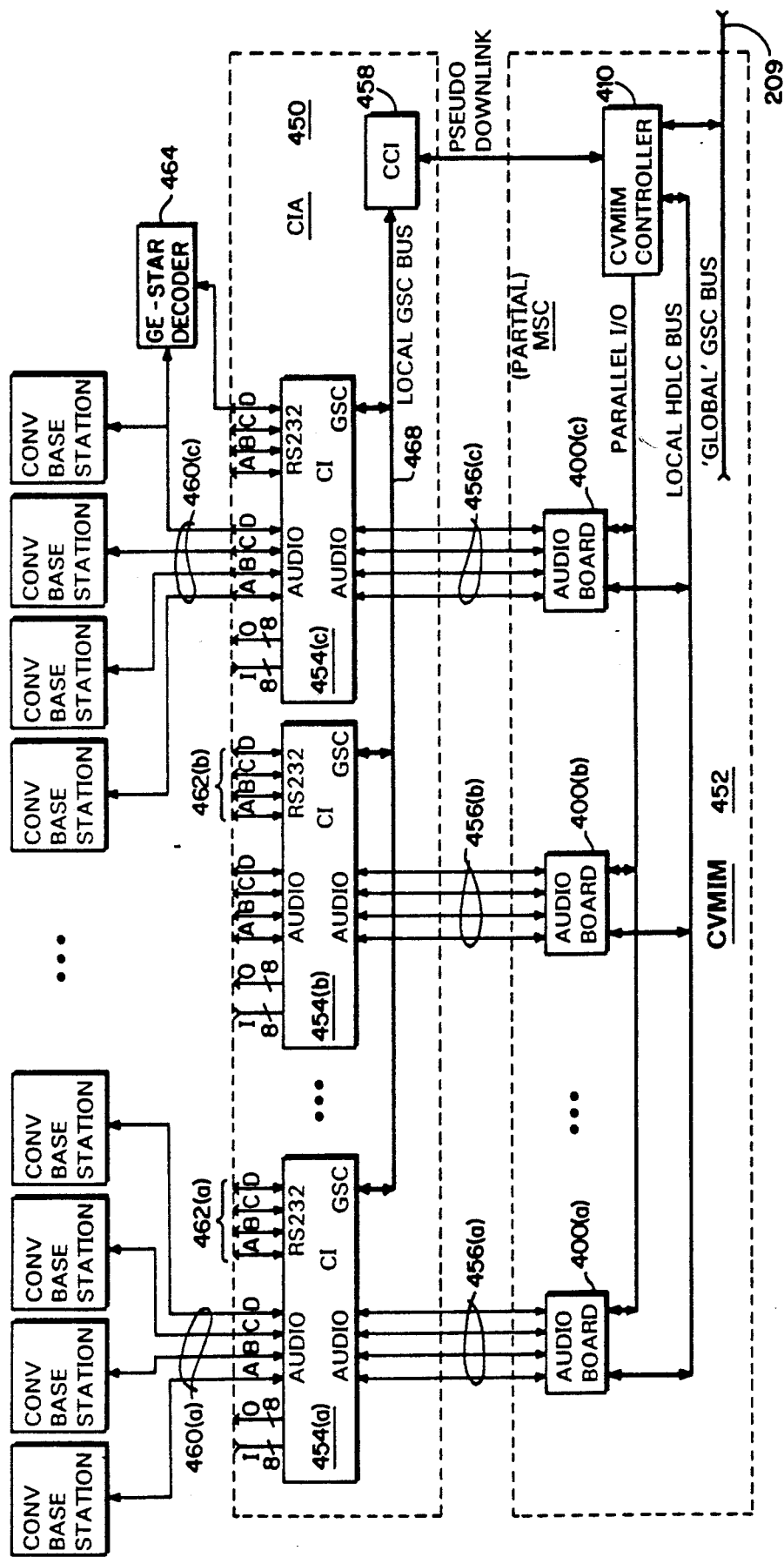
FIG. 5 is a detailed block diagram of a single exemplary node of a Conventional Interface Adaptor (CIA) and a Conventional Multisite Interface Module (CVIM)

FIG. 5 is a block diagram of a CIA 450 coupled to a CVMIM node 452 in the preferred embodiment. The CIA has a sister CI audio board 454 for each of the audio boards 400 associated with the CVMIM. The audio boards are connected via analog audio lines 456. In the preferred embodiment, each audio board supports four channel lines. The CI audio boards are interconnected via a local GSC bus that carries control messages between the boards and the Conventional Capabilities Interface (CCI) 458 within the CIA. The CCI is a controller board that is the same as the controller boards in the CVMIM. The CCI translates commands from the CVMIM into commands recognizable by the CI boards. The CI boards in turn pass control commands on to the base stations 460. The CCI also translates messages from the CI boards into messages recognizable by the CVMIM. To the CVMIM controller, the CCI is a pseudo downlink to a trunked site controller. It is the CCI that converts the commands for a digitally trunked system into commands for a conventional base station and visa-versa.

The CI audio boards 454 are connected to a plurality of channel lines from the base station(s). In the preferred embodiment, each CI can receive four channels over either 2- or 4-wire lines 460. Thus, the CI can support full duplex conventional radio operations. In addition to the audio lines, each CI has four RS232 ports 462 to the base station that it supports. In the preferred embodiment, these ports allow a GE-Star decoder 464 to convey decoding data to and from the multisite switch for encrypted conventional calls using the GE-Star decoding technique. In other embodiments, these ports 414 can be used to carry other data between the base station and the multisite switch.

Figure 6:
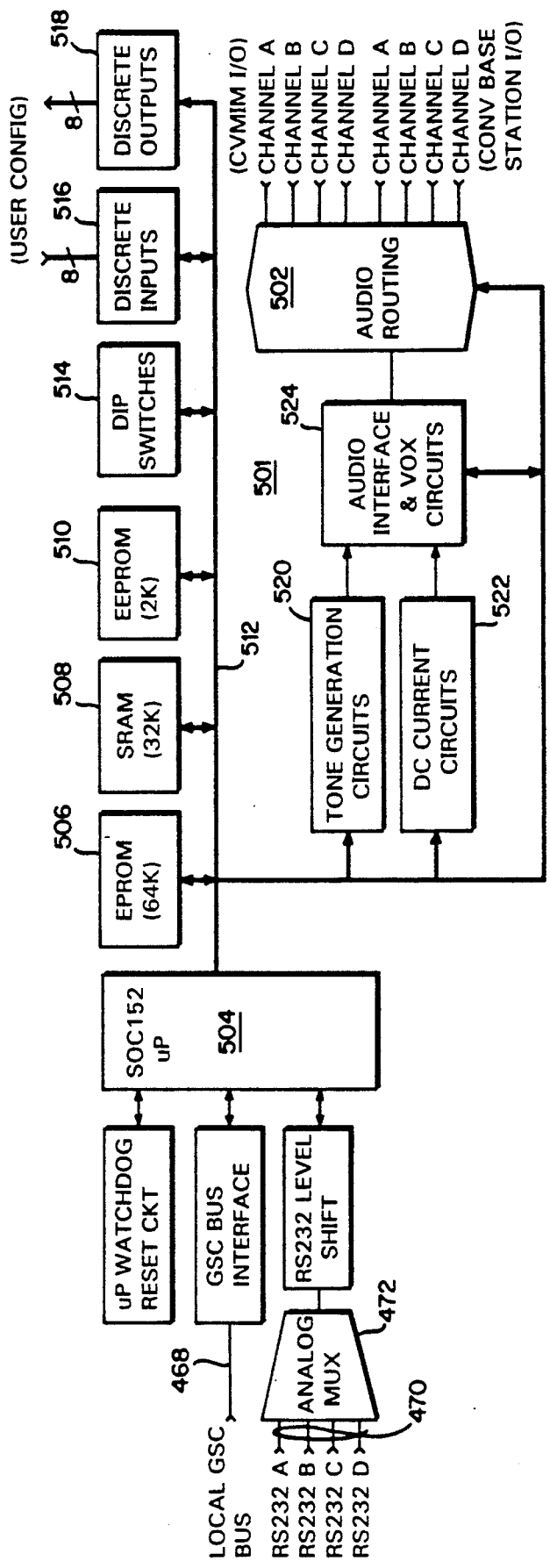
FIG. 6 is a detailed block diagram of the control architecture of the Conventional Interface (CI) board of the CIA shown in the FIG. 5.

FIG. 6 shows a block diagram of the controller architecture on each CI board. Each CI has its own controller 501 to support the audio processing and routing circuitry 502. A microcontroller 504 is at the heart of the CI controller. The microcontroller 504 in the preferred embodiment is an INTEL 80C152 microcontroller. This microcontroller is supported by several external memories, including an EPROM 506, a static RAM (SRAM) 508, and an EEPROM 510. These memories hold the operating programs for the microcontroller, provide scratch pad memory and hold other data used by the microcontroller. The operating programs are described in detail below. An internal address and message bus 512 connects the microcontroller to its external memories. This bus 512 also connects the microcontroller to DIP switches 514 that are used to set the personality of the CI board and to a discrete inputs 516 and outputs 518 for an I/O user configuration interface 416 to the base station. At the present, the I/O port is used to support E&M signalling.

The CI microcontroller 504 communicates with the CCI over the CIA's local GSC bus. Similarly, the CI microcontroller communicates information, e.g., decode data, directly with the base station over a series of serial links 470 that are multiplexed 472 into the microcontroller.

The microcontroller 504 operates the tone generation circuits 520 and DC current circuits 522 that provide control commands for the conventional base station. As previously stated, conventional base stations are generally either controlled by sub-audible tones added to the audio signal or to DC currents applied to the channel lines to the base station. At startup, the microcontroller receives information identifying whether the base station is controlled by tones or DC currents, has 2/4 wire channel links and has E&M signalling. The tone or DC current controls are combined with the audio and VOX (voice activated relay) signal in circuits 524. The VOX detects audio on a conventional channel and sends a signal (equivalent to the signal in trunked systems) to the CVMIM indicating that the channel has been keyed or unkeyed. The combined audio signal is routed to the CVMIM or base station via audio routing circuits 502.

Figure 7:
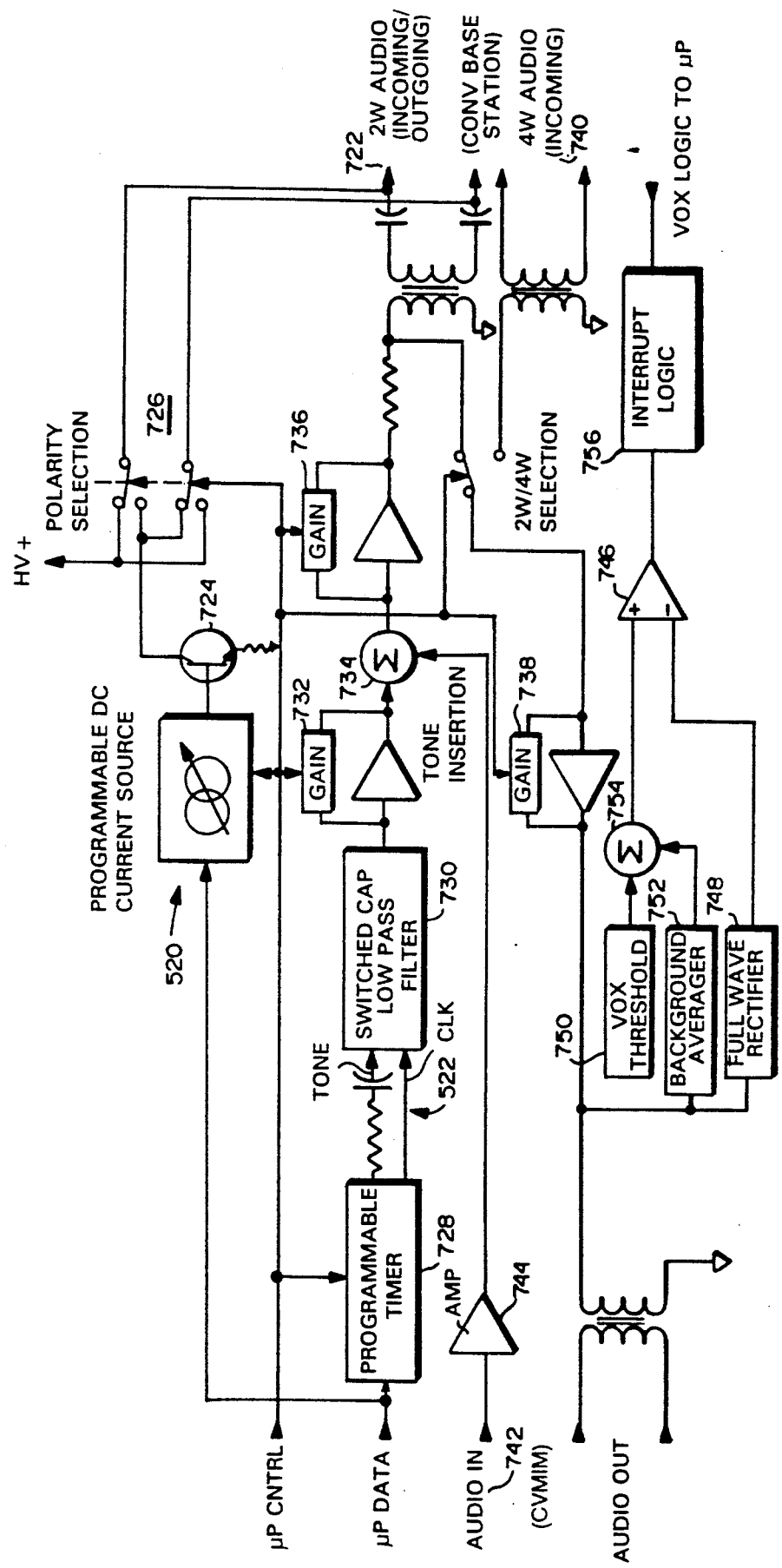
FIG. 7 is a detailed schematic diagram of an exemplary circuit for processing a single channel through the CI of the CIA shown in FIG. 5.

FIG. 7 is a schematic diagram of one of the audio processing circuits on the CI audio board. The DC current generation circuit 520 is, in the preferred embodiment, a programmable DC current source that applies a selected current to the channel line 722 to control the conventional base station via transistor 724 and polarity selector switch 726. Microcontroller 504 provides data (up DATA) and control commands (up CNTRL) to set the amount of current from the DC current source and to set the polarity switch so that the current is applied with the appropriate polarity to the channel line. Similarly, the tone control circuits 522 comprise a programmable timer 728 and a switched cap two-pass filter 730. The microcontroller 504 sets up the timer so that the timer provides the appropriate tone to be applied to the audio channel to the low-pass filter which passes the tone. The timer also provides clocking information to the filter for its clock reference. A clock reference is needed by the filter for square wave to sine wave conversion. The tone is applied by a digital EE pot gain 732 set by the microcontroller, and the tone is added to the outgoing audio signal in summer 734. The microcontroller also sets the gain (digital EE pots 736, 738) on the amplifiers for incoming and outgoing audio. Thus, the gain applied by the CI boards can be remotely controlled via the microcontroller 504. The CI supports 2-wire 722 and 4-wire (full duplex) 740 channel lines to the base station. The CI microcontroller sends command signals to select 2-wire or 4-wire mode.

Audio coming from the CVMIM is amplified at 744 and summed with control tone before being sent out over the appropriate conventional channel line. Audio coming from the base station is passed directly to the CVMIM with an appropriate amount of gain. In addition, the CI detects audio with a VOX (voice activator relay) and then signals the microcontroller 504 that audio is present. The VOX is a comparator 746 that compares the rectified audio 748 to the sum 754 of a VOX threshold 750 and the average background noise 752 on the line. If the rectified voice audio exceeds this sum, then the comparator causes an interrupt logic 756 to signal the CI microcontroller that the channel has been keyed. A similar interrupt occurs when the voice audio stops and, thus, the rectified audio falls off. Thus, the CI microcontroller is told that the channel has been unkeyed.

The CCI is programmed to mimic the downlink trunking card of a trunked site controller. The CCI generates many of the same digital messages that are generated by a trunked downlink trunking card and sends these messages via a serial link to the controller card of the CVMIM. The CCI also communicates with the CI audio boards in the CIA via a GSC message bus. The CI boards, for example, send messages to the CCI when an audio signal is detected on a conventional channel. The CCI generates an appropriate digital channel request that is sent to the CVMIM. Similarly, upon receiving a digital message from the CVMIM, the CCI sends a message on the CIA message bus instructing one of the CI boards to generate a tone or a DC voltage level for a particular channel. In this way, the CCI is able to translate control information between a digital multisite switch and a conventional base station.

II. Unique Messages On Multisite Message Bus For The CVMIM and CIA

The messages on the multisite message bus that are intended solely for the CVMIM and CIA have a unique data structure. The CVMIM also handles many of the same messages handled by the other switch nodes. Each conventional message has one of two message identifications, shown below, followed by a message sub-identification (sub-id) defining the message itself. A description of many of the other multisite messages is contained in S. No. 07/658,641 entitled "Data Protocol and Monitoring System for RF Trunking Multisite Switch Global Ser. Channel."

The CVMIM message format allows non-CVMIM nodes in the trunked multisite switch receiving the message, but not needing the conventional message, to filter out the message without having to switch on each individual message sub id.

| Node sends: | CONV_MSG_TYPE (155) |
| | CONV_MSG_RESP (156) |
| # Bytes | Field Function |
| (1) | message_id CONV_MSG_TYPE or CONV_MSG_RESP |
| (1) | msg_sub_id message sub id |
| (1) | site initiating/receiving site |
| (1) | node_id initiating/receiving node id |

II(a) Conventional Base Station Control

This data structure is used to control a conventional base station from a console dispatch. All messages are initiated from a console via a CIM and are responded to from the Conventional Interface (CI) board.

| Console sends msg_sub_id: | REMOTE_ENABLE | (1) |
| | REMOTE_DISABLE | (2) |
| | REPEAT_ENABLE | (3) |
| | REPEAT_DISABLE | (4) |
| | CG_ENABLE | (5) |
| | CG_DISABLE | (6) |
| | CG_MON_LATCH | (7) |
| | CG_MON_PTT | (8) |
| | SCAN_ENABLE | (9) |
| | SCAN_DISABLE | (10) |
| | SIM_MON_ENABLE | (11) |
| | SIM_MON_DISABLE | (12) |
| | SET_RX_FREQ_1 | (13) |
| | SET_RX_FREQ_2 | (14) |
| | SET_RX_FREQ_3 | (15) |
| | SET_RX_FREQ_4 | (16) |
| | SET_TX_FREQ_1 | (17) |
| | SET_TX_FREQ_2 | (18) |
| | SET_TX_FREQ_3 | (19) |
| | SET_TX_FREQ_4 | (20) |
| | ICOMM_TX | (22) |
| # Bytes | Field Function | |
| (1) | chn channel (1-32) | |
| (1) | status status | |
| The Conventional Interface (CI) responds with | | |
| msg_sub_id: | REMOTE_ENABLE | (1) |
| | REMOTE_DISABLE | (2) |
| | REPEAT_ENABLE | (3) |
| | REPEAT_DISABLE | (4) |
| | CG_ENABLE | (5) |
| | CG_DISABLE | (6) |
| | CG_MON_LATCH | (7) |
| | CG_MON_PTT | (8) |
| | SCAN_ENABLE | (9) |
| | SCAN_DISABLE | (10) |
| | SIM_MON_ENABLE | (11) |
| | SIM_MON_DISABLE | (12) |
| | SET_RX_FREQ_1 | (13) |
| | SET_RX_FREQ_2 | (14) |
| | SET_RX_FREQ_3 | (15) |
| | SET_RX_FREQ_4 | (16) |
| | SET_TX_FREQ_1 | (17) |
| | SET_TX_FREQ_2 | (18) |
| | SET_TX_FREQ_3 | (19) |
| | SET_TX_FREQ_4 | (20) |
| | ICOMM_TX | (22) |
| # Bytes | Field Function | |
| (1) | chn channel (1-32) | |
| (1) | status return status of command | |

II(b) Conventional EE Pot Control

The Conventional EE Pot Control message is used to adjust the transmit/receive gains on the Conventional Interface (CI) board. These gains are set by digital pots that can be adjusted by digital commands from the MOM PC.

| MOM sends msg_sub_id: | INCREMENT_EE_POT | (33) |
| | DECREMENT_EE_POT | (34) |
| | SET_EE_POT | (35) |
| | WRITE_EE_POT | (36) |
| # Bytes | Field Function | |
| (1) | chn EE Pot channel to adjust | |
| (1) | tx_rx transmit / receive Pot | |
| (1) | count amount to adjust pot. | |
| MOM receives msg_sub_id: | INCREMENT_EE_POT | (33) |
| | DECREMENT_EE_POT | (34) |
| | SET_EE_POT | (35) |
| | WRITE_EE_POT | (36) |
| # Bytes | Field Function | |
| (1) | chn EE Pot channel adjusted | |
| (1) | tx_rx transmit / receive Pot | |
| (1) | count new EE Pot level | |

II(c) Conventional CI EE Pot Levels

This message is initiated from the CI board and is used to report the EE Pot levels at startup to the MOM PC.

| CI sends: | CI_EE_POT_LEVEL (37) |
| # Bytes | Field Function |
| (1) | chn channel (1-32) |
| (1) | tx_rx transmit / receive Pot |
| (4) | ee_levels levels for each of 4 channels |

II(d) Conventional Controller Interface (CCI) Configuration/Status

The following messages are used to determine the status of the CCI card. The MOM PC sends the CCI its conventional site number and the CCI reports to the MOM when it's reset.

| MOM sends: | CCI_CONFIG (38) |
| # Bytes | Field Function |
| (1) | conv_site conventional site # (1-2) |
| CCI sends: | CCI_RESET (39) |
| # Bytes | Field Function |
| (1) | conv_site conventional site # reset |

II(e) CI Configuration

The CI Configuration message is used by the MOM PC to configure each each individual CI channels for the conventional base station.

| MOM sends: | CI_CONFIG (40) |

-continued

| # Bytes | Field Function |
|---|---|
| (1) | chn channel to configure |
| (1) | config configuration 2/4 wire, tone/DC/ coupled/non-coupled, E&M signaling |

II(f) Conventional Initialization Messages

The following data structure precedes all conventional initialization messages throughout the switch. Each message has a message identification (id) of $CONV_{13}INIT_{13}MSG$. This message format allows nodes in the system receiving the message, but not needing the message, to filter out the message without having to scan through each individual message sub id.

| Node sends: | CONV_INIT_MSG (157) |
|---|---|
| # Bytes | Field Function |
| (1) | message_id CONV_MSG_TYPE or CONV_MSG_RESP |
| (1) | command program command |
| (1) | conv_site receiving conventional site |
| (1) | node_id initiating node id |
| (1) | chn channel to program |

II(g) Conventional DC Program Control

The Conventional DC Program Control message is used to program a Conventional Interface (CI) card for a DC current controlled base station. The message is initiated by the MOM PC and transmitted to the CI card.

| MOM sends: | CONV_INIT_MSG (157) |
|---|---|
| # Bytes | Field Function |
| (7) | dc_level DC levels: −11mA −6mA −2.5mA 0mA +2.5mA +6mA +11mA |

II(h) Conventional Tone Program Control

The Conventional Tone Program Control message is used to program a CI card for a tone base station. The message is initiated by the MOM PC and transmitted to the CI card.

| MOM sends: | CONV_INIT_MSG (157) |
|---|---|
| # Bytes | Field Function |
| (11) | tone_frq Tone frequencies: 1050 Hz 1150 Hz 1250 Hz 1350 Hz 1450 Hz 1650 Hz 1750 Hz 1850 Hz 1950 Hz 2050 Hz |

III. CCI Algorithms

Figure 8A:
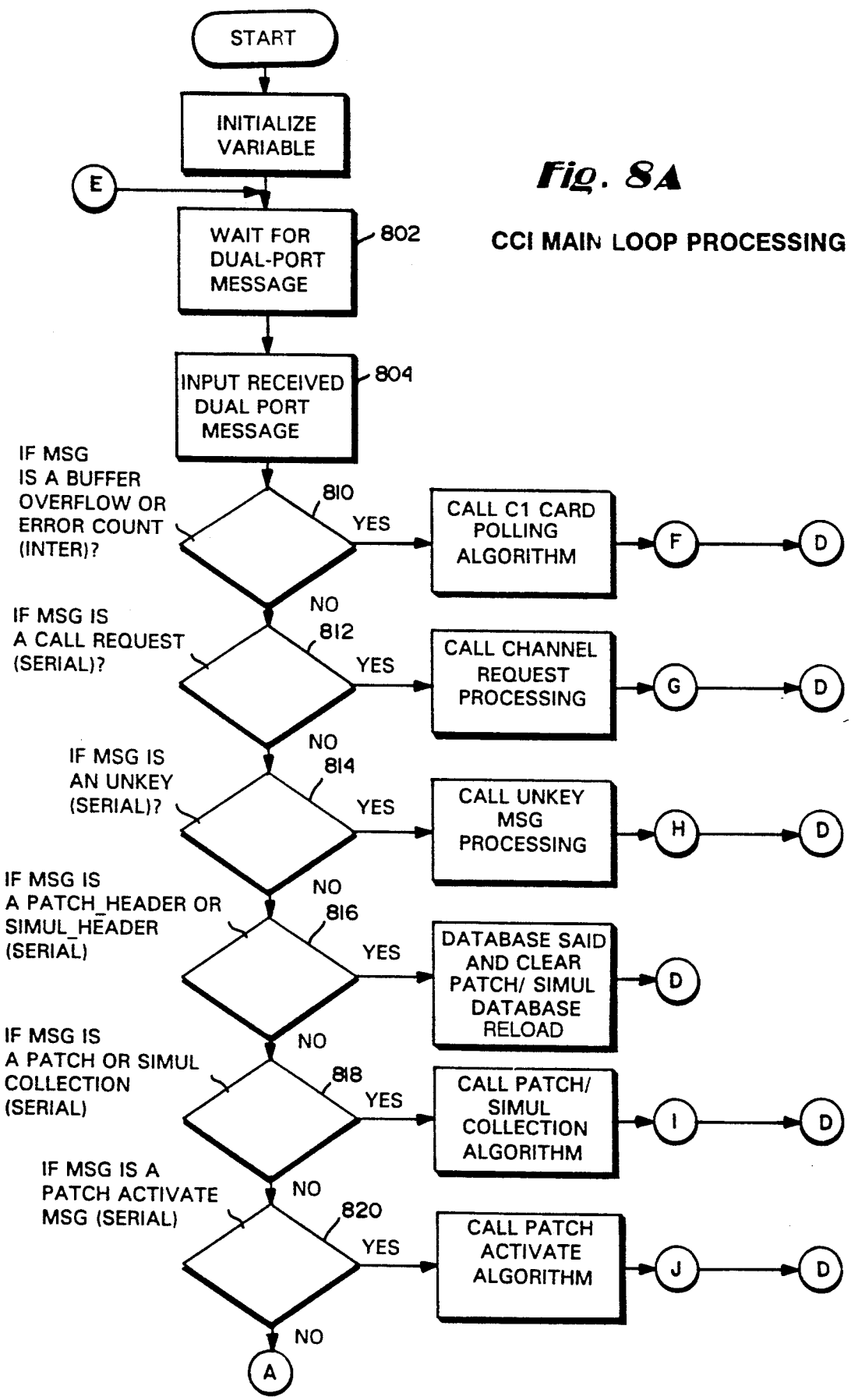
Figure 8B:
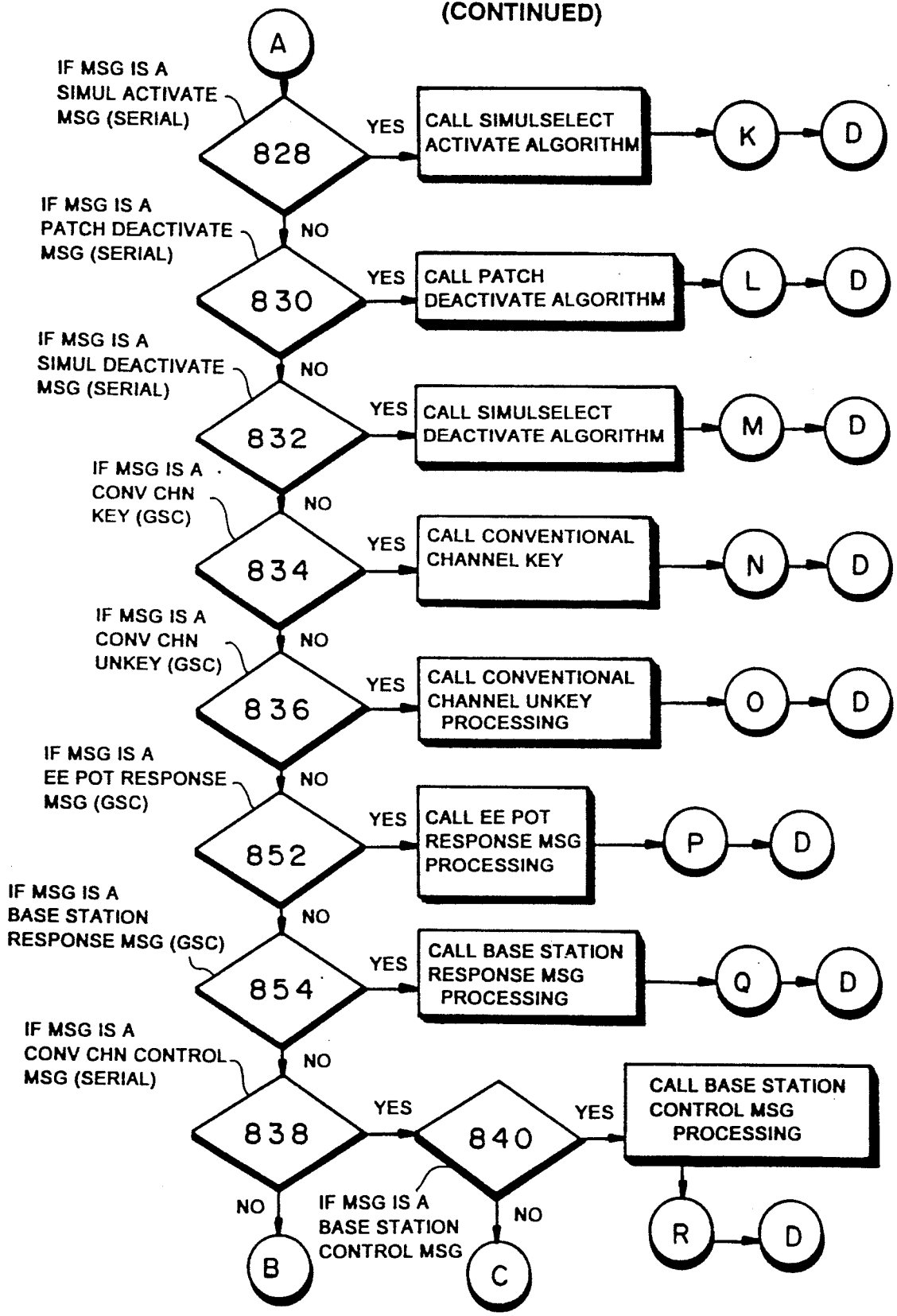
Figure 8D:
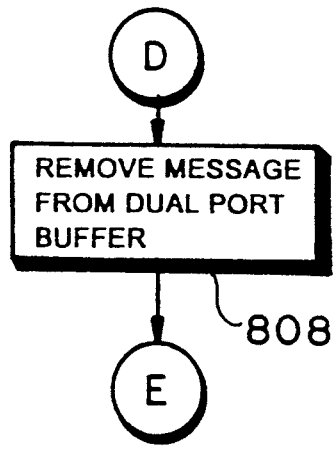

FIG. 8 is a flow chart of the main loop processing for the '186 microprocessor in the CCI. The '186 microprocessor waits to receive a message from the dual-port RAM that connects this processor to the CCI microcontroller. Accordingly, at start up and after it has initialized its variables, the microprocessor waits in step 802 for a message in the dual-port RAM.

The dual-port RAM is arranged so that the dual-port address of a message for the microprocessor indicates whether the message came from the CVMIM over the serial link, the CI board over the local GSC bus or is a message generated by the microcontroller. Similarly, the microprocessor places messages in the dual-port RAM depending upon whether the message is for the CVMIM, a CI board or the microcontroller. The manner in which the dual-port RAM operates and in which the microcontroller loads messages in the dual-port RAM to and from the serial link to the CVMIM and to and from the CIA's internal message bus in the controller cards of the preferred embodiment is more fully described in Ser. No. 07/658,798, entitled "Controller Architecture For RF Trunking Distributed Multisite Switch." This application also describes in detail the hardware for the CCI.

In step 804, upon being told by the dual-port RAM that a message is pending, the CCI microprocessor inputs the message from dual-port RAM into its local RAM. As is evident from FIGS. 8A through C, there is a variety of messages that the microprocessor receives. These messages can be generated internally within the CCI, such as a dual-port RAM buffer overflow or error count message in step 810; by the CVMIM and sent to the CCI over the serial downlink (serial messages); and by the CI audio boards from data obtained from the conventional base station. Upon completion of the routines executed in response to a message, the microprocessor removes the message from the dual-port buffer in step 808 (FIG. 8D) and waits for the next message in the dual-port RAM.

Figure 9:
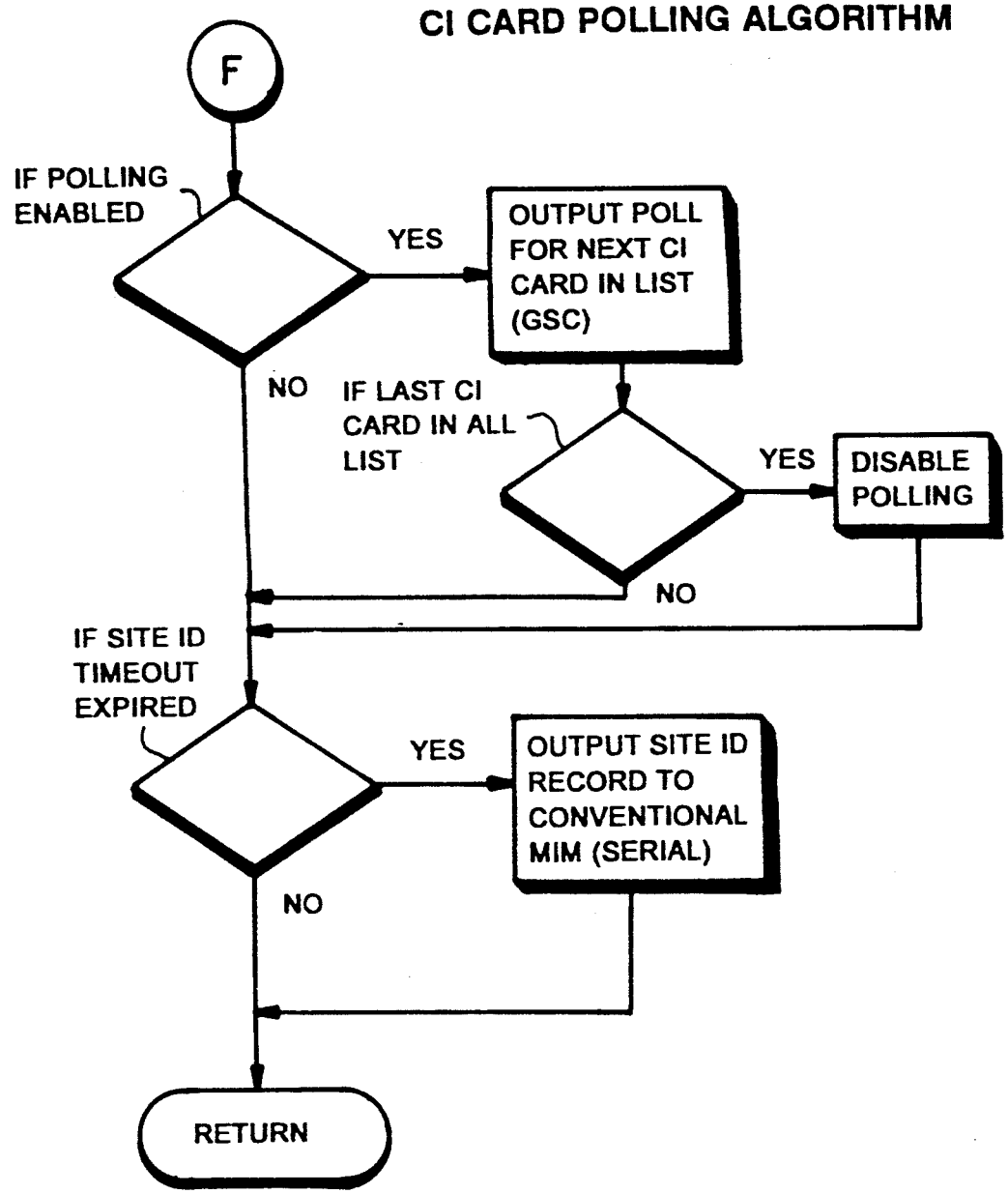

If the message is that the serial message buffer is overfilled or that there is a error in the count used to check the serial link, then in step 810 the microprocessor calls up the CI card polling algorithm outlined in FIG. 9.

CI card polling is a technique used by the CCI to determine the status of the CI boards within the CIA. If a CI card responds to a poll, then the CCI knows the CI board is still properly executing. If no response is received, the CCI may bring up a redundant CI board (if one exists) to replace the non-responsive board. The CCI will also report the CI board's failure to the MOM PC.

CI card polling is controlled by the receipt of buffer overflows or error counts received from the 80C152 communications controller. These messages are received every 390 milliseconds from the controller. This provides the CCI with a frequency to control its polling algorithm. A different CI board is polled every 390 milliseconds. The same frequency is used for transmitting the site ID record to the CVMIM. The side ID timeout expires every fifth cycle of messages which occurs every 1.95 seconds. After each fifth cycle, the site ID record is transmitted serially to the CVMIM. This site ID record informs the multisite switch of the site's (CCI) status. In a trunked site, the principal indication of a missing site ID is that the site is operative in a failsoft mode (i.e., individual trunking controllers operate without an operating site controller). While this failsoft has no meaning for a conventional base station, the absence of a site ID record for the conventional base station tells the switch to operate in a pure trunking environment. In other words, the absence of the site ID record will indicate a site (CCI in this case) is down.

Figure 10B:
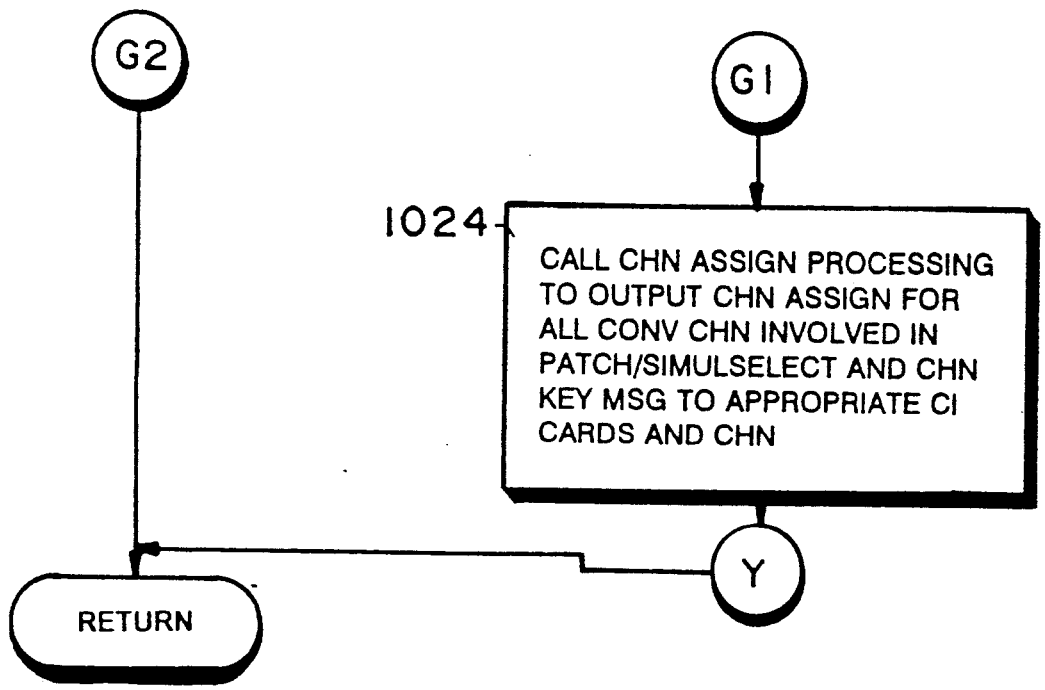

When the CCI microprocessor receives a call request for a conventional channel from the CVMIM in step 812, it executes a routine (FIGS. 10A & B) to request and assign the multisite call to a conventional channel in the base station. If the request is solely for a conventional call, step 1002, then the microprocessor checks whether the requested conventional channel is a valid channel and whether the requested channel is already patched into another call. If, in step 1004, the requested channel is already participating in a patched call, then the existing patch is deactivated through a patch deactivation algorithm shown in FIGS. 15A & B.

Figure 15A:
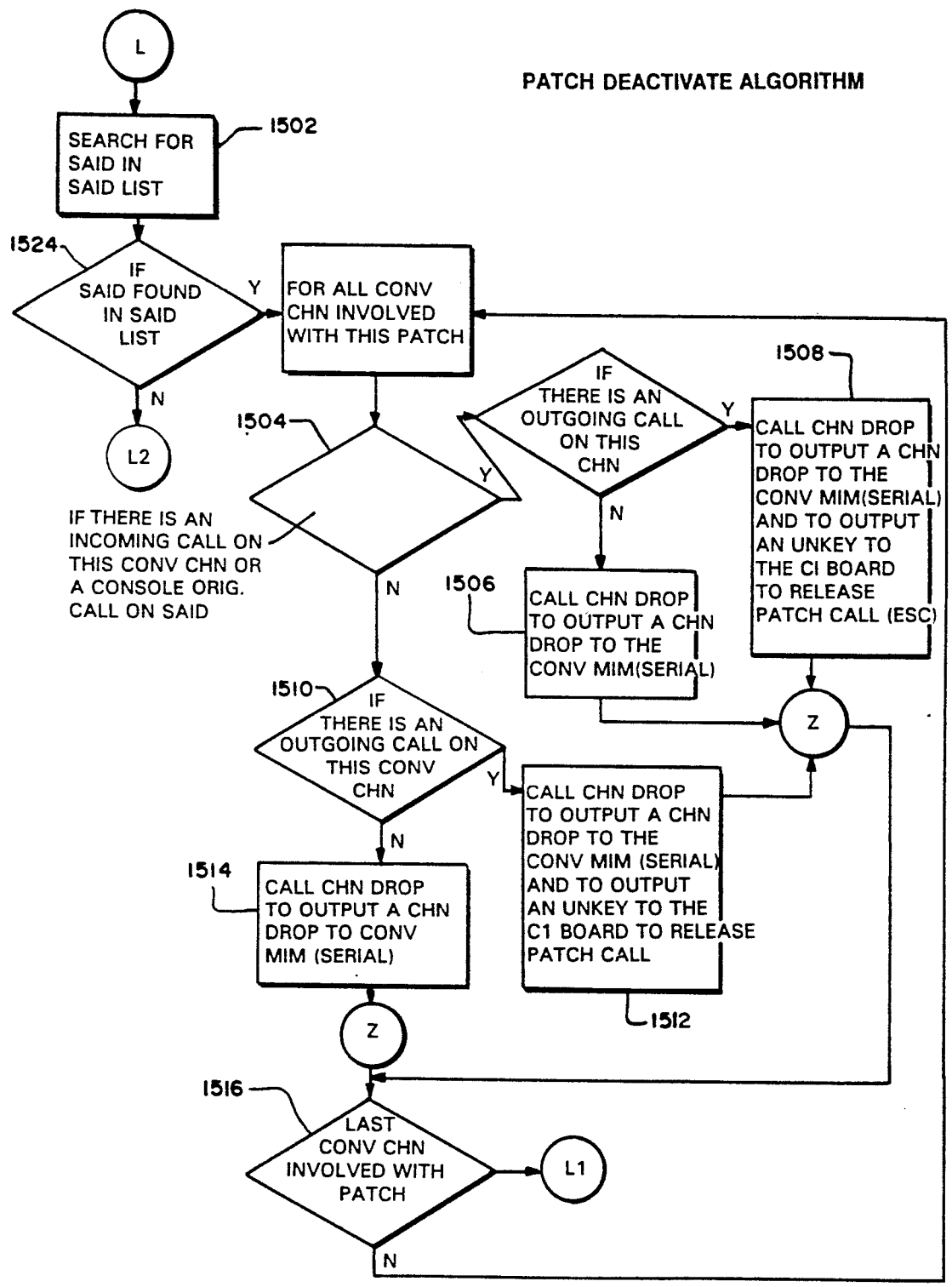

FIGS. 15A and B show the the patch deactivate algorithm. Dispatch consoles set up patch calls so that more that one unit and/or more that one group can participate in a call. Patch calls are similar to simulselect calls. However, in a patched call all of the units participating in the patched call can talk to each other. In a simulselect call, only the dispatcher has the ability to talk to remote units and the participating units may not talk to each other. The remote units in a simulselect call can talk to the dispatcher.

To deactivate a patch call, the microprocessor first checks whether the system assigned identification (SAID) for the patch call is in its SAID list, step 1502. A SAID is a system assigned ID and is formed by the console requesting the patch or simulselect. The SAID list is built by the CCI as console dispatchers activate and deactivate patches and simulselects. Assuming that the patch call SAID is in the SAID list, then the CCI microprocessor executes a routine to issue channel drop messages to the CVMIM (Conv. MIM) and, where necessary, unkey messages to the conventional base station. For each conventional channel active in the patch call, the microprocessor, in step 1504, determines whether there is an incoming call from the base station or a console originated call and, if so, calls up a routine to output a channel drop message to the CVMIM in steps 1506 and 1508. In addition to a channel drop, in step 1508, an unkey message is sent to the CI board to release the channel from the patch call. In step 1510, if there is an outgoing call on the conventional channel from the multisite switch to the base station, then a channel drop message is sent to the CVMIM and an unkey message is sent to the CI board in step 1512. In any event, at least a channel drop message is sent to the CVMIM in step 1514. Thus, the requested conventional channel is fully released from the prior patch call.

To generate a channel drop message to the CVMIM and a channel unkey message to the CI board, the CCI microprocessor calls up the channel drop routine shown in FIG. 29. If an unkey message is required, then the microprocessor sends an unkey message on the CIA's internal GSC message bus to the appropriate CI board which, in turn, unkeys the channel in step 2902. In addition, a channel drop message is outputted to the CVMIM. A channel primitive is the data structure for outputting channel assignments, channel drops and channel unkeys. After processing a drop message, the CCI's microprocessor returns to the patch deactive algorithm to deactivate the remaining conventional channels involved in the prior patch call.

In FIGS. 15A and B, once all conventional channels have been deactivated, step 1516, the CCI microprocessor sends a patch inactive message to the CVMIM, step 1518, so that it can inform the MOM that the patch no longer has any active conventional channels. All incoming calls from the conventional base stations that were participating in the patch are converted to regular conventional calls by calling the channel assignment routine and the SAID status for the patch is changed to inactive in steps 1520 and 1522. Similarly, if the conventional channel is not a patch call, i.e., not on the SAID list, step 1524, then the CCI sends a patch inactive message to the CVMIM to remove the call from the patch list in step 1526. After the patch call is inactivated, then the CCI microprocessor sends a conventional channel assignment, FIG. 28, to the CVMIM in step 1006. Once a channel has been assigned, the CCI microprocessor marks the incoming call as being active in step 1008.

If the call is a group call, e.g., patch or simulselect call, in step 1010, then the CCI first checks that the group is on its SAID list, step 1012, and that the SAID status is active, step 1014, before processing the group call. If the SAID status is inactive, then the CCI microprocessor sends a channel denied message to the CVMIM by executing in step 1016 the same routine used to process a channel assignment. However, if the SAID is listed and active, then the outgoing call is activated on the SAID list in step 1018. If a console originated the call, then the console identifier is stored in a CCI database in step 1020, and if the requested call is an emergency then it is marked as an emergency on the SAID list in step 1022. Finally, the channel assignment routine is executed to output a channel assignment message to the CVMIM for each of the conventional channels involved in the group call and to send channel key messages to the proper CI boards and channels in step 1024.

In step 814, if the CVMIM sends an unkey message for a conventional channel to the CCI, then the CCI microprocessor receives this message through the dual-port RAM and executes the unkey routine shown in FIGS. 11 A, B and C. If the unkey, is for a conventional channel in conventional call and not involved in a group call, step 1102, then the CCI microprocessor determines whether the unkeyed call was outgoing on the channel from the multisite switch to the base station, step 1104, and, if so, whether the channel is involved in a patch call. If there is no outgoing call and the channel is in a patch call, step 1106, then the console call is marked as being inactive for this conventional channel in step 1108. The conventional channel is now ready for another call.

Figure 27:
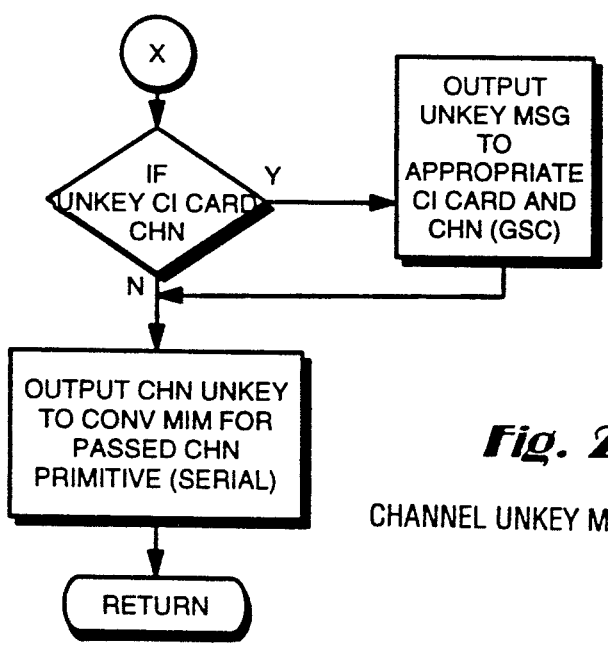

If the unkeyed channel call is outgoing from the switch to the base station and is not a patch call, then the CCI microprocessor checks whether the conventional channel is in a simulselect call, step 1110. If the call is also not simulselect, then the CCI microprocessor determines whether the incoming call is active of the channel, step 1112. If the channel is not active at all, then the CCI sends a channel drop message, FIG. 29, to the CVMIM and an unkey message to the appropriate CI board having this conventional channel in step 1114. If the incoming call is active, then the CCI sends an unkey message, FIG. 27, to the CVMIM and CI board in step 1116 and marks the call as being inactive in step 1118 and the console incoming call as being inactive in step 1108.

Upon dropping the channel, if the CCI finds that a patch call is pending in step 1130, then the pending patch state is set to patch active in step 1132 and the CCI microprocessor confirms that the patch call is active in the SAID list in steps 1134 and 1136. Then a channel assignment is sent to the CVMIM for the new conventional channel and a channel key message is sent to the CI board for the conventional channel in step 1138. In addition, the patch call is marked as being an active outgoing call on that conventional channel in step 1140. Moreover, if a console originated call is active on the patch SAID, step 1142, then the CCI microprocessor sends a channel assignment to the CVMIM so that the CVMIM's audio boards will couple the console call to the CI board (the proper TDM slot) and sends a key message so that the CI boards link the CVMIM audio output to the appropriate conventional channel in step 1144.

If the conventional channel being unkeyed is involved in a simulselect call, then the SAID list is checked for the simulselect call in step 1146. If the simulselect call is in the SAID list, the microprocessor checks whether there is an active console call listed on the SAID, step 1148, and whether there is an active incoming call from the base station on the channel, step 1150. If not, then the CCI sends a channel drop to the CVMIM for this conventional channel and an unkey message for the base station to the appropriate CI board in step 1152. However, if there is an active console originated call listed in the SAID, then the CCI sends an unkey to the CI board and CVMIM in step 1154. Similarly, if the the conventional channel is active with an incoming call, then the CCI sends an unkey message to the appropriate CI board and the CVMIM in step 1156.

If the conventional call being unkeyed is involved in a simulselect call but the simulselect is not in the SAID list, step 1146, then the channel is checked for having an active incoming call, step 1147. If there is no incoming call, then a channel drop message is sent to the CVMIM, and an unkey message is sent to the CI board, step 1158, and the outgoing and incoming calls to the conventional channel are marked as being inactive, step 1160. However, if there is an active call on the channel, step 1147, then an unkey message for the channel is sent to the CVMIM, an unkey message is sent to the CI board, step 1162, and the outgoing call to the base station is marked as being inactive, step 1164.

If the unkey is of a group call, step 1120, such as for a patch or simulselect call, then the CCI microprocessor confirms that the call is listed in the SAID list, step 1122. If the call is involved in a simulselect call, step 1124, then a routine 1126 similar to the simulselect subroutine (FIG. 16) is executed to drop and unkey the simulselect call from all conventional channels.

If the unkeyed group call is a patch call, then the CCI determines whether any conventional channels are stilled keyed into the patch call in step 1166. If not, then the outgoing call to the base station is marked as inactive on the said, step 1168; a channel drop message is sent to the CVMIM and an a channel is unkey sent to the CI board, step 1170. In addition, the outgoing call is marked as being inactive for all conventional channels associated with the patch call, step 1172. If there is more than one conventional channel still keyed to the patch, step 1174, then a channel unkey message is sent to the CVMIM and CI boards to remove the console originated call from all conventional channels, step 1176, and the inbound console call is marked as being inactive on the SAID. If there is more than one conventional channel keyed into the patch call, step 1174, then the channel unkey routine is executed to output a channel unkey to the patch SAID and an unkey message to the appropriate CI board in step 1178. The outgoing call to the base station is marked as inactive, but any incoming call from the base station remains active in step 1180. In addition, a channel unkey message is sent to the patch SAID for all conventional calls that do not have active incoming calls from the base station in step 1182.

When a dispatcher sets up a patch or simulselect call that requires a conventional channel, the CVMIM sends to the CCI a series of three messages to set up the call on the conventional channel. The first message 816 is a header that identifies the patch or simulselect call, provides a system identification number (SAID) and indicates the number of groups involved in the call. The second message 818 conveys the collection of the groups involved in the call. The third message 820 activates the call so that it can go forward.

When the CCI microprocessor receives a patch-header or a simulselect-header message 816 from the CVMIM, it adds the system assigned identification (SAID) for the call to its SAID database and clears the patch/simulselect database record. The call is logged into the database as being in the build state because the call has not yet been activated. The SAID database consists of all active system assigned ID's (SAIDs) along with all of the conventional channels involved with that SAID. In addition, there is a status word pertaining to the SAID indicating active calls, emergency calls and console originated calls.

When the CCI microprocessor receives a patch or simulselect collection message 818, it executes a patch-/simulselect collection routine shown in FIG. 12. In steps 1202 and 1204, the SAID database is checked to ensure that the SAID for the call was inserted into the database in response to the header message. In step 1206, the call is confirmed to be in the build state and has not been activated. If the call is already active, then there is no reason to complete the collection algorithm. Assuming that the call is in the build state, the CCI collects the conventional channels to be involved in the call from the collection message in step 1208. If any of these channels are already involved in a patch or simulselect call, step 1210, then the call being built is marked as being inactive in the SAID database and the call does not go through. If the conventional channels are available, then the call is ready to be activated.

Upon receipt of a patch active message 820, the CCI microprocessor executes the patch activate subroutine shown in FIG. 13. In this subroutine, the SAID list is searched to ensure that the call is in the list, step 1302, marked as being in the build state, step 1304, and that all of the conventional channels to be involved in this call are not already involved in another patch or simulselect call, step 1306. If any of these checks yields a negative response, then the CCI sends a patch inactive message to the CVMIM, step 1308, and the call is marked as being inactive in the SAID list, step 1310. If the checks of the SAID list yield affirmative responses, then the CCI tells the CVMIM that the patch is active for the conventional channels, step 1312, and sets the SAID status as being active, step 1314. The conventional channels involved with the patch call are marked as being active for this SAID, step 1316. However, any conventional channels already involved in another call (non-patch or simulselect call) are marked as having a pending patch call, step 1318. Once this other call is unkeyed, then the patch call is activated on that channel. Similarly, if the CCI microprocessor receives a simulselect activate message, 828, then the simulselect activate subroutine shown in FIG. 14 is executed. This subroutine is similar to the routine that activates a patch call.

Figure 15B:
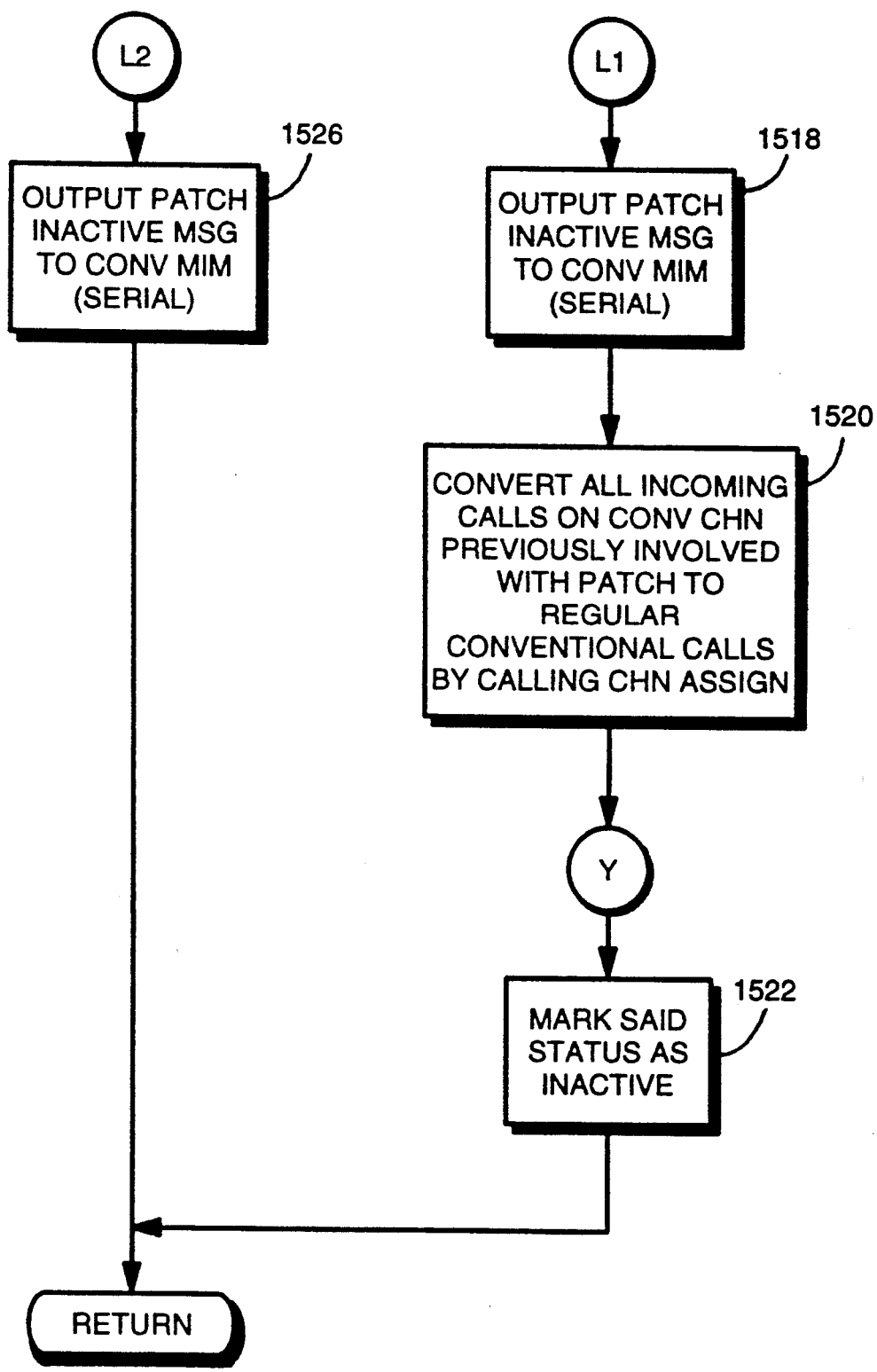

When the CVMIM sends the CCI a patch deactivate message 830, the CCI microprocessor runs the patch deactivate algorithm shown in FIGS. 15 A and B and previously described. Similarly, when the CCI receives a simulselect deactivate message, 832, it executes the simulselect deactivate algorithm shown in FIG. 16. To deactivate a simulselect call, the CCI first searches the SAID database for the call, step 1602, and determines whether there is an active console originated call listed on the SAID, step 1604. If there is none, then the SAID is changed so that all of the conventional channels participating in the call are indicated as being no longer in the call, step 1606. The CCI sends a simulselect inactive message to the CVMIM, step 1608, and marks the SAID status as inactive in the SAID, step 1610.

If there is a console originated call still in the simulselect call, then each channel is individually removed from the call in step 1612. To remove a channel, the CCI checks whether the channel is carrying an active console originated call, step 1614, and whether the channel has an active incoming call from the base station, step 1616. If the channel is active, then the CVMIM is told that the channel has been unkeyed and, for an active base station call, the CI board is told to release the channel from the call. If there are no active calls on the channel, then a channel drop message is sent to the CVMIM and an unkey message is sent to the appropriate CI board in step 1618. Finally, the channel is marked in the SAID as having been removed from the call in step 1620. When all conventional channels have been removed, step 1622, the CVMIM is told that the simulselect call is inactive on its node and the SAID for the call is marked as being inactive.

When the conventional base station keys a call on a conventional channel, the CI board detects the audio on that channel and sends a conventional channel key message 834, to the CCI over the CIA GSC message bus. As shown in FIG. 17, to notify the CVMIM that a conventional channel is keyed, the CCI marks the channel as being active, step 1702, and checks whether the channel is already involved with a patch call in step 1704. Assuming that the channel is not, the CCI in step 1706 calls up the channel assignment process shown in FIG. 28. If the channel is involved in a patched call, then the SAID for the patch call is extracted from the SAID database, step 1708, and a channel assignment message is sent to the CVMIM on the SAID in step 1710. Since the channel is involved in a patch call, the channel is marked as having an incoming active call on the SAID in step 1712. So that all conventional channels in the patch call can listen to the channel having the incoming call, a channel assignment message for the incoming call is sent to to the CVMIM for each of the other conventional channels involved in the patch call and a key message is sent to the CI boards for these other channels in step 1714. In addition, these other conventional channels are marked in the SAID as having active outgoing calls in step 1716.

When an active incoming call from a conventional base station unkeys, step 836, the CCI microprocessor executes the the conventional channel unkey routine shown in FIGS. 18 A and B. The unkeyed call is marked as being inactive in step 1802 and the unkey channel is set to false in step 1804. The unkey channel flag is an indicator stating whether to unkey the channel or drop the channel. It is initialized to the drop state assuming there are no other active calls on the SAID.

If the unkeyed channel is involved in a patch call, step 1808, that is listed in the SAID database, step 1810, then the CCI determines whether other conventional channels have incoming calls from the base station, step 1812, and whether there is an active console call on the patch call in step 1814. If either of these are true, then the unkey channel is reset to true and an unkey message is sent to the CVMIM in step 1816. If the unkey channel is still false, step 1818, then a channel drop message is sent to the CVMIM, step 1820, and the incoming call is deactivated on the SAID in step 1822.

Since the unkeyed channel was involved in a patch call, then each of the conventional channels in the patch call are checked for incoming calls (true=incoming call), step 1824. If the channel does not have an incoming call (false), then a channel drop message is sent to the CVMIM and patch SAID, and an unkey message is sent to the appropriate CI board in step 1826. The outgoing call that corresponds to the unkeyed incoming channel is marked as being inactive in step 1828. In step 1830, if the unkeyed channel was not the only active incoming call on the SAID, then a channel unkey message is sent to the patch SAID for this channel in step 1832. However, if the unkeyed channel was the only active incoming call on the SAID, step 1830, then a check is made for console originated calls, step 1834, and for incoming calls on the channel, step 1836. If there are no console calls or incoming calls on the channel, then an unkey message is sent to the patch SAID and to the appropriate CI board, step 1838. In addition, the outgoing call is marked as inactive on the conventional channel, step 1840.

If the unkeyed channel is scheduled to participate in a pending patch call, step 1842, then the channel is marked as patch active, step 1844, and the patch group is pulled from the SAID list, step 1846. If there is an incoming call active on the patch SAID, step 1848, then the CCI sends the CVMIM a channel assignment message for the patch and a key message is sent to the appropriate CI board in step 1850. If there is a console call active on the patch, step 1852, then a channel assignment is sent to the CVMIM for the console originated patch call and a key message is sent to the appropriate CI board in step 1854. In either event, the outgoing patch call on the conventional channel is marked as being active on the SAID.

There is a series of conventional channel control messages that the multisite switch can sent to the CCI via the CVMIM. These messages are described above and the subroutines used to execute these messages are shown in FIGS. 21 to 25. These messages have a common header recognized by the nodes in the multisite switch and the CCI as is evident from step 838. The control messages can be used to control the base station so as to enable/disable the remote and repeat functions of the base station as in step 840. Similarly, the gain on CI audio boards can be adjusted by changing the EE pot values, step 842; the CI boards and CCI can be configured by the switch, steps 844 and 846; and the transmit and receive frequencies of the CI boards can be set in steps 848 and 850.

Figure 19:
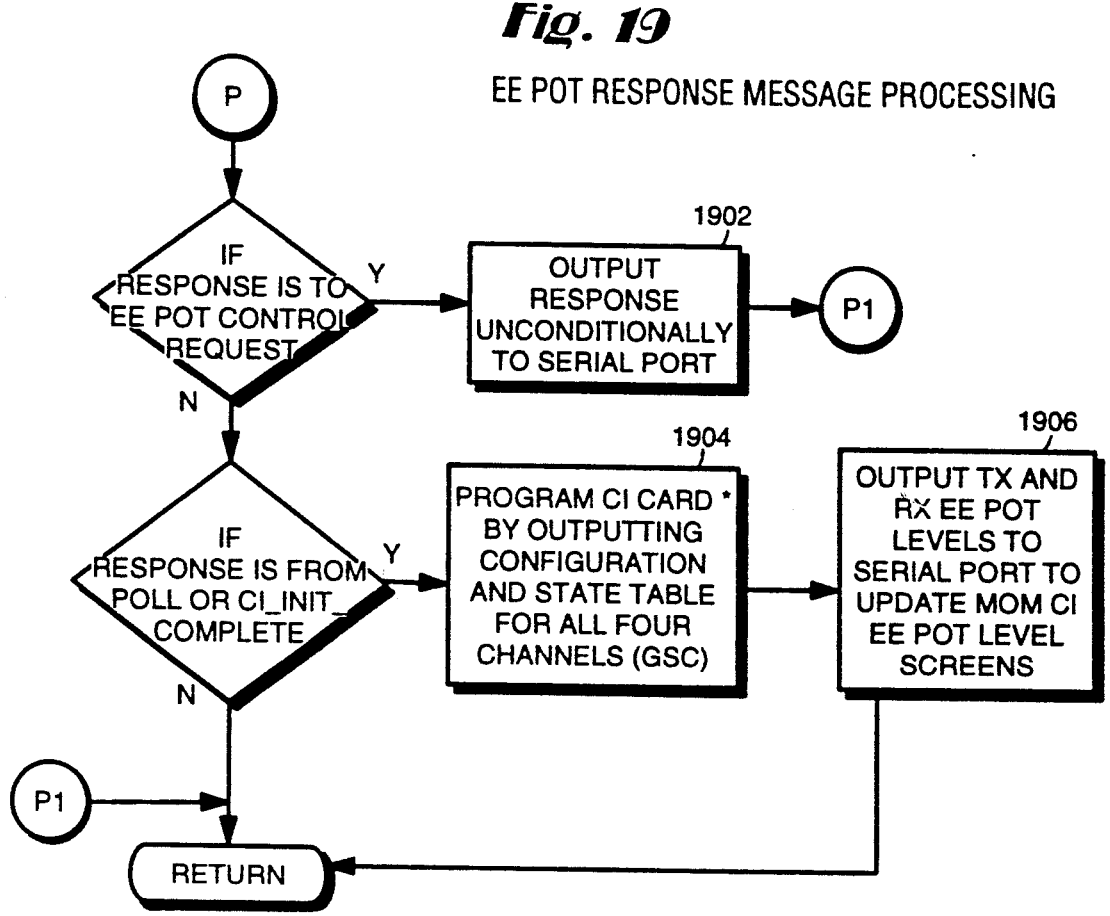
Figure 21:
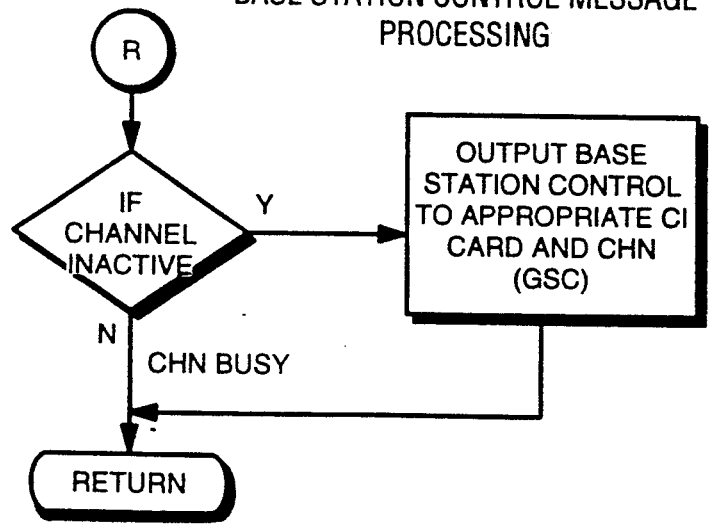
Figure 22:
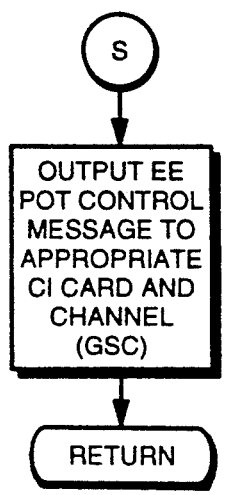
Figure 23:
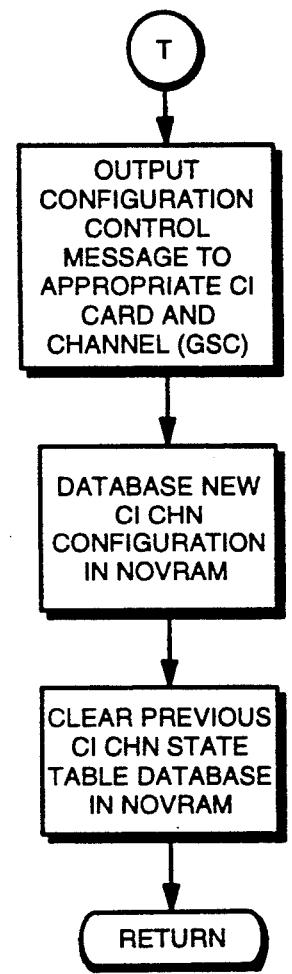
Figure 24:
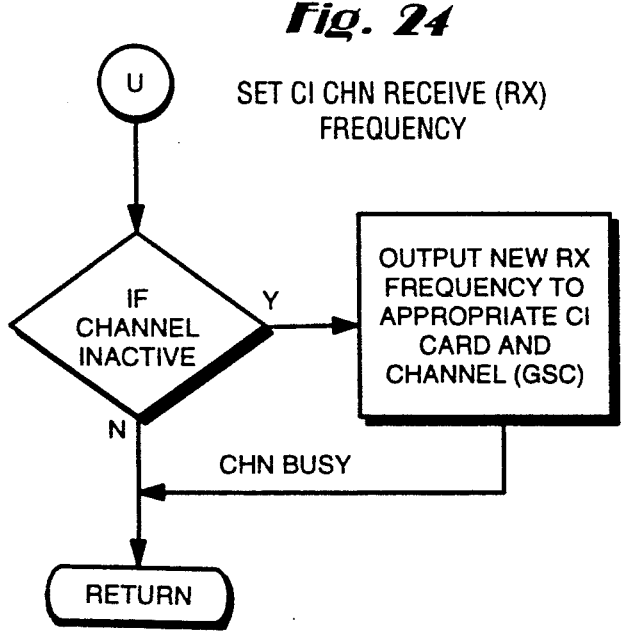
Figure 25:
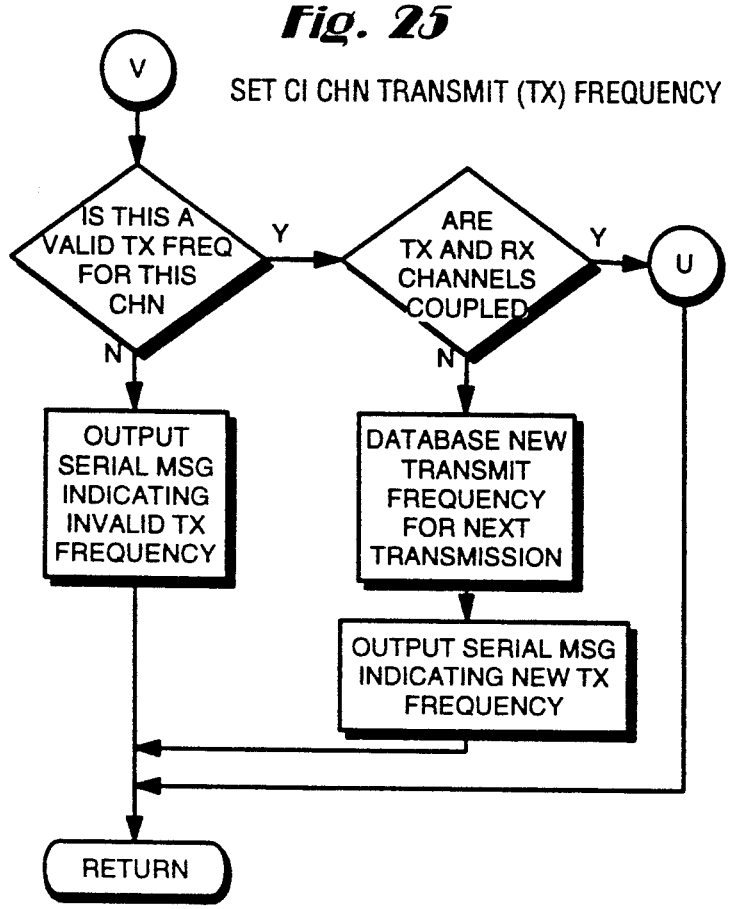

The CCI responds to the base station control and EE pot messages. In step 852, the CCI receives an EE pot response from the CI board. The CCI calls up the EE pot response message routine shown in FIG. 19. If the EE pot response message is made in response to a EE pot control message, then the pot response message is passed on to the CVMIM in step 1902. However, if the EE pot response message is in response to a CI poll request or to a CI initialization complete message, then the CCI programs the CI board by sending it a configuration message and the state table in step 1904. The CI board configuration information and state table are held in a database in the NOVRAM on the CCI board. This information is loaded into the CI boards at startup or when the CI boards are reset during polling. In addition, in step 1906 the CCI sends the CVMIM the transmit (Tx) and receive (Rx) frequencies and EE pot levels for the CI boards. This information is sent to the MOM and held by the MOM PC.

Upon receiving a base station response message, step 854, the CCI executes the base station response routine shown in FIG. 20. The CCI first sends the base station response message on to the CVMIM in step 2002. If the CI board message states that a new receive Rx frequency has been set successfully, steps 2004 and 2006, the CCI loads the new Rx frequency into its database in step 2008. If the receive and transmit Tx frequencies are coupled, then the CCI loads the new Tx frequency into the data base, step 2010, and informs the CVMIM of the new Tx frequency, step 2012. A similar procedure is followed by the CCI in response to a set Tx frequency command from the CI, step 2014.

Figure 26:
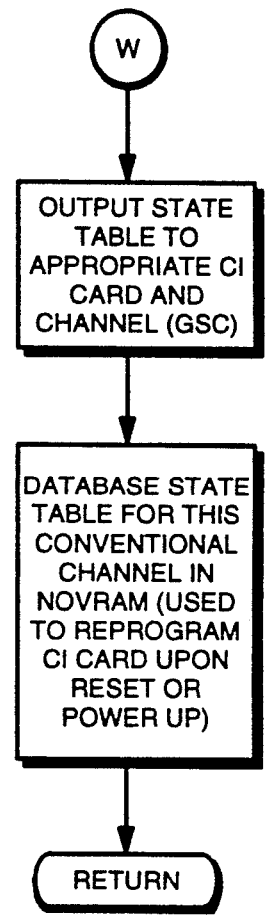

If the CCI receives a conventional program message from a CVMIM, 856, then the conventional program control routine shown in FIG. 26 is executed which causes the CCI to send the CI board the state table for a particular conventional channel. Finally, the microprocessor for the CCI upon receiving internal messages from the CCI microcontroller (80C152) echoes the message back to the microcontroller. This echoing procedure allows the microcontroller to act on its own messages without using a special internal microcontroller messaging scheme.

IV. Flowcharts for CI Audio Board

FIG. 30 is a flowchart for the routine executed by the microprocessor on each CI board. The microprocessor starts a watch-dog timer routine 2802 that regularly monitors the successful operation of the the microprocessor. If the microprocessor does not timely respond to this timer, then the microprocessor is reset. Once the variables for the microprocessor are initialized, an initialization complete message is sent to the CCI in step 2804 and the main loop routine is called up.

Figure 31:
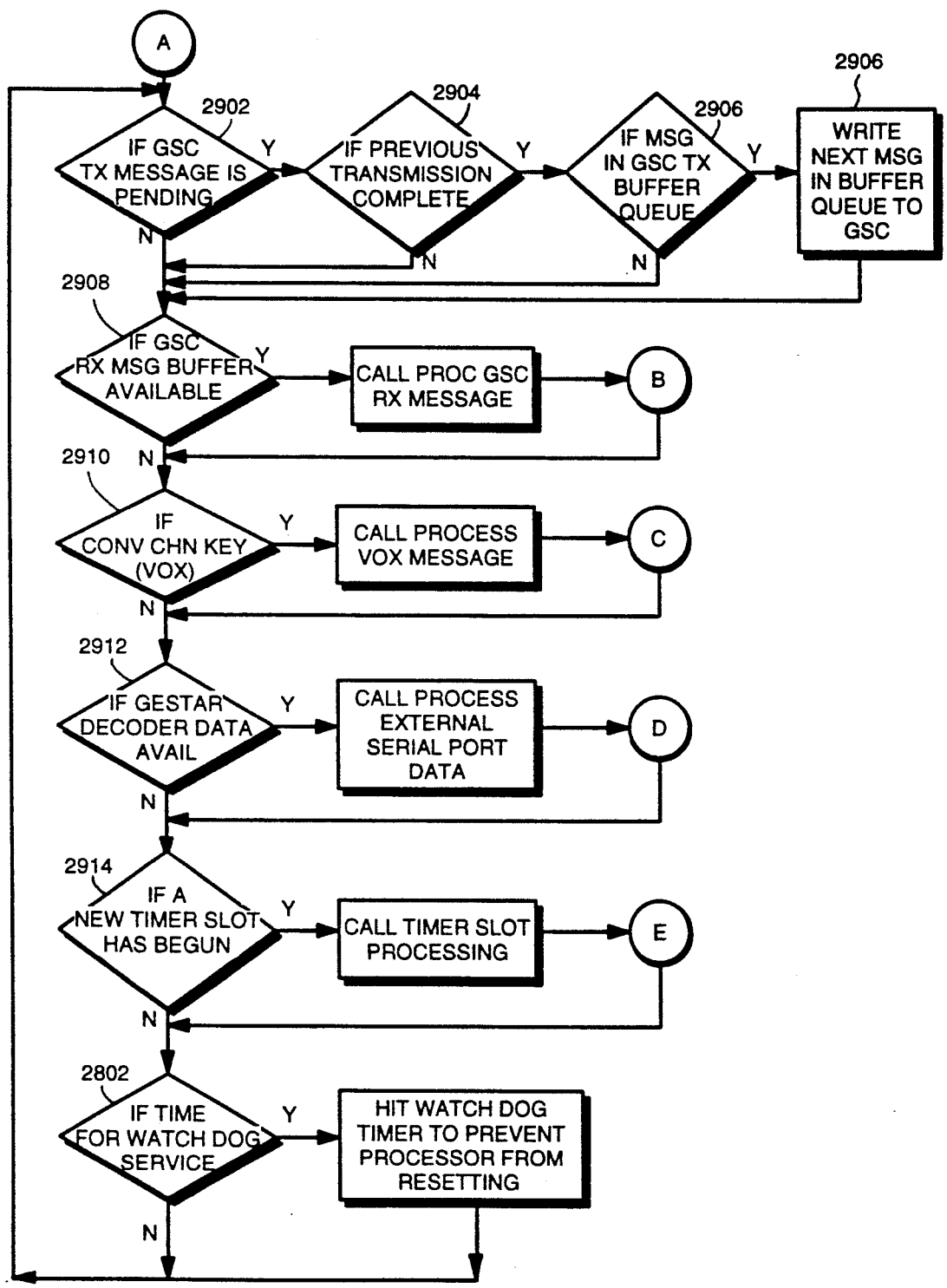

FIG. 31 is a flowchart of the main loop processing routine. When a CI microprocessor has a message to send to the CCI over the CIA's GSC message bus, step 2902, the CI first confirms that the previous transmission on the GSC bus is complete, step 2904, and that its message is in its buffer queue, step 2906, and then places the message on the GSC bus, step 2908.

Figure 32B:
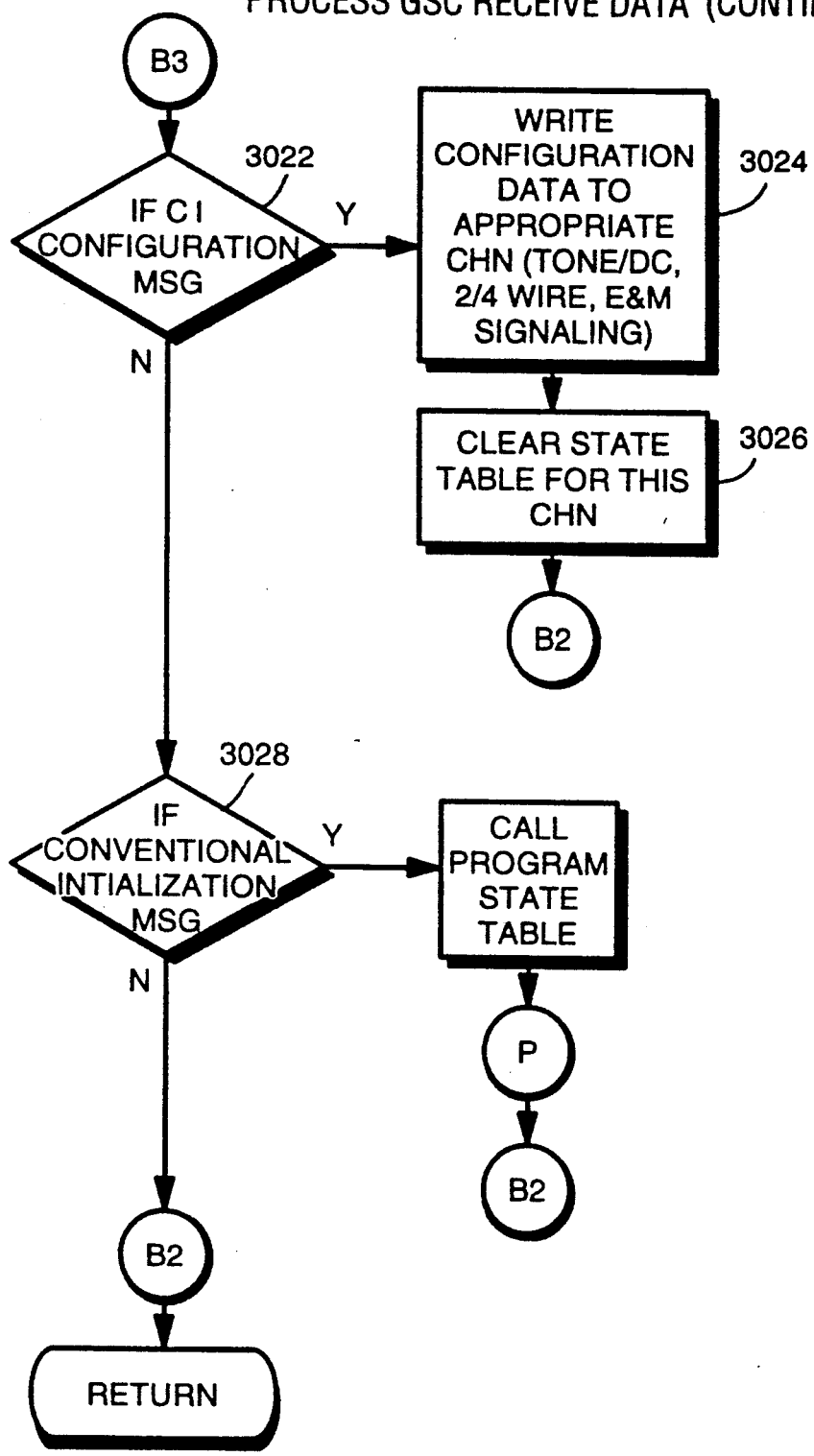
Figure 36:
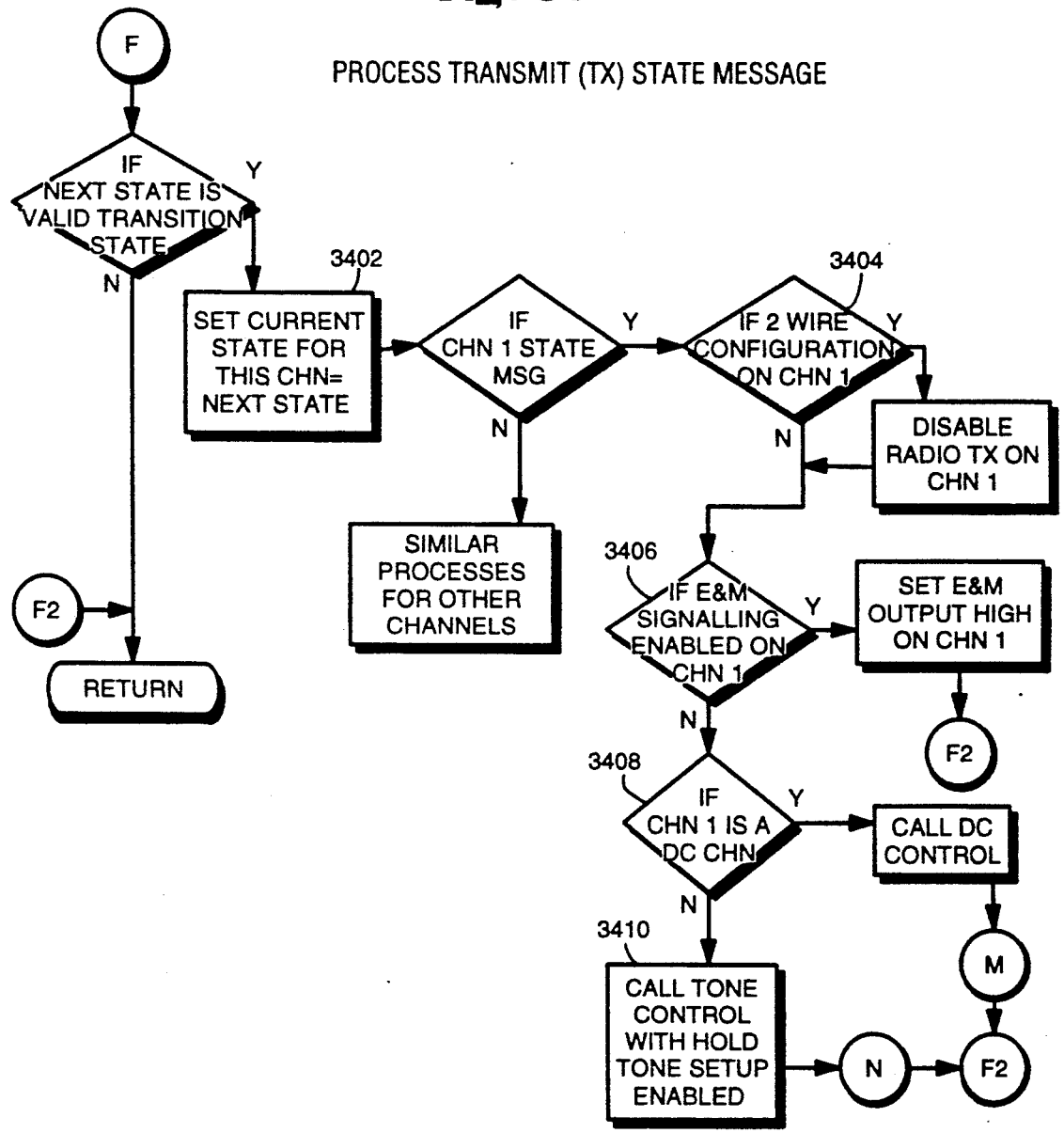
Figure 43:
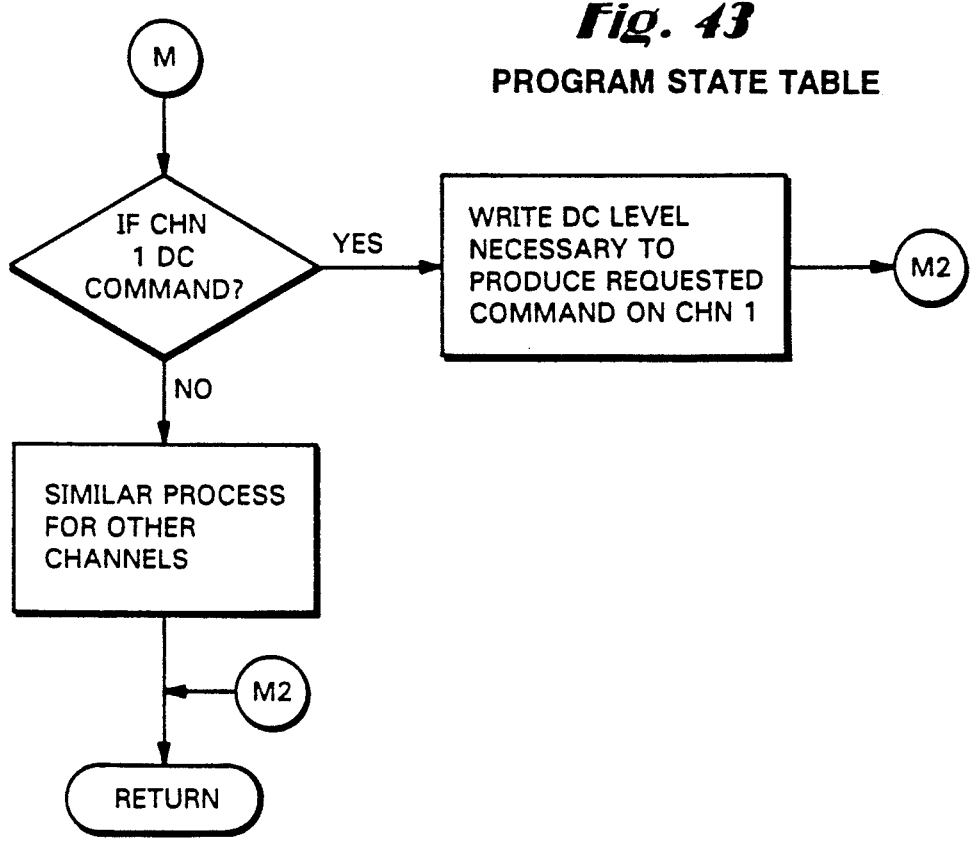
Figure 44:
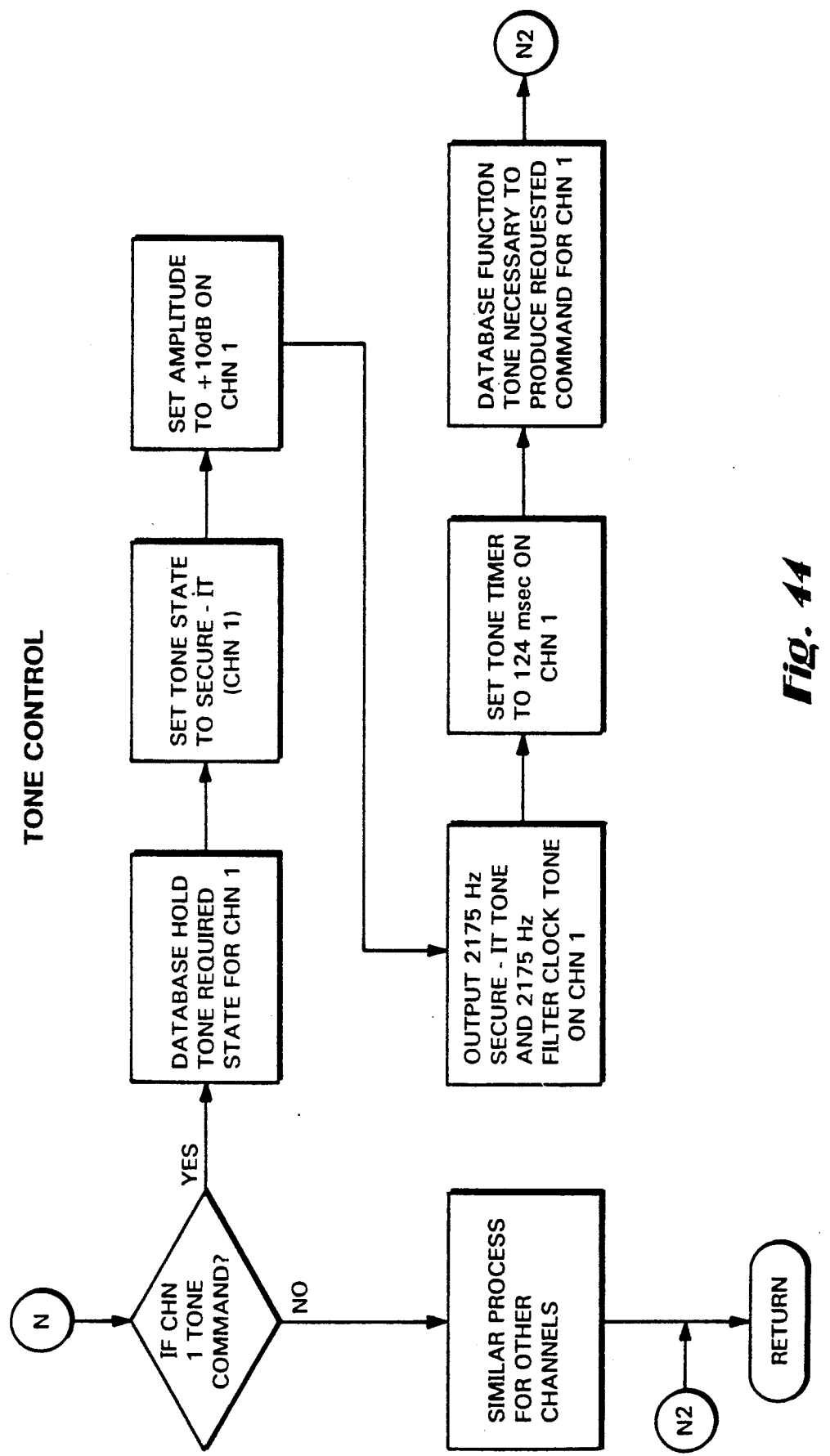
Figure 46:
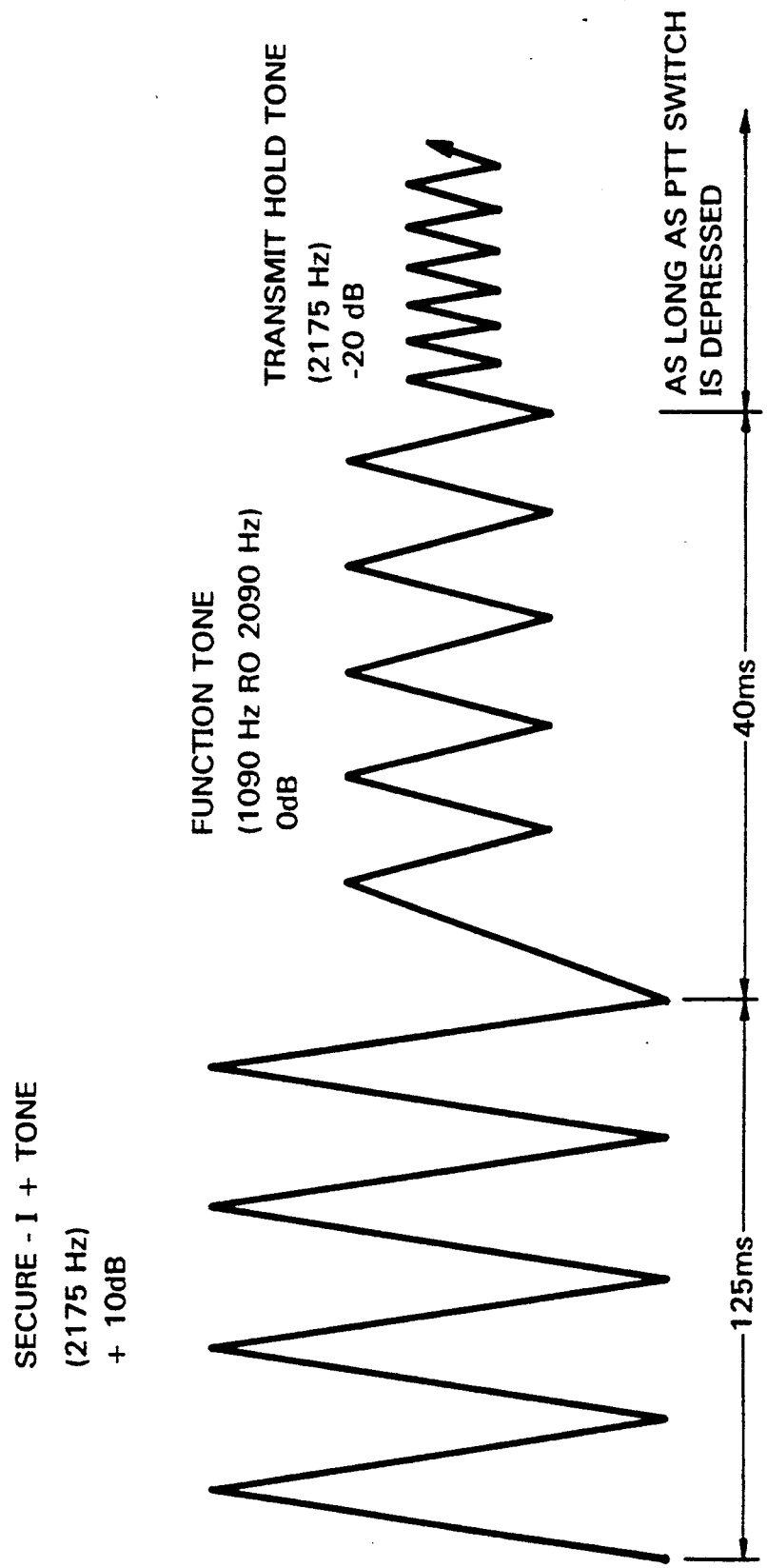
FIG. 46 illustrates some of the tones used to control conventional base stations.

When the CI microprocessor receives messages from the CCI, step 2908, it executes the subroutine for processing received messages shown in FIG. 32. Base station control messages, step 3002, are processed by first confirming that the message corresponds to a valid conventional channel, step 3004. If the message is a transmit (Tx) frequency state message, then the CI microprocessor executes the routine shown in FIG. 36. In step 3402, the CI sets the current state for the selected channel to the state indicated by the message. Using a message for channel "1" as an example, the CI microprocessor first disables the transmission (Tx) circuit on the CI board, if the messages indicate that the channel is a 2-wire channel, as opposed to a 4-wire, in step 3404. Depending upon the type of control used in the conventional base station, the CI microprocessor sets the E&M signalling (high), step 3406; sends an appropriate DC control current, step 3408, or sends a hold tone, step 3410. The E&M signalling, tones and DC currents used to control base stations are conventional and the flowcharts of routines to produce the necessary hold tones and DC currents are shown in FIGS. 43 and 44.

Figure 35:
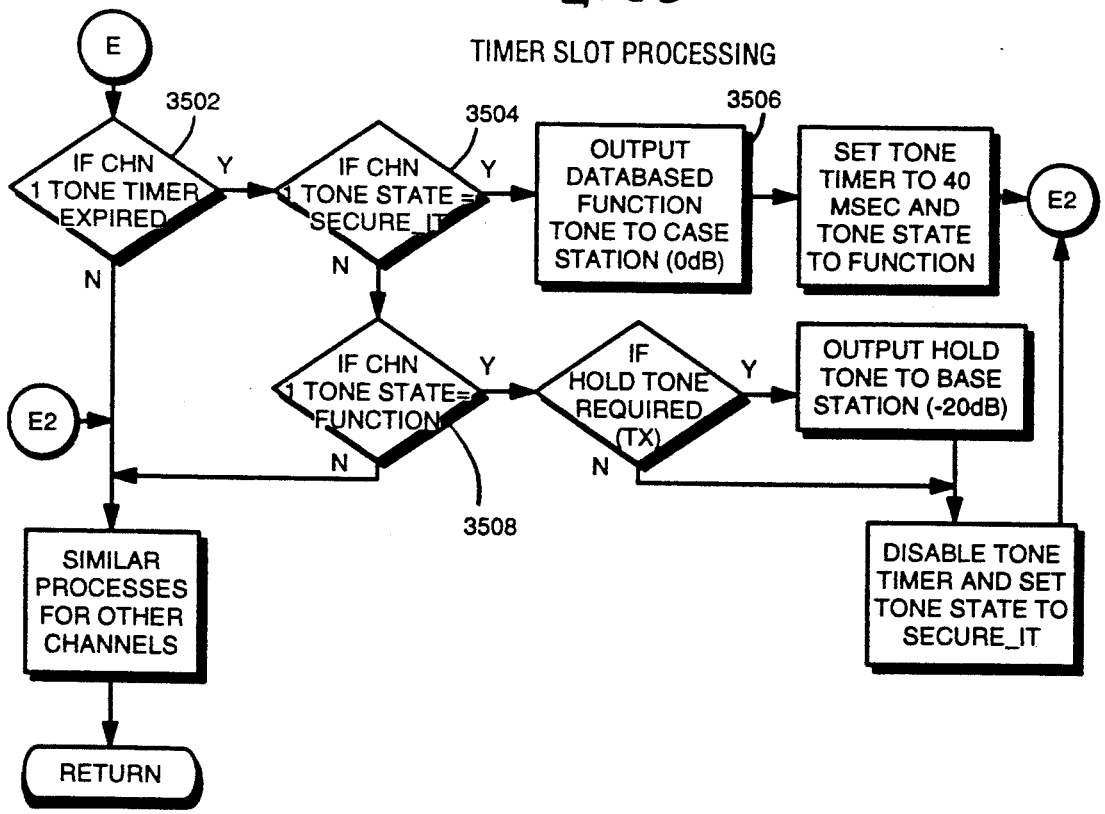
Figure 37:
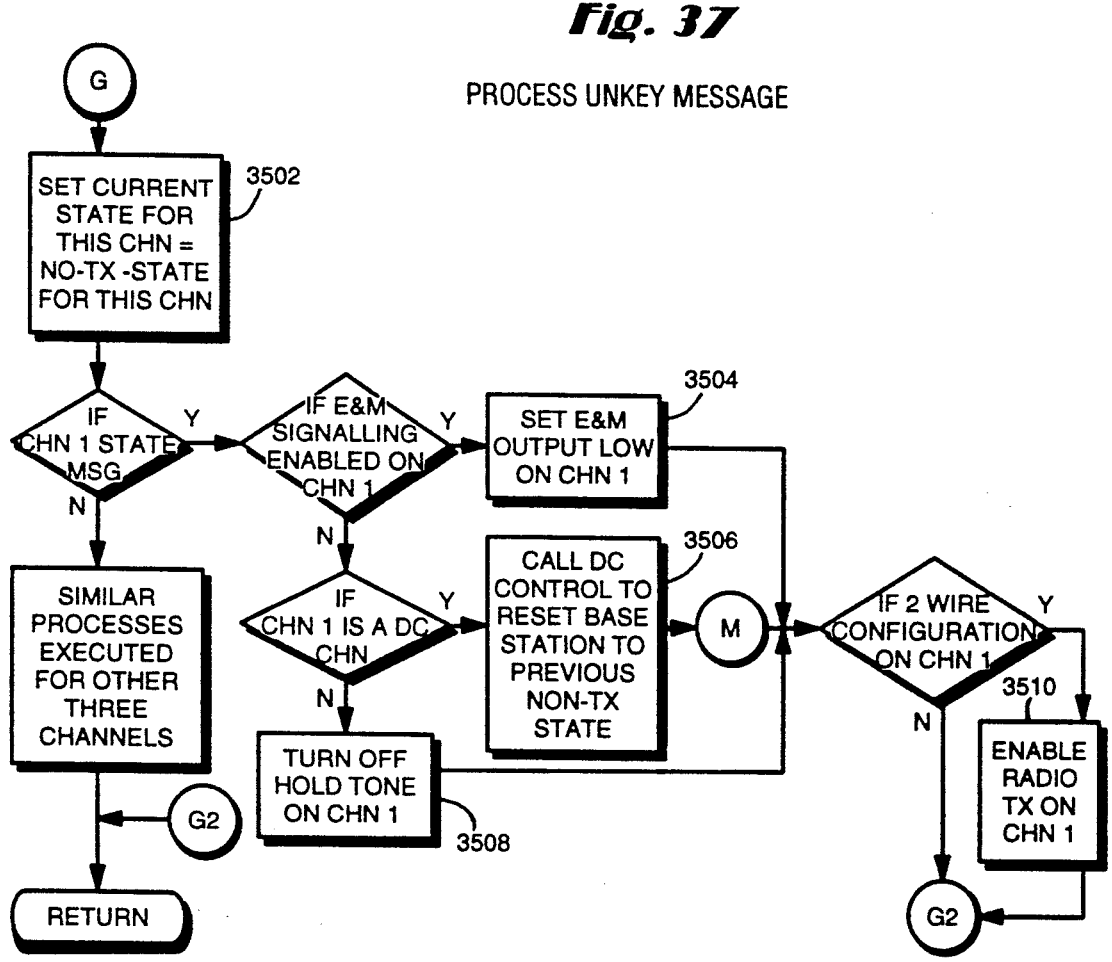

If the CCI sends the CI an unkey message, step 3008, the CI executes the unkey process shown in FIG. 35. The CI first resets the state for the channel to non-transmit, step 3502 (FIG. 37). Assuming channel 1 is being unkeyed and depending upon the type of control used on the base station, the CI either sets the E&M output to low, step 3504; resets the DC current to the last non-transmit DC level, step 3506; or stops the hold tone, step 3508. In addition, if the channel was set in a 2-wire configuration, the transmit (Tx) circuit on the CI board channel processing is enabled in step 3510.

Figure 38:
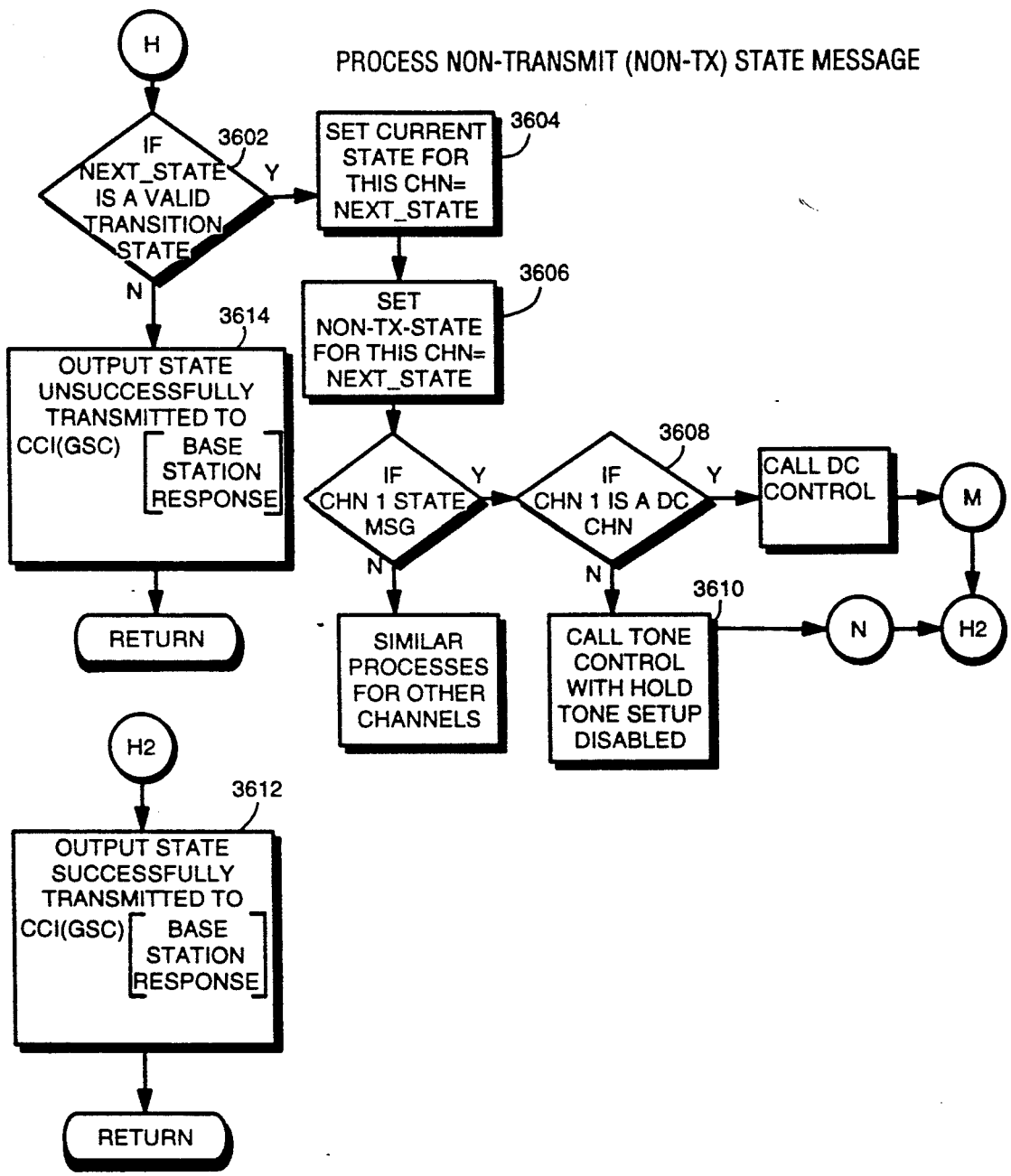

If the CCI message received by the CCI is a base station non-transmit message 3010, then as is shown in FIG. 38 the CCI confirms that the non-transmit state is valid, step 3602, and then resets the current state, step 3604, to the non-transmit state in step 3606. Non-transmit messages are all messages that do not require the base station to be keyed (i.e., no signal to be sent to a transmitter). For example, remote enable/disable, repeat enable/disable or any message requiring base station interface activity other than transmissions. Assuming that the channel 1 is being reset, then the DC current, step 3608, or hold tone, step 3610, is stopped depending upon the base station type. Finally, the CI informs the CCI whether the output state for the channel has been reset successfully, step 3612, or unsuccessfully, step 3614.

Figure 39:
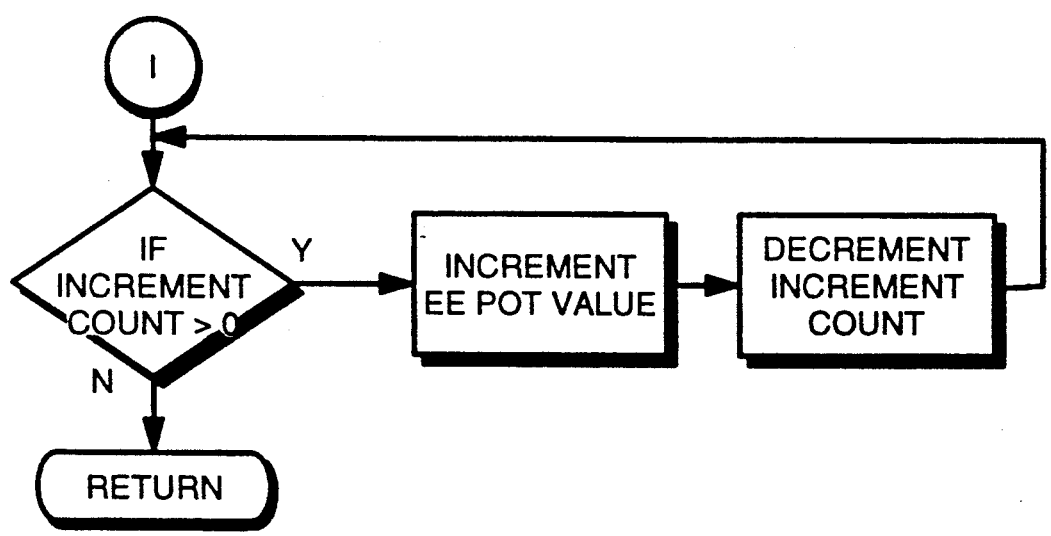
Figure 40:
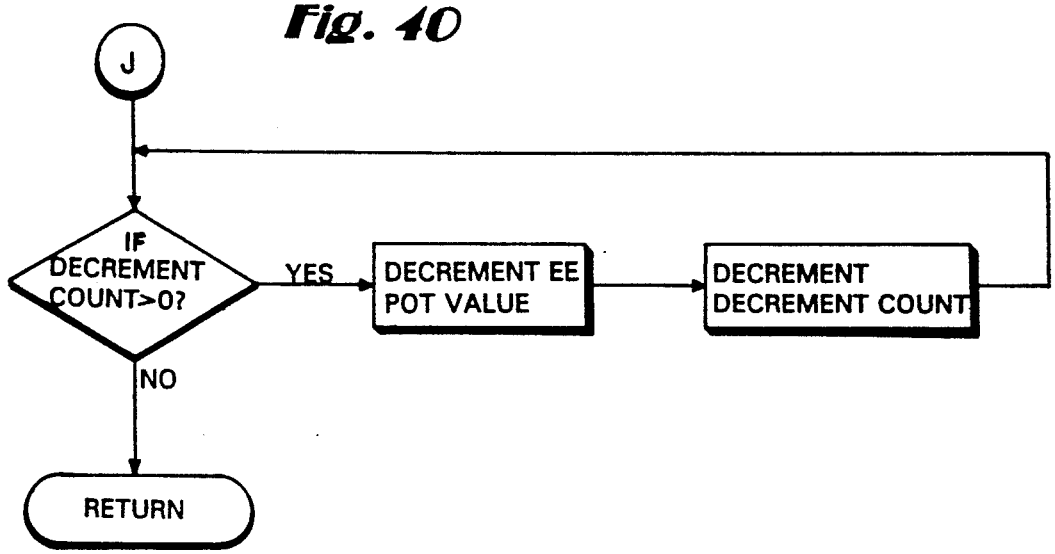
Figure 42:
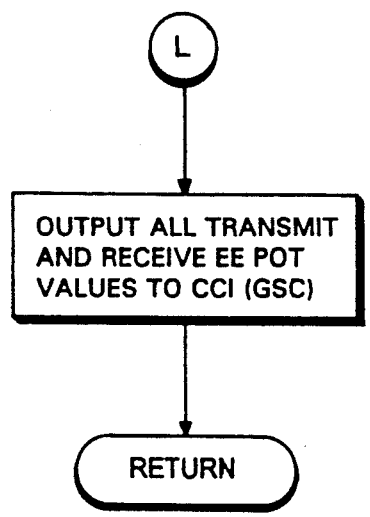
Figure 41:
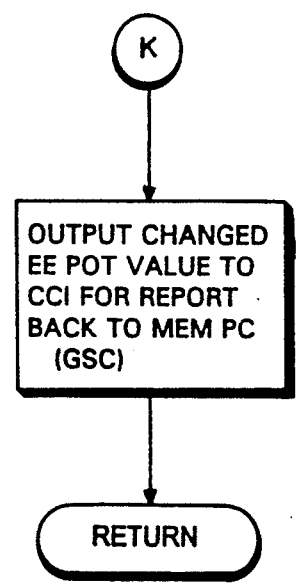

If the message from the CCI is not for base station control, 3002, then the message is for the CI board itself. The message, 3012, can tell the CI to increment, 3014, decrement, 3016, its EE digital pots (audio gain) or set the EE pots to a certain level, 3018. The CCI microprocessor executes subroutines to increment (FIG. 39) or decrement (FIG. 40) the appropriate channels EE pot levels. The current EE pot level is then reported to the CCI (FIG. 41) which in turn sends a message to the CVMIM for storage by the MOM PC. Similarly, the CCI can request, step 3018, the CI to write an EE pot level in an EEPROM. The transmit and receive gain levels are controlled by EE pots. Until the CI board is specifically commanded to write the gains to the EE pots, the gains will operate at existing levels until the board is reset/power cycled. When reset, the stored EE pot levels are loaded into the pots. Finally, the CCI can ask the CI to send a response message stating the current values of the EE pots in step 3020.

Figure 45:
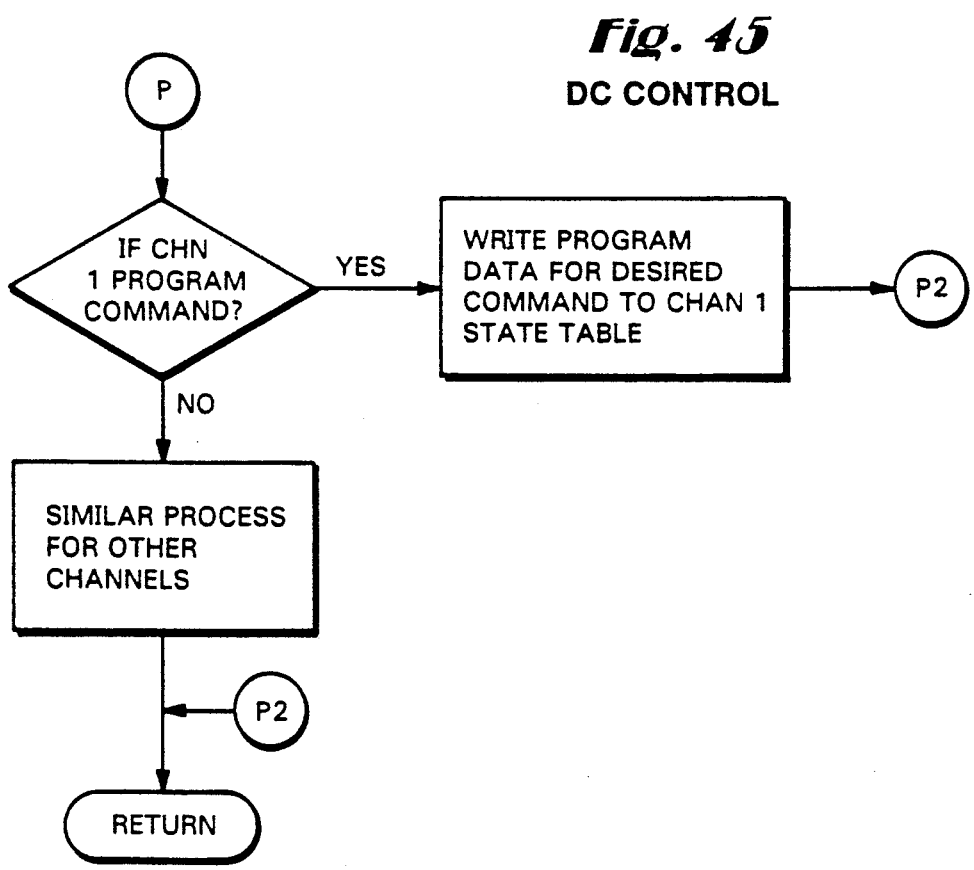

To configure the CI board for each conventional channel, the CCI sends a CI configuration message for each channel to the CI in step 3022. Generally, this configuration message is sent at startup of the multisite switch. Upon receipt of the message, the CI stores the configuration data specifying whether the channel is 2- or 4-wire, tone/DC controlled and has E&M signalling in step 3024. The CI also clears the state table for the channel in step 3036. Similarly, the CI receives at startup a conventional initialization message, step 3028, that loads into a channel state table (FIG. 45) the tone frequencies or DC current levels needed for controlling the conventional base station.

Figure 33:
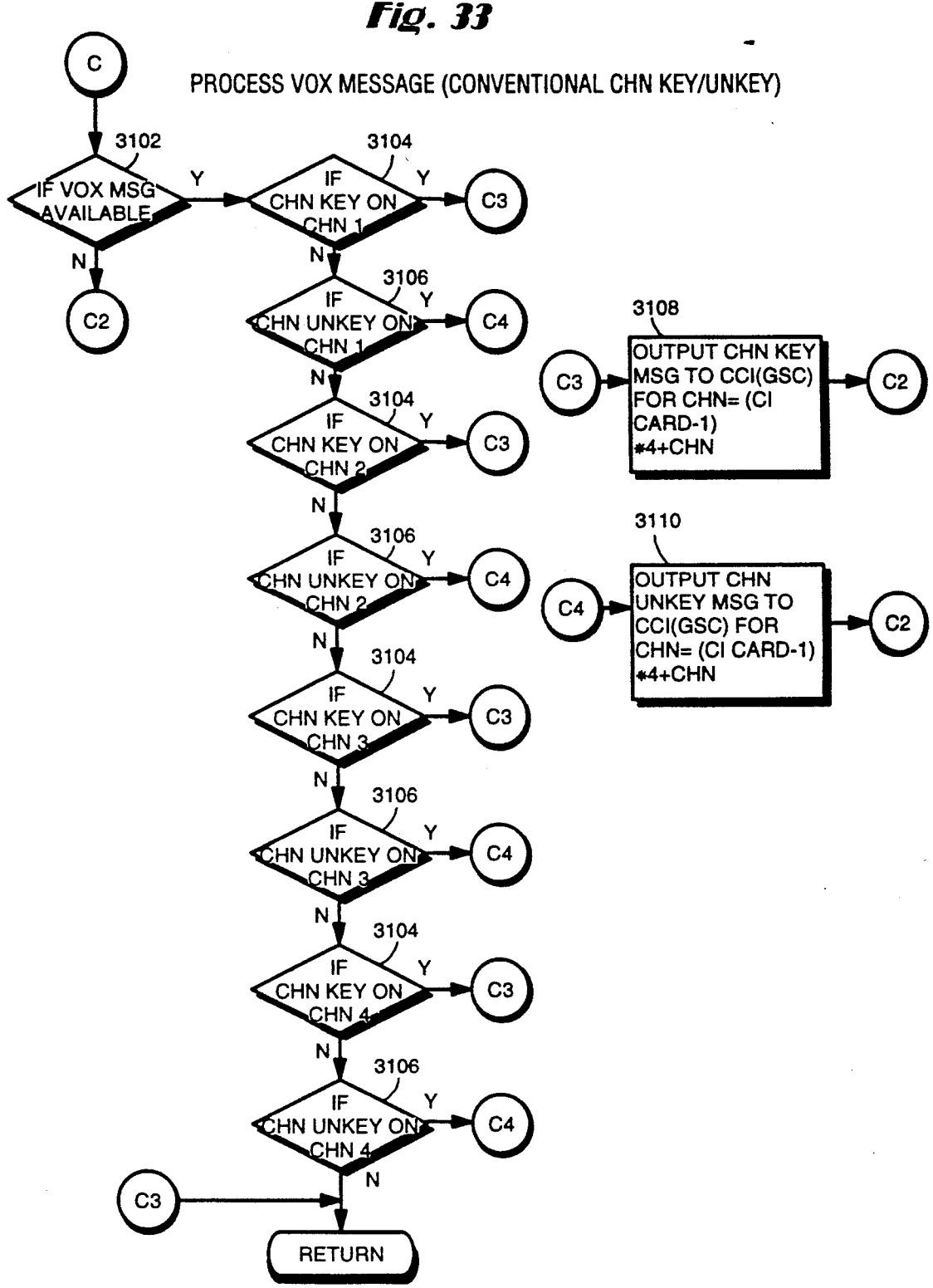

If the CI detects audio its VOX generates a key or unkeying signal for the conventional channel, step 2910, and the keying or unkeying message is sent to the CCI as is shown in FIG. 33. In step 3102, upon detecting audio, the CI determines whether the VOX issued a keying or unkeying message. Depending upon the channel involved, a keying or unkeying message is sent by the CI board to the CCI in steps 3104 and 3106. So that the message on the CIA GSC message bus identifies both the proper channel and CI board, the channel number used for the bus message is calculated (CHN NO.=(CI CARD NO. −1) 4+CHANNEL NO. (1 to 4)) to indicate both the proper CI board and which of the four channels on the board has been keyed or unkeyed in steps 3108 and 3110.

Figure 34:
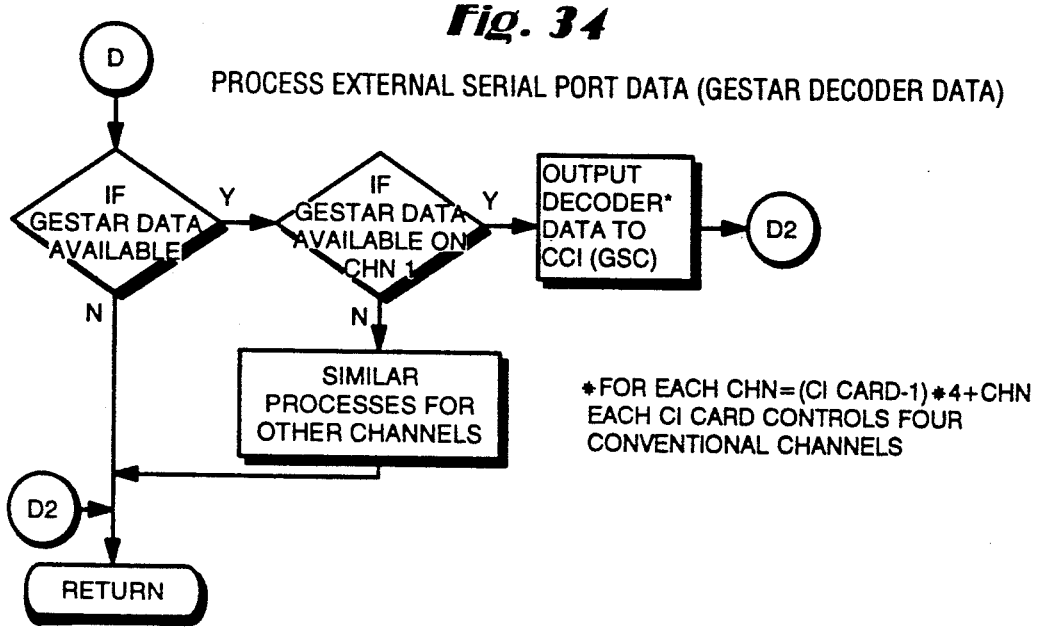

If the conventional audio signal is encrypted, then the base station sends decoding data to the multisite switch which in turn passes the decoding data to the callees participating in the call. The callees require the data to decode the audio signal. Accordingly, in step 2912, if the CI receives decoding data over a serial link with the base station, then the CI outputs the data (FIG. 34) to the CCI with an appropriate designation of the coded conventional channel.

As shown in FIG. 35, the timer slot subroutine is called every five milliseconds and is used to control the tone operation to interface with tone controlled base stations. When interfacing with a tone controlled base station, it requires a 2175 Hz secure-it tone, steps 3502 and 3504, at +10 dB for 125 milliseconds (used to wake-up the station), followed by a function tone, step 3506, (1090 Hz to 2090 Hz) at 0 dB for 40 milliseconds (actual function itself), followed by a 2175 Hz hold tone, step 3508, at −20 dB for as long as the PTT key is pressed (if no PTT, then no hold tone)(used to hold base station in PTT state). The timer slot subroutine controls the duration and amplitude of each tone and whether or not to generate the hold tone.

The present invention has been described in connection with what are considered to be the most practical and preferred embodiment. However, the present invention is not to be limited to the disclosed embodiment, but on the contrary, is intended to cover various modifications and equivalent arrangements included within the spirit and scope of the appended claims.

What is claimed is:

1. A radio frequency (RF) communications network having digitally trunked RF communication systems and a conventional non-trunked RF communication system comprising:

an audio routing arrangement for routing trunked audio signals between digital trunked RF communication systems, said audio routing arrangement including a distributed architecture multisite switch having a plurality of nodes operatively coupled to an audio bus, said nodes each having a processor controlling the node and audio routing through the node, and a conventional interface adapter interfacing said conventional non-trunked radio frequency (RF) system to a processor controlled conventional node in said audio routing arrangement, said adapter linking audio signals on conventional non-trunked RF channels to trunked RF communications through said audio bus.

2. A RF communications network as in claim 1 wherein said conventional interface adapter comprises:

a conventional interface providing a pathway between non-trunked audio signals and digitally trunked audio signals, and a conventional control interface converting digital commands from said digitally trunked RF communication system into conventional control commands for said conventional non-trunked RF communication system.

3. A RF communications network as in claim 2 wherein said conventional interface comprises a voice activated device for detecting the presence of voice audio signals on a channel of said conventional communication system, said voice activated device signalling conventional control interface when voice audio is present on a conventional non-trunked channel.

4. A RF communications network as in claim 2 wherein said conventional interface comprises means for summing conventional control signals with audio signals going to said conventional non-trunked RF communications system.

5. A RF communications network as in claim 2 wherein said conventional control interface comprises:

channel assignment means for signally said digitally trunked RF systems when a voice audio signal is present on a channel from said conventional non-trunked RF communication system, and keying means for signalling said conventional interface means to establish an audio pathway for a particular call from said trunked RF communication system to said conventional non-trunked RF communication system.

6. A RF communications network as in claim 2 wherein said conventional non-trunked RF communications system comprises a base station operatively coupled to said conventional interface and said conventional control further comprises means for providing conventional control tones or DC currents to control said base station, said tones or DC currents being provided in response to digital commands from said digitally trunked RF communications system.

7. A method for interfacing a conventional non-trunked radio frequency (RF) communication system to a network of digitally trunked RF communication systems having a multisite switch comprising an audio bus, a plurality of nodes each having a processor routing audio to the trunked systems, and said audio bus and a conventional processor controlled node routing audio between said audio bus and a conventional interface adapter in said switch and operatively connected to the conventional non-trunked RF communication system, said method comprising the following steps by the multisite switch:

(a) detecting an incoming voice signal on one of a plurality of conventional non-trunked audio sources coupled to the conventional interface adapter;

(b) broadcasting the incoming voice signal on an audio slot within the switch;

(c) issuing a digital channel request message from the conventional node to the other nodes within the switch identifying the audio slot having the incoming voice signal, and (d) at least one of the other nodes linking a trunked audio destination to the audio slot having the incoming voice signal.

8. A method for interfacing a conventional non-trunked radio frequency (RF) communication system to a network of digitally trunked RF communication systems having a multisite switch comprising an audio bus, a plurality of processor controlled nodes linking audio between the audio bus and the trunked systems and a conventional processor controlled node routing audio between the audio bus and a conventional interface adapter operatively connected from the switch to the conventional non-trunked RF communication system, said method comprising the following steps by the multisite switch:

(a) a first switch node broadcasting a digitally trunked audio signal on an audio slot within the switch;

(b) the first switch node issuing a digital channel request message within the switch identifying the audio slot having the audio signal;

(c) in response to the channel request message, the conventional node and conventional interface adapter keying a conventional channel link to activate the channel;

(d) the conventional node coupling the conventional channel link to the audio slot having the trunked audio signal and the conventional interface adaptor converting the trunked audio signal into a non-trunked audio signal.

* * * * *